(12) United States Patent
Kim et al.

(10) Patent No.: US 10,572,145 B2
(45) Date of Patent: Feb. 25, 2020

(54) MOBILE TERMINAL FOR ONE-HAND OPERATION MODE OF CONTROLLING PAIRED DEVICE, NOTIFICATION AND APPLICATION

(71) Applicant: LG ELECTRONICS INC., Seoul (KR)

(72) Inventors: Dong Hoe Kim, Seoul (KR); Eun Jung Yang, Seoul (KR); Kyu Ho Kim, Seoul (KR); Sang Hyun Lee, Seoul (KR); Min Woo Hong, Seoul (KR); Young Soo Chang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 421 days.

(21) Appl. No.: 15/338,129

(22) Filed: Oct. 28, 2016

(65) Prior Publication Data

US 2017/0212631 A1    Jul. 27, 2017

(30) Foreign Application Priority Data

Jan. 25, 2016    (KR) .......................... 10-2016-0008911

(51) Int. Cl.
*G06F 3/0488*    (2013.01)
*G06F 3/0487*    (2013.01)
*G06F 3/0481*    (2013.01)

(52) U.S. Cl.
CPC ........ *G06F 3/04883* (2013.01); *G06F 3/0481* (2013.01); *G06F 3/0487* (2013.01); *G06F 2203/04803* (2013.01)

(58) Field of Classification Search
CPC .. G06F 3/04883; G06F 3/0481; G06F 3/0487; G06F 2203/04803
See application file for complete search history.

(56) References Cited

U.S. PATENT DOCUMENTS

| | | | |
|---|---|---|---|
| 6,239,798 B1* | 5/2001 | Ludolph | G06F 3/0481 715/788 |
| 6,336,146 B1* | 1/2002 | Burridge | G06F 9/451 719/310 |
| 6,621,508 B1* | 9/2003 | Shiraishi | G06F 3/0481 715/764 |
| 6,938,210 B1* | 8/2005 | Huh | G09B 5/06 715/730 |
| 2004/0148331 A1* | 7/2004 | Watanabe | H04L 29/06 709/200 |
| 2008/0109826 A1* | 5/2008 | Akiyama | G06F 9/451 719/318 |
| 2009/0031243 A1* | 1/2009 | Kano | G06F 3/0481 715/781 |
| 2009/0225035 A1* | 9/2009 | Baik | G06F 3/04886 345/173 |
| 2010/0004854 A1* | 1/2010 | Shin | G01C 21/3415 701/533 |

(Continued)

*Primary Examiner* — Sejoon Ahn
(74) *Attorney, Agent, or Firm* — Lee, Hong, Degerman, Kang & Waimey

(57) ABSTRACT

A mobile terminal for one-hand operation mode is provided, the mobile terminal including: a display unit including a touch screen; a sensor unit sensing a motion; and a controller, in response to at least one of a touch input applied to the touch screen and a motion sensed by the sensor unit, executing an one-hand operation mode to control a size or a position of a screen displayed on the display unit.

24 Claims, 64 Drawing Sheets

(56) References Cited

U.S. PATENT DOCUMENTS

| | | | |
|---|---|---|---|
| 2010/0192105 A1* | 7/2010 | Kim | G06F 3/0488 |
| | | | 715/834 |
| 2010/0313156 A1* | 12/2010 | Louch | G06F 3/0481 |
| | | | 715/769 |
| 2011/0081953 A1* | 4/2011 | Higuchi | G06F 3/0481 |
| | | | 455/566 |
| 2012/0060089 A1* | 3/2012 | Heo | G06F 1/1647 |
| | | | 715/702 |
| 2012/0179997 A1* | 7/2012 | Miyazaki | G06F 3/04842 |
| | | | 715/830 |
| 2012/0188275 A1* | 7/2012 | Shimazu | G06F 3/0488 |
| | | | 345/629 |
| 2012/0231884 A1* | 9/2012 | Sakai | G06F 1/1626 |
| | | | 463/31 |
| 2012/0249420 A1* | 10/2012 | Sato | G06F 3/03547 |
| | | | 345/157 |
| 2013/0050109 A1* | 2/2013 | Ban | G06F 3/04883 |
| | | | 345/173 |
| 2014/0013271 A1* | 1/2014 | Moore | G06F 3/0482 |
| | | | 715/792 |
| 2014/0115456 A1* | 4/2014 | White | G10L 15/22 |
| | | | 715/708 |
| 2014/0146007 A1* | 5/2014 | Lee | G06F 3/044 |
| | | | 345/174 |
| 2014/0273967 A1* | 9/2014 | Kwon | H04W 12/06 |
| | | | 455/411 |
| 2015/0128081 A1* | 5/2015 | Hsieh | G06F 3/04886 |
| | | | 715/773 |
| 2016/0162150 A1* | 6/2016 | Patel | G06F 3/017 |
| | | | 715/728 |
| 2016/0210012 A1* | 7/2016 | Han | G06F 3/0488 |
| 2017/0192666 A1* | 7/2017 | McCarthy | H04N 5/23293 |

* cited by examiner (a)          (b)

FIG. 3a
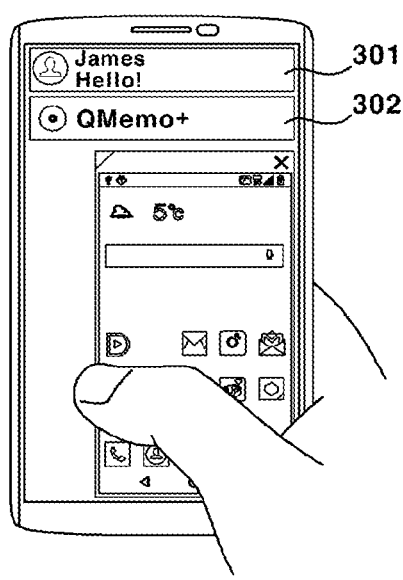
(a)
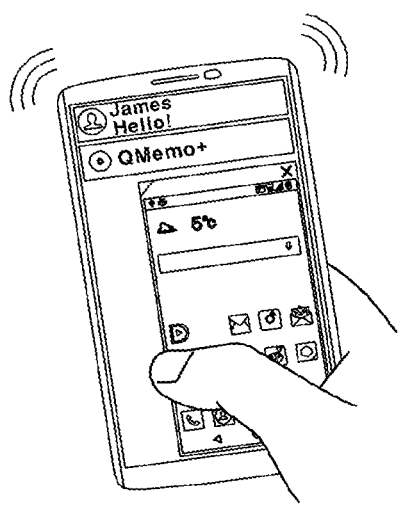
(b)
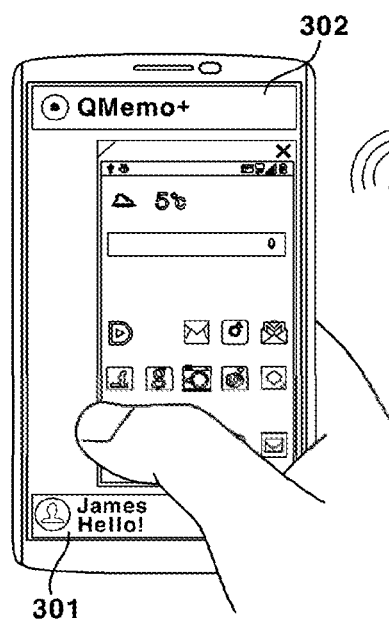
(c)
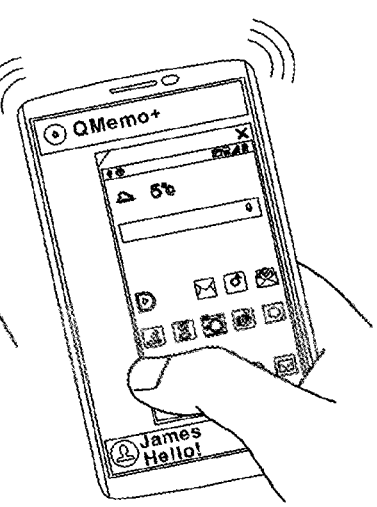
(d)
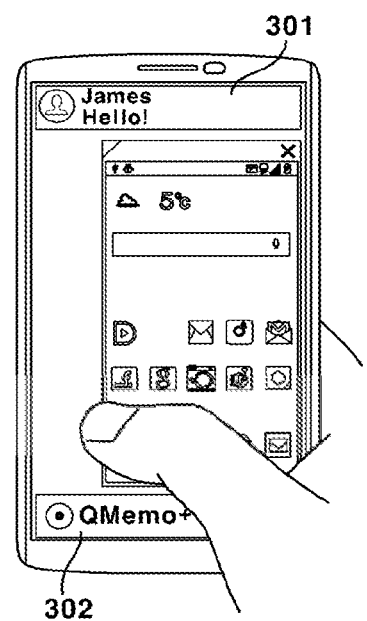
(e)

FIG. 3b
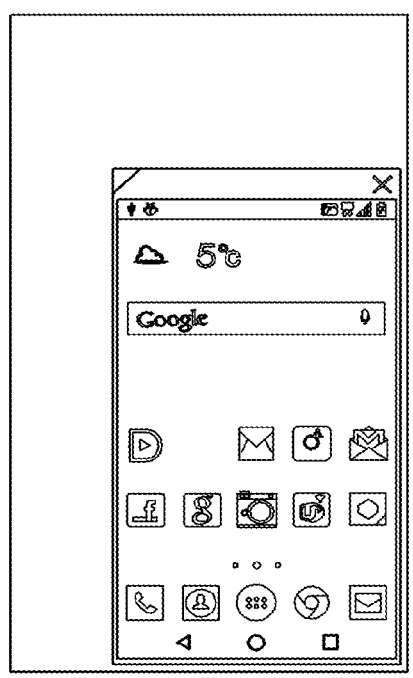
(a)
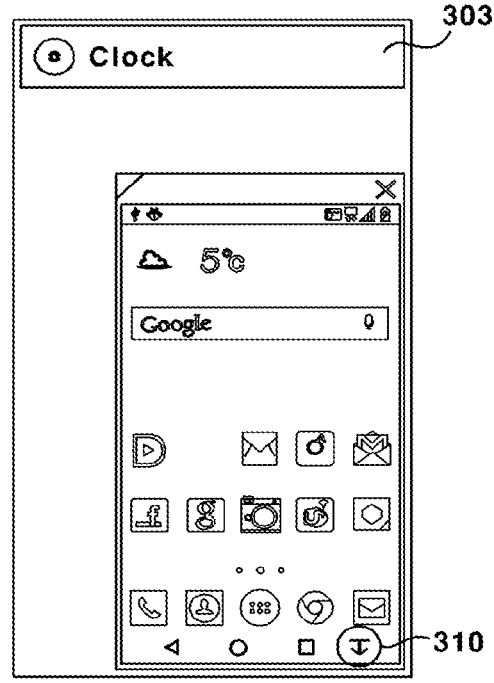
(b)
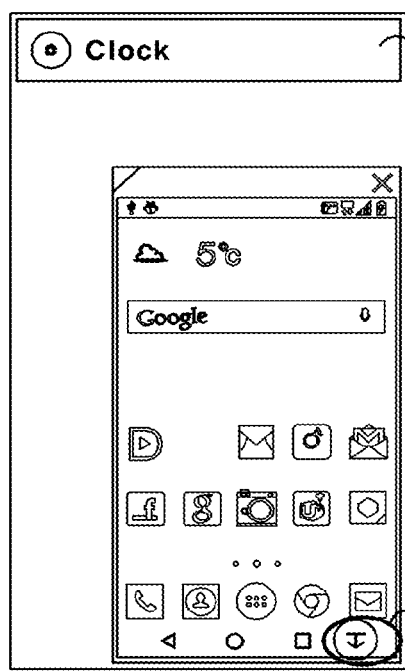
(c)
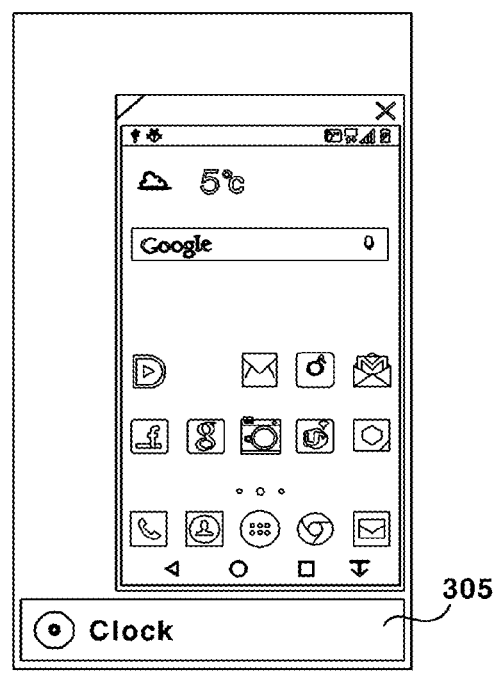
(d)

FIG. 3c
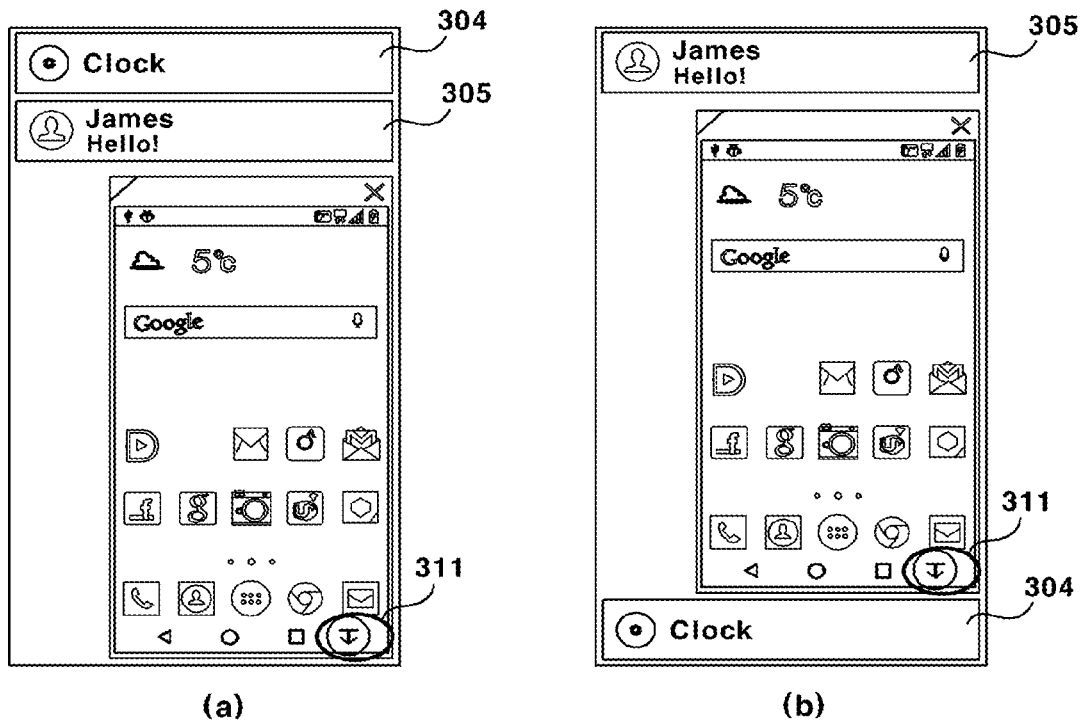
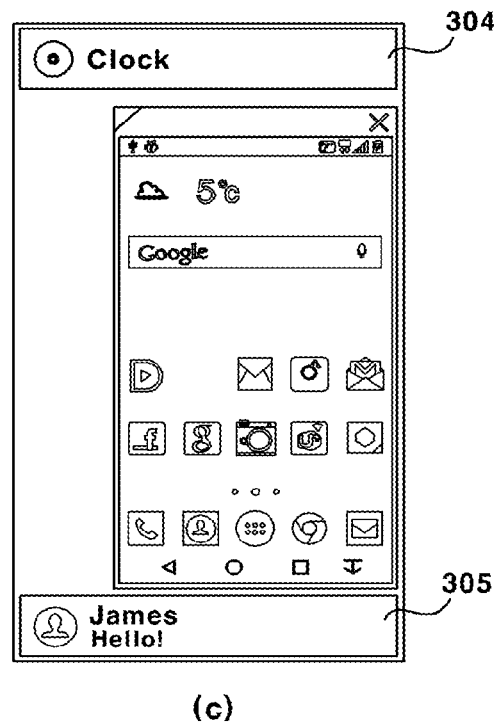

FIG. 4
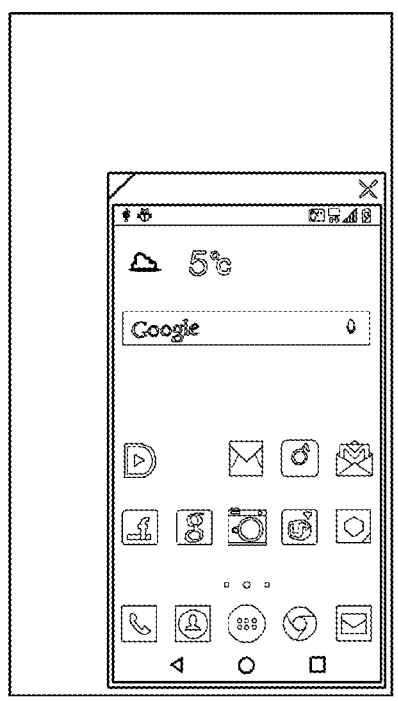
(a)
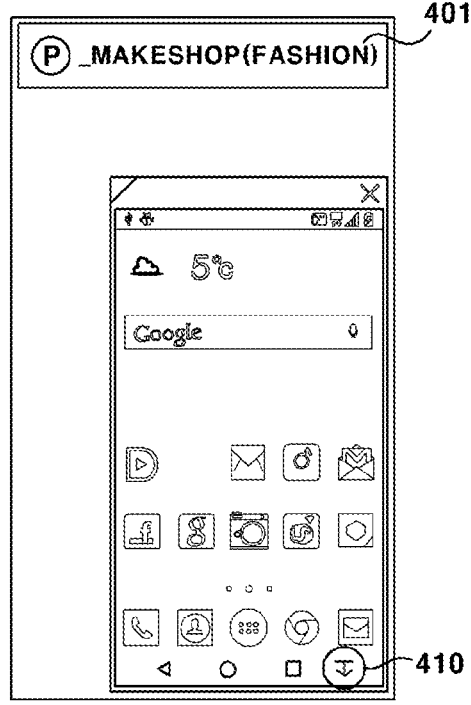
(b)
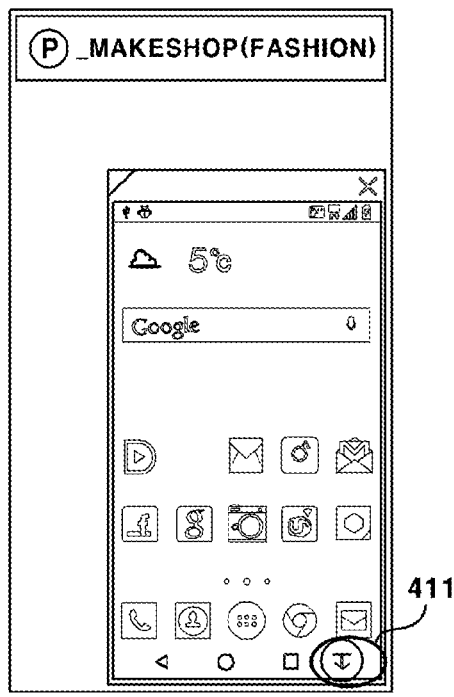
(c)
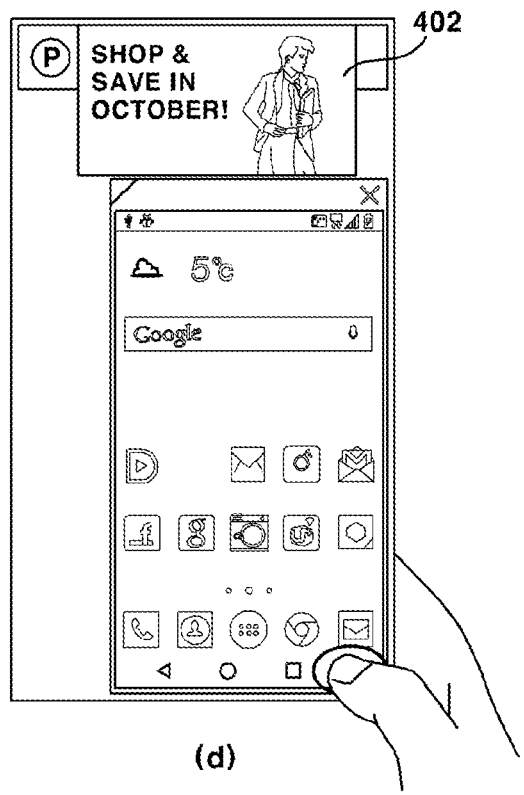
(d)

(a)    (b)

(a)          (b)

FIG. 18
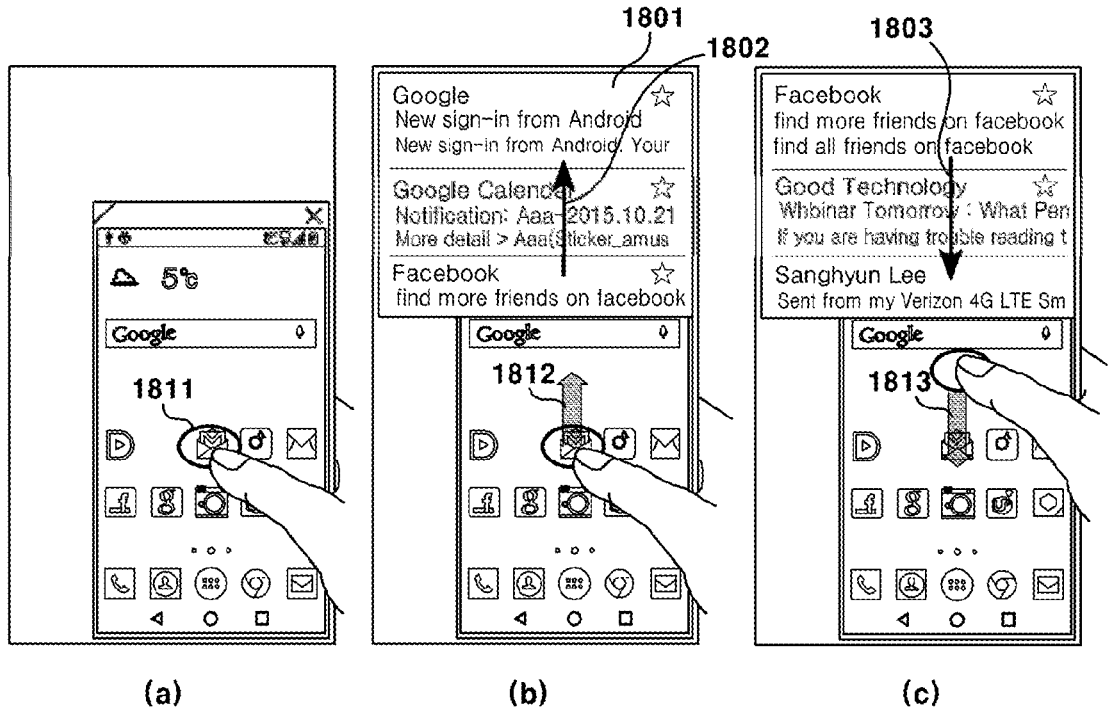
(a) (b) (c)
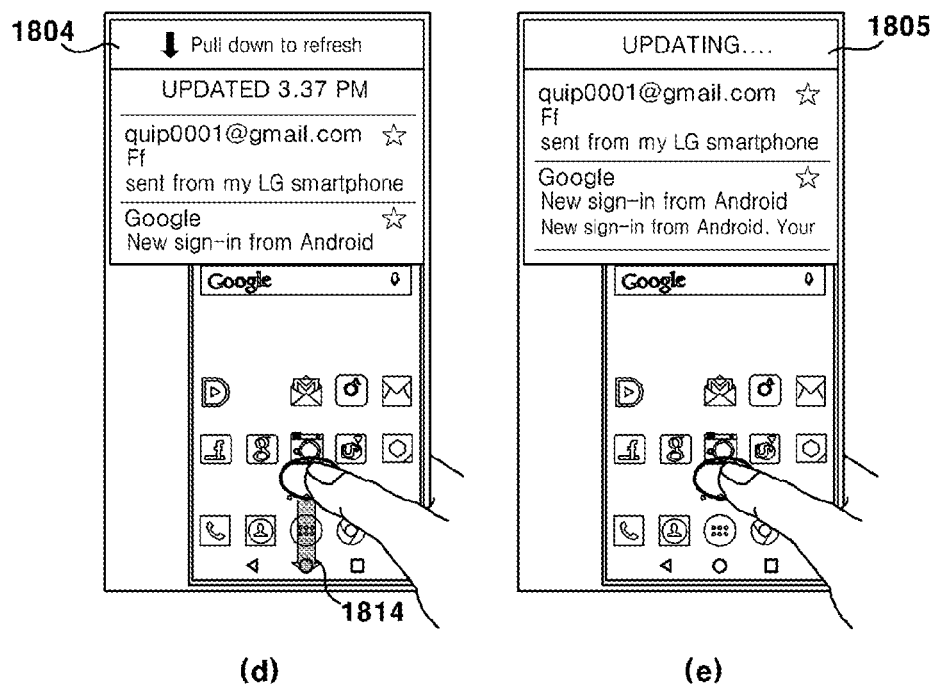
(d) (e)

(a)  (b)

FIG. 22a
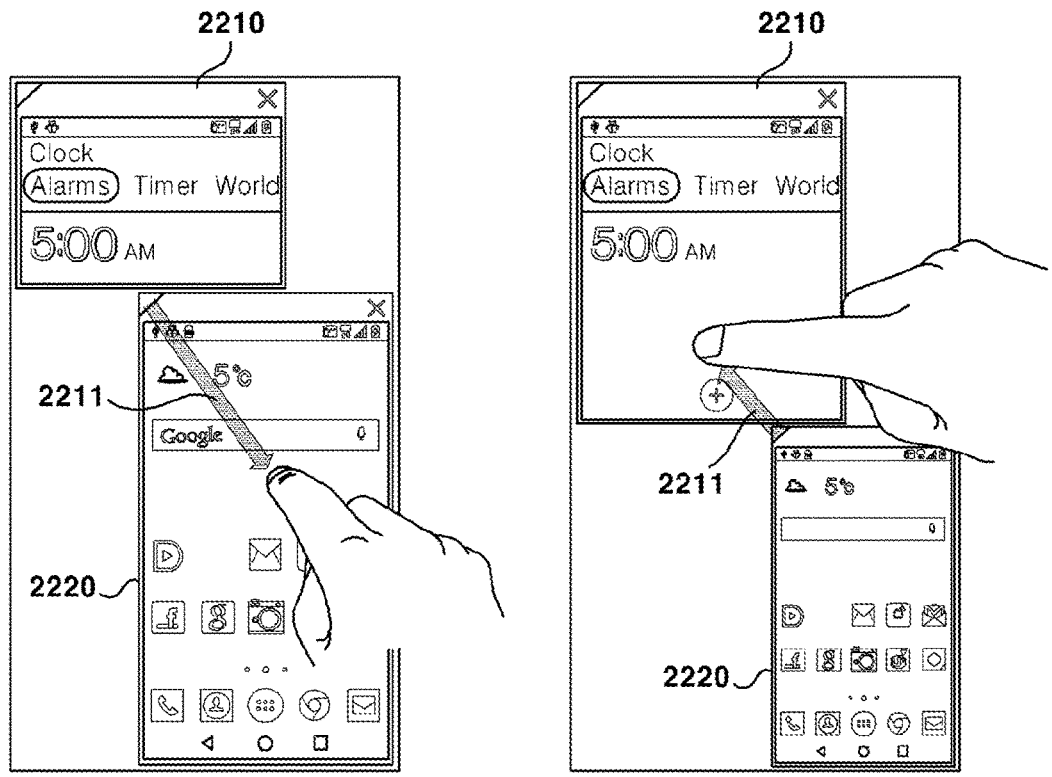
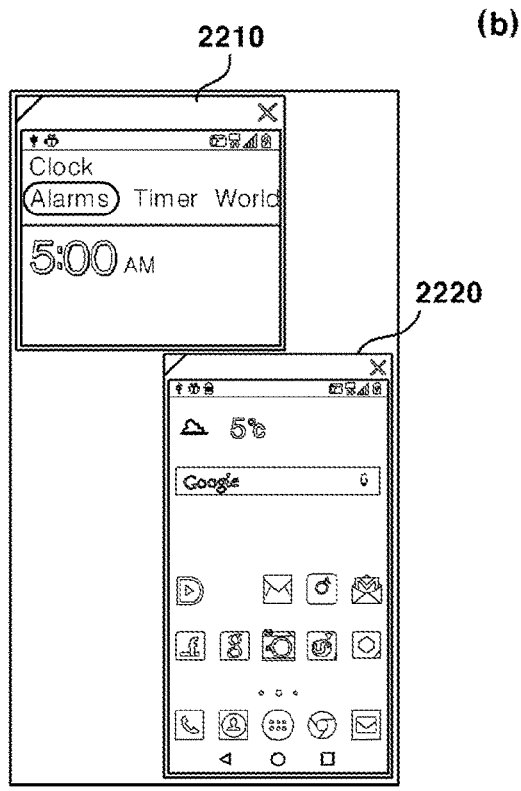

(a)   (b)

FIG. 27
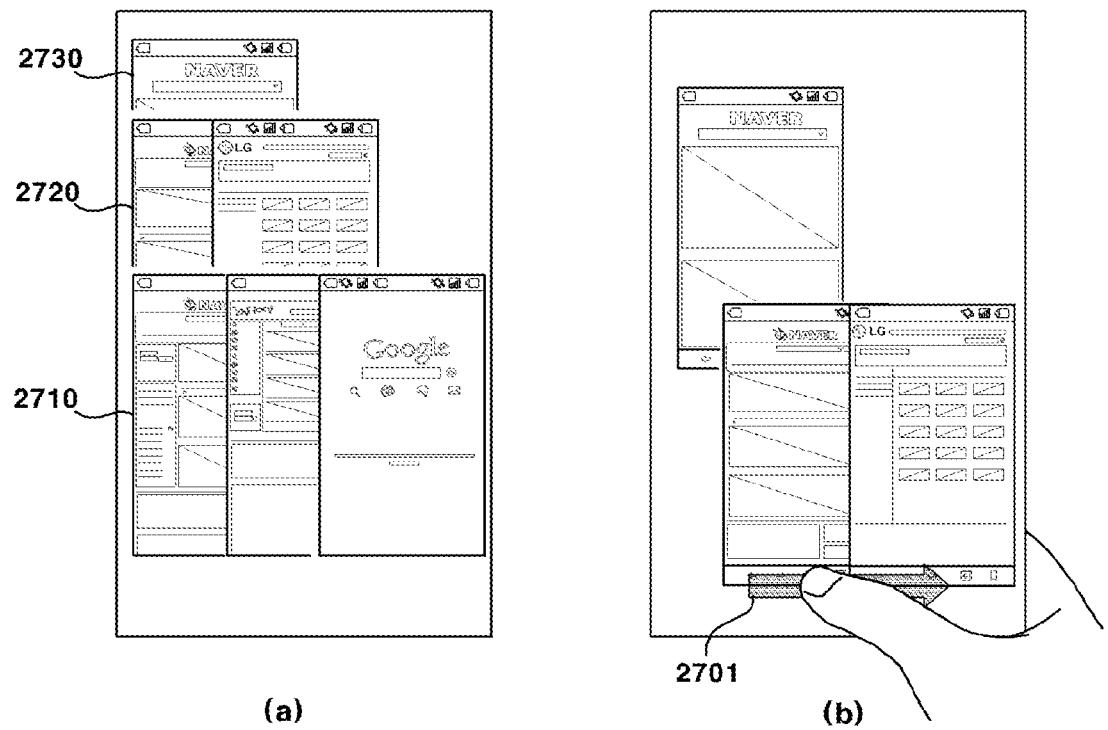
(a) (b)
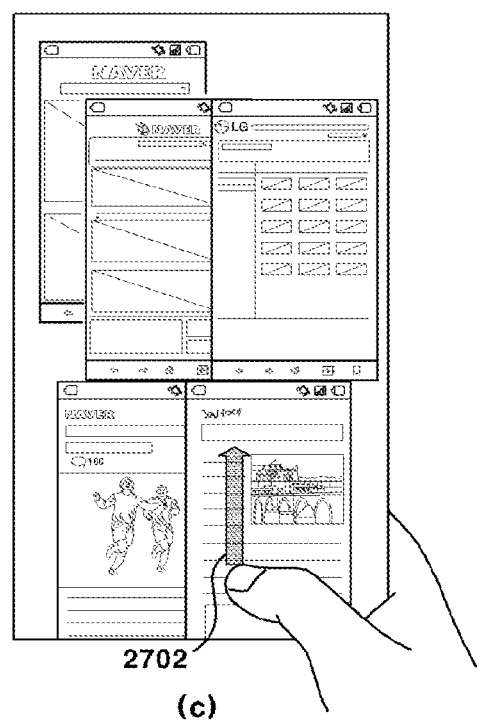
(c)

FIG. 28
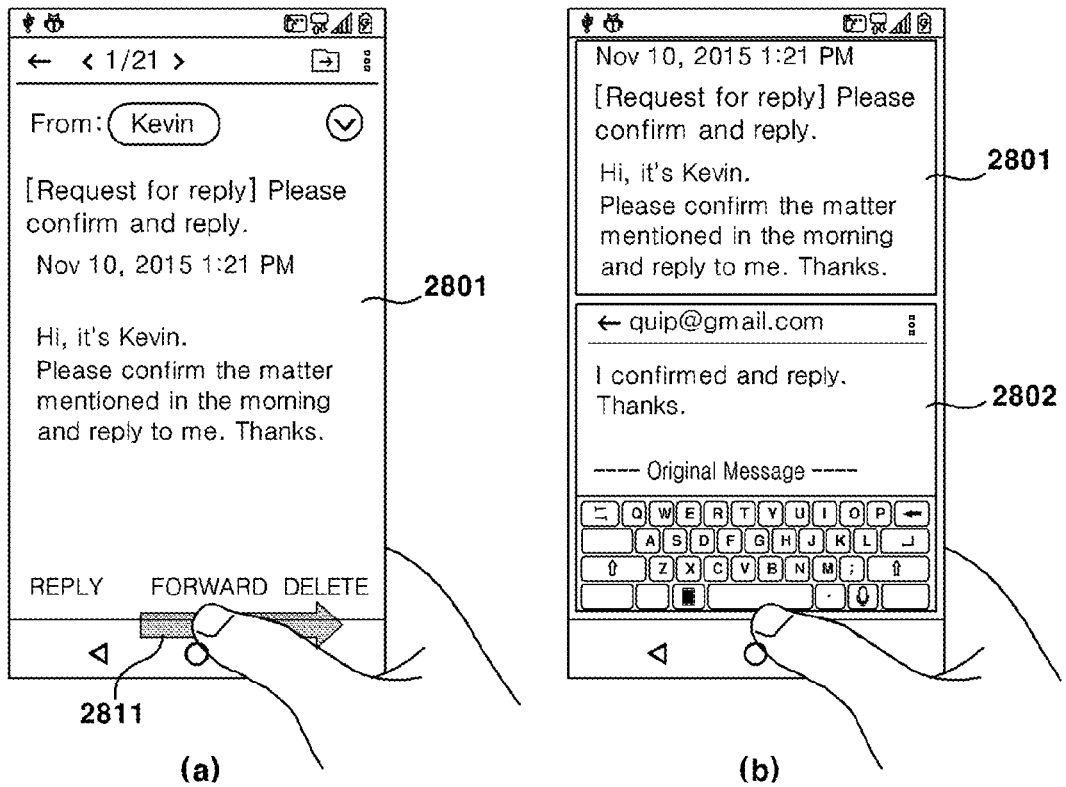
(a)  (b)
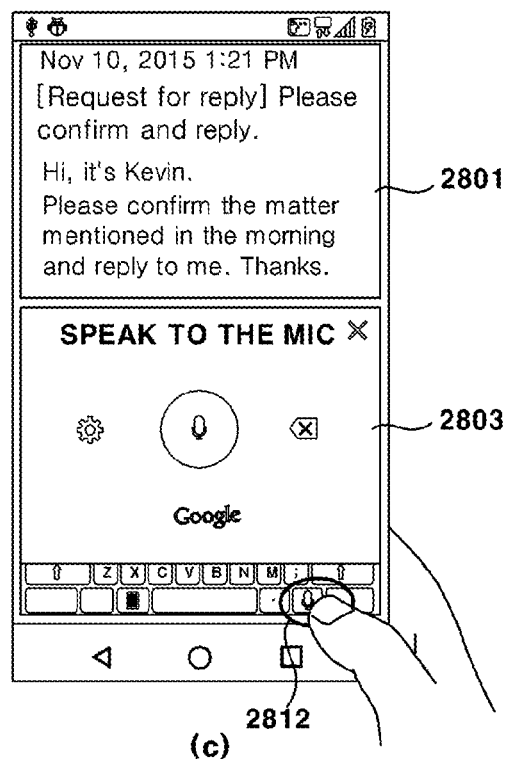
(c)

(a)             (b)

FIG. 33b
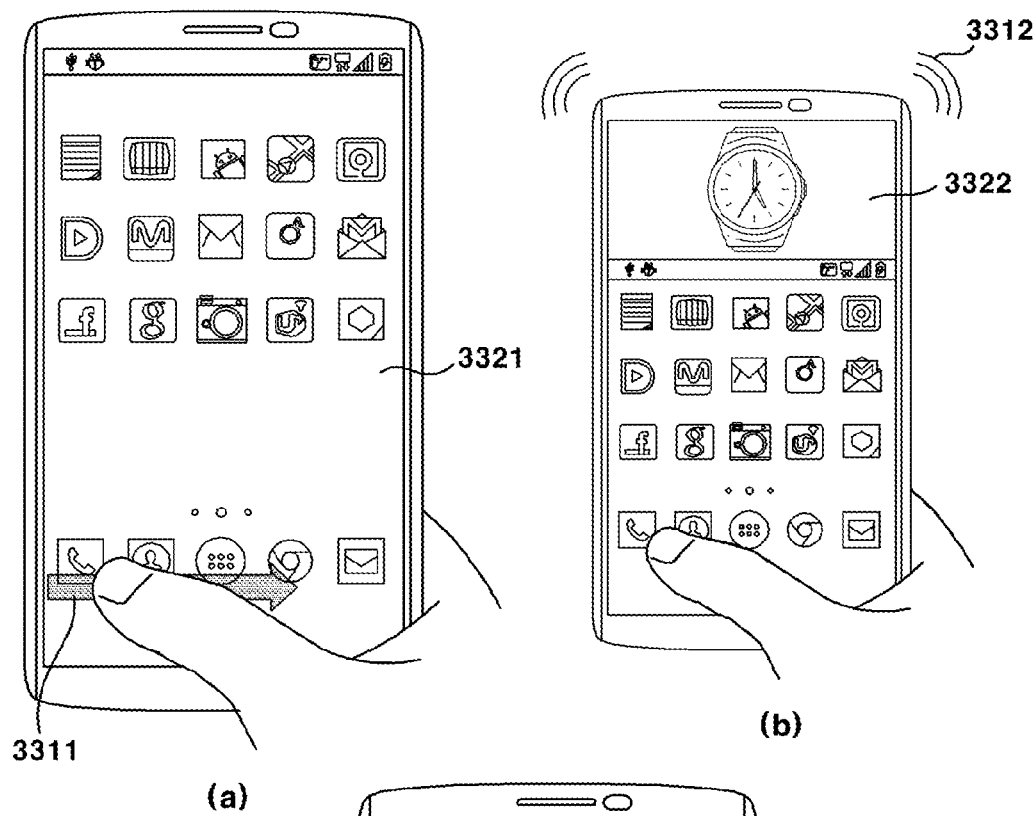
(a)  (b)
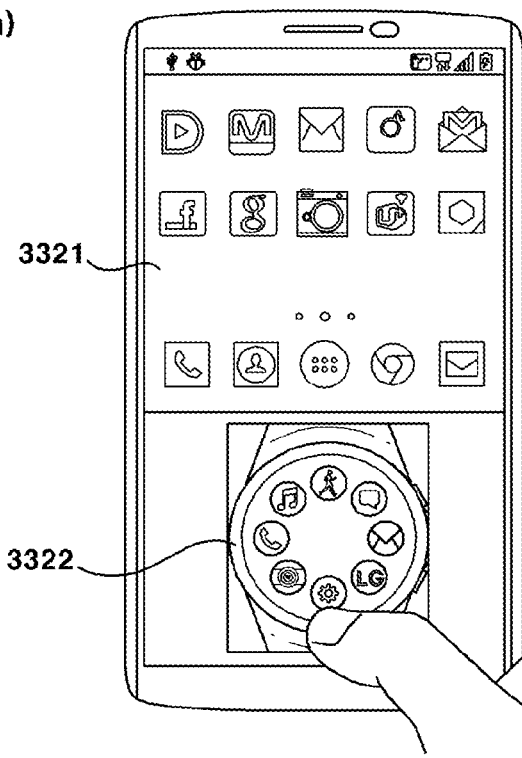
(c)

(a) (b)

(a)  (b)

(a)          (b)

(a)             (b)

(a)            (b)

(a)  (b)

FIG. 41a
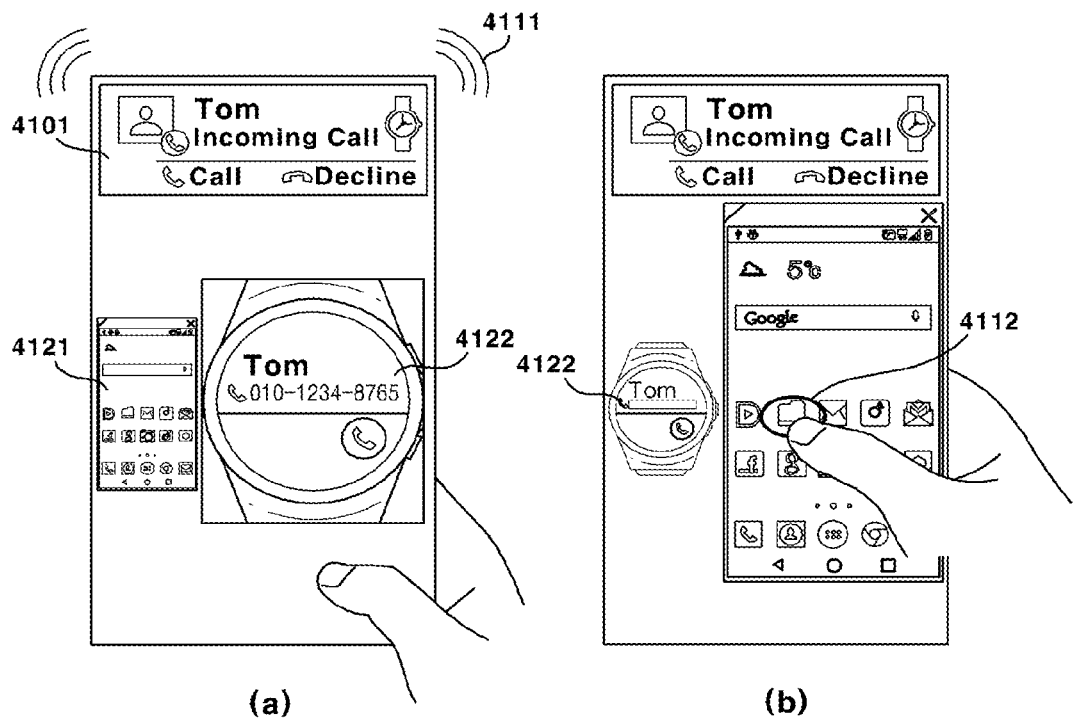
(a) (b)
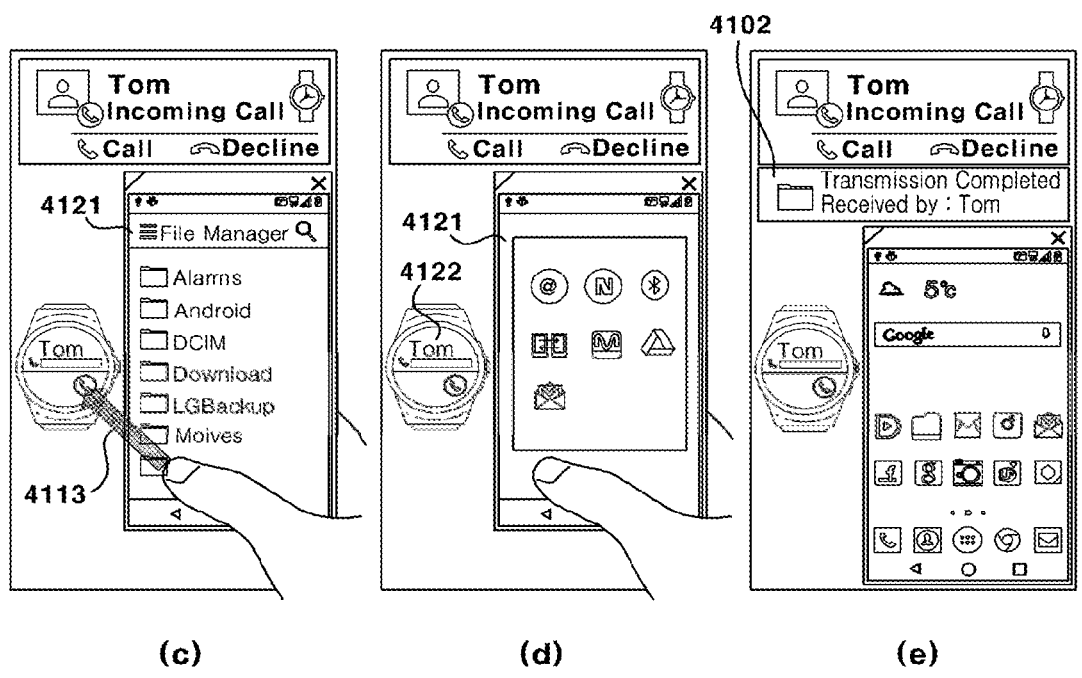
(c) (d) (e)

FIG. 42b
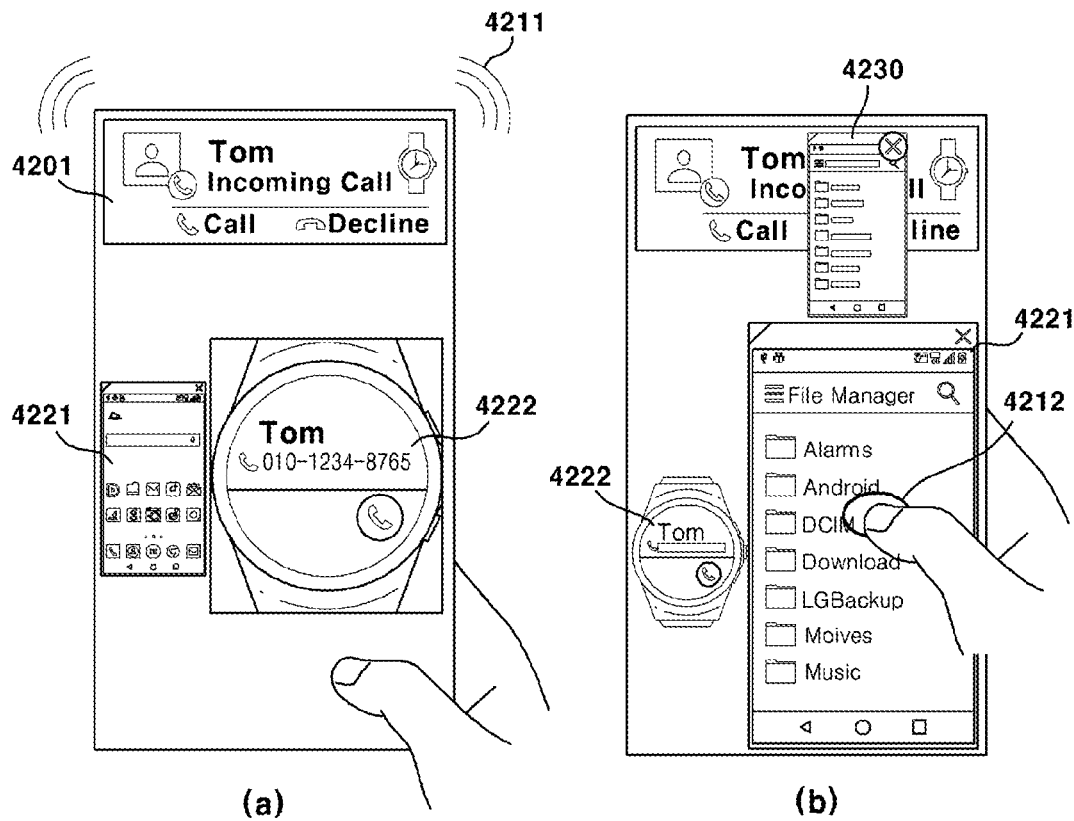
(a)      (b)
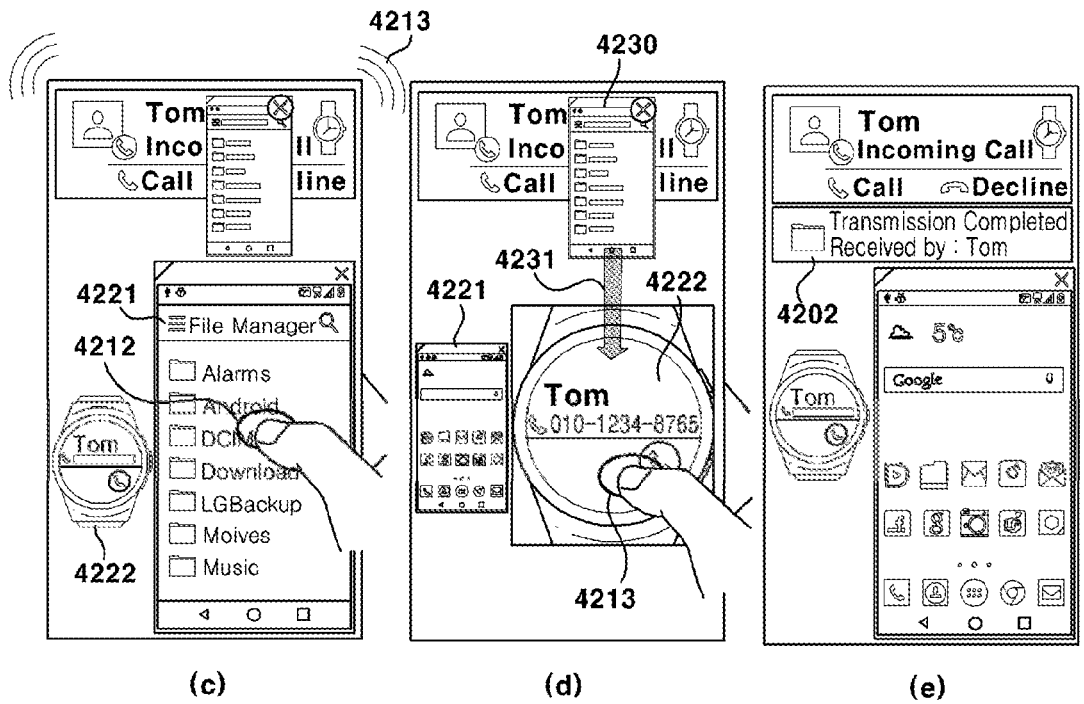
(c)      (d)      (e)

MOBILE TERMINAL FOR ONE-HAND OPERATION MODE OF CONTROLLING PAIRED DEVICE, NOTIFICATION AND APPLICATION

Pursuant to 35 U.S.C. § 119(a), this application claims the benefit of earlier filing date and right of priority to Korean Patent Application Number 10-2016-0008911, filed on Jan. 25, 2016, the contents of which are all hereby incorporated by reference herein in its entirety.

TECHNICAL FIELD

The present disclosure relates to a mobile terminal for one-hand operation mode of controlling paired devices, notification and application.

BACKGROUND

Terminals can be categorized into mobile terminals and stationary terminals according to mobility. The mobile terminals can be further comprised of handheld terminals and vehicle mount terminals according to whether users can personally carry the terminals.

Conventional terminals including mobile terminals provide an increasing number of complex and various functions, for example, such as data and voice communication, photograph and video capabilities using a camera, voice recording, music file playing using a speaker system, and outputting images or videos on a display unit. Some terminals may additionally include an electronic game player or a multimedia player. Especially, terminals in recent days may receive multicast signals providing visual contents such as broadcastings, videos, and television programs.

As functions of the terminals become diversified, the terminals are in trend of being implemented as multimedia players including complex functionalities such as photograph and video capabilities, playing music or video files, and broadcasting receptions.

To support and enhance the increasing number of functions in a terminal, improving a structural part and/or a software part of the terminal would be desirable. Especially, as display size and hardware capacity of a mobile terminal increase, demands also increase on proper use of the enlarged display size and multitasking functionality.

SUMMARY

Technical Challenge

One of purposes of the present disclosure is to provide a mobile terminal for one-hand operation mode, such that a user can conveniently and precisely control functions of the terminal such as controlling of paired devices, notifications, and applications, using only one hand of the user.

Technical Solution

In order to achieve at least the above objects, in whole or in part, and in accordance with the purposes of the present disclosure, as embodied and broadly described, and in a general aspect, there is provided a mobile terminal for one-hand operation mode, the mobile terminal may comprise: a display unit including a touch screen; a sensor unit sensing a motion; and a controller, in response to at least one of a first input applied to the touch screen, a second input applied to any portion other than the touch screen, and a motion sensed by the sensor unit, executing an one-hand operation mode to control a size of a screen displayed on the display unit or to control a position of the screen displayed on the display unit.

In some exemplary embodiments, the controller may, in response to a touch input generated in a predetermined area on the touch screen and including a flicking touch or to an input of a physical key included in the mobile terminal, execute the one-hand operation mode, generate an one-hand operation mode screen corresponding to a reduced screen of a full screen displayed on a whole of the touch screen or to a portion of the full screen, and display the one-hand operation mode screen on a position adjacent to a hand of a user holding the mobile terminal device.

In some exemplary embodiments, when the one-hand operation mode is operated, upon generation of an event relating to an application included in the mobile terminal, the controller may display a notification corresponding to the event on a remaining area except for an area displaying the one-hand operation mode screen among areas of the touch screen.

In some exemplary embodiments, the controller may change at least one of a position on which the notification is displayed, a position on which an application corresponding to the notification is executed and displayed, and a position on which the one-hand operation mode screen is displayed, or may delete the notification, in response to at least one of a motion sensed by the sensor unit, a touch input for the notification, and a touch input for a soft key generated by execution of the one-hand operation mode.

In some exemplary embodiments, the controller may, in response to touch input for the notification, display such that a screen on which the application corresponding to the notification is executed and displayed is displayed in front of the one-hand operation mode screen and overlapped with a predetermined portion of the one-hand operation mode screen.

In some exemplary embodiments, when the touch input for the notification is an input dragging the notification and dropping the notification on the one-hand operation mode screen, the controller may, in response to the drag-and-drop, display the screen on which the application corresponding to the notification is executed and displayed inside of the one-hand operation mode screen, such that the screen on which the application corresponding to the notification is executed and displayed and the one-hand operation mode screen are simultaneously displayed in front.

In some exemplary embodiments, the controller may display the notification or an execution of the application corresponding to the notification as a preview screen, or deletes the preview screen, in response to at least one of a touch input for the notification, a touch input for an icon corresponding to the application, and a touch input for a soft key generated by execution of the one-hand operation mode.

In some exemplary embodiments, when the notification notifies a received message, the controller may control at least one of displaying of a screen for writing a reply message to the received message, a method for writing the reply message, and a position on which the screen for writing a reply message is to be displayed on the touch screen, in response to the notification or to a flicking touch for the soft key in a predetermined direction.

In some exemplary embodiments, when the application is a gallery application, the preview screen may include a screen displaying an image included in the gallery application as a thumbnail format, and the controller may change any one image displayed in an enlarged size among the image displayed as a thumbnail format, upon an input of a flicking touch corresponding to a predetermined direction while a touch input for an icon corresponding to the gallery application is being maintained, in response to the predetermined direction.

In some exemplary embodiments, when the application is a camera application, the preview screen may include a screen displaying a photographing mode depending on execution of the camera application, and the controller may obtain an image of a subject depending on the photographing mode and finish displaying of the preview screen, when a touch input for the icon corresponding to the camera application is released.

In some exemplary embodiments, when the application is an email application, the preview screen may include a screen displaying an email list depending on execution of the email application, and the controller may move the email list or refresh the email list, upon an input of a flicking touch corresponding to a predetermined direction while a touch input for an icon corresponding to the email application is being maintained, in response to the predetermined direction.

In some exemplary embodiments, when a badge showing existence of an event unchecked by a user is displayed on an icon included in the one-hand operation mode screen, the controller may a notification corresponding to the event unchecked by a user on the remaining area except for an area displaying the one-hand operation mode screen among areas of the touch screen, in response to a long-touch input for the icon or to a touch input dragging out of the one-hand operation mode screen.

In some exemplary embodiments, when the full screen includes a screen displaying a scheduling application executed to display a schedule relating to a location, the controller may display a screen including at least one of location information for the location, path information from a current location to the location, and time required, on the remaining area except for an area displaying the one-hand operation mode screen among areas of the touch screen.

In some exemplary embodiments, when the full screen includes a screen displaying a conversation application executed to display information relating to a date during conversation, the controller may display a screen showing a schedule corresponding to the date or a screen for adding a new schedule to the date, on the remaining area except for an area displaying the one-hand operation mode screen among areas of the touch screen.

In some exemplary embodiments, when the full screen includes a screen displaying a navigation application executed, the controller may display a quick launch application including at least one icon corresponding to a predetermined application, on the remaining area except for an area displaying the one-hand operation mode screen among areas of the touch screen.

In some exemplary embodiments, the controller may, in response to a touch input applied to an icon displayed on the one-hand operation mode screen, display at least one notification corresponding to an event previously generated in relation to an application corresponding to the icon.

In some exemplary embodiments, the controller may scroll the at least one notification, upon an input of a flicking touch corresponding to a predetermined direction while a touch input for an icon corresponding to the email application is being maintained, in response to the predetermined direction.

In some exemplary embodiments, the controller may, in response to a touch input generated in a predetermined area on the touch screen and including a flicking touch or to an input of a physical key included in the mobile terminal, execute the one-hand operation mode, generate an one-hand operation mode screen corresponding to a reduced screen of a full screen displayed on a whole of the touch screen or to a portion of the full screen, display the one-hand operation mode screen on a position adjacent to a hand of a user holding the mobile terminal device, and display a screen showing a device paired with the mobile terminal on the remaining area except for an area displaying the one-hand operation mode screen among areas of the touch screen.

In some exemplary embodiments, the controller may change at least one of a location on which the notification is displayed, a location on which an application corresponding to the notification is executed and displayed, a location on which the one-hand operation mode screen is displayed, and a location on which the screen showing the paired device, or may select any one of the paired device and the mobile terminal as a subject of an event corresponding to the notification to be executed, in response to at least one of a motion sensed by the sensor unit, a touch input for a notification corresponding to an event relating to an application included in the mobile terminal, a touch input applied to a lower portion of the one-hand operation mode screen, and a touch input applied to a lower portion of the screen showing the paired device.

In some exemplary embodiments, when a notification corresponding to an event relating to the paired device is generated, the controller may display the notification on a remaining area except for areas displaying the one-hand operation mode screen and a screen showing the paired device among areas of the touch screen, and may display a screen including a menu for controlling the notification on a lower portion of the one-hand operation mode screen.

In some exemplary embodiments, when a telephone application is executed via the paired device, the controller may transmit a file included in the mobile terminal or a captured image of the mobile terminal to a telephone counterpart via the paired device.

Advantageous Effect

Effects of the mobile terminal according the present disclosure for one-hand operation mode in relation to control of paired devices, notifications, and applications may be described as in the following.

According to at least one of exemplary embodiments of the present disclosure, a user can, using only one hand of the user, conveniently and precisely control functions of a mobile terminal such as controlling of paired devices, notifications, and applications.

BRIEF DESCRIPTION OF DRAWINGS

FIGS. 3a to 3d illustrate examples of switching displayed positions, by moving generated notifications to lower portions, in one-hand operation mode of a mobile terminal for one-hand operation mode according to an exemplary embodiment of the present disclosure.

FIG. 4 illustrates an example of displaying a notification generated by a soft key as a preview, in one-hand operation mode of a mobile terminal for one-hand operation mode according to an exemplary embodiment of the present disclosure.

FIGS. 15 to 18 illustrate an example of executing an application as a preview and controlling the application, in one-hand operation mode of a mobile terminal for one-hand operation mode according to an exemplary embodiment of the present disclosure.

FIGS. 22a and 22b illustrate an example of changing a size of a displayed screen or scrolling a particular screen, in one-hand operation mode of a mobile terminal for one-hand operation mode according to an exemplary embodiment of the pre sent disclosure.

FIG. 27 illustrates an example of displaying a record of pages visited when using a browser, or changing the record, in one-hand operation mode of a mobile terminal for one-hand operation mode according to an exemplary embodiment of the present disclosure.

FIG. 28 illustrates an example of writing a reply email when confirming an email message, in one-hand operation mode of a mobile terminal for one-hand operation mode according to an exemplary embodiment of the present disclosure.

FIGS. 33a and 33b illustrate an example of changing display of a paired device and a displayed position of the paired device, in one-hand operation mode of a mobile terminal for one-hand operation mode according to an exemplary embodiment of the present disclosure.

FIGS. 41a and 41b illustrate an example of transmitting a file to a telephone counterpart, in one-hand operation mode of a mobile terminal for one-hand operation mode according to an exemplary embodiment of the present disclosure.

FIGS. 42a and 42b illustrate an example of transmitting a capture image to a telephone counterpart, in one-hand operation mode of a mobile terminal for one-hand operation mode according to an exemplary embodiment of the present disclosure.

DETAILED DESCRIPTION

Figure 1A:
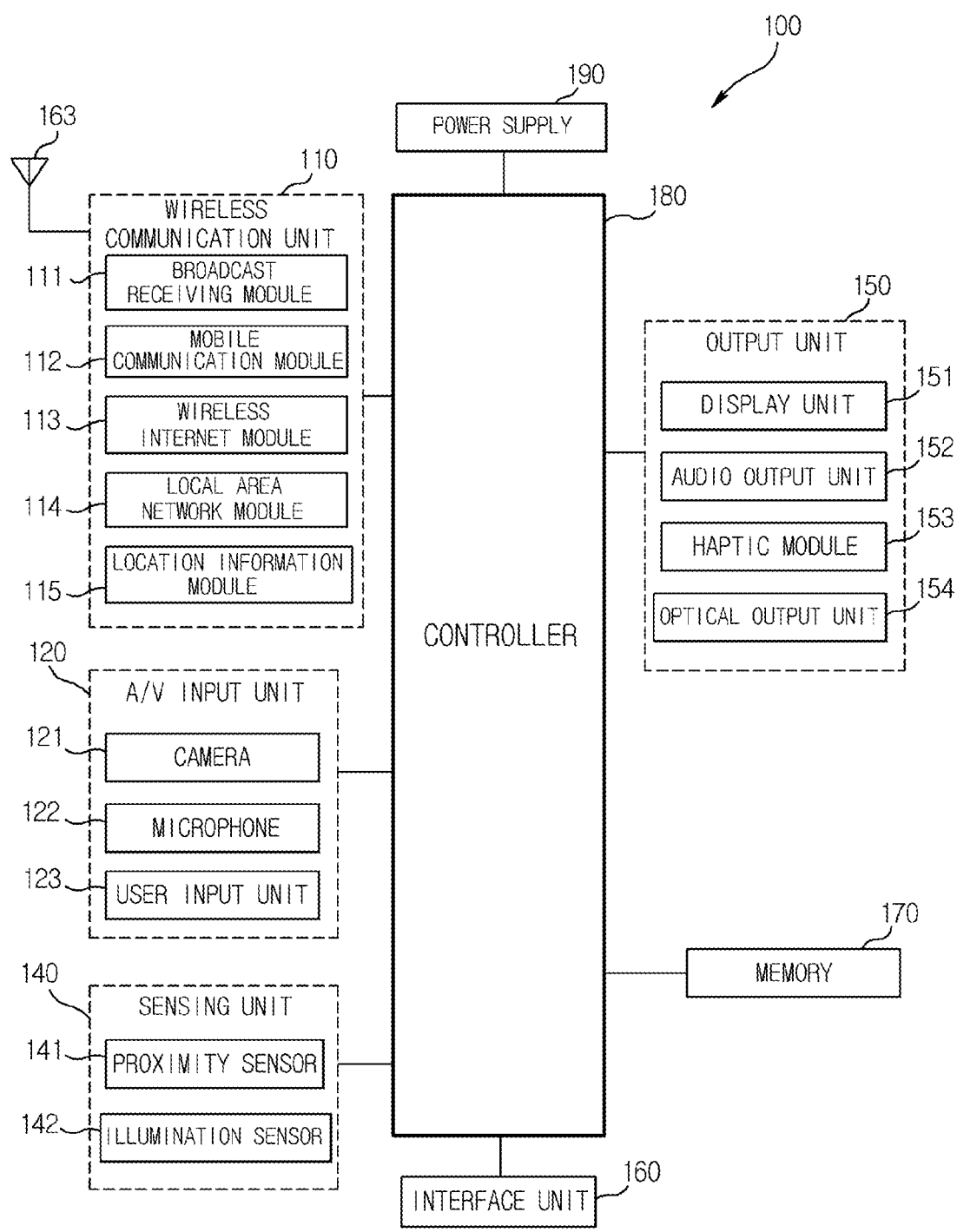
FIG. 1a is a block diagram illustrating a mobile terminal according to an exemplary embodiment of the present disclosure.

Hereinafter, some exemplary embodiments of the present disclosure will be described in detail with reference to the enclosed figures. The same reference numerals will be assigned to the same or similar elements in the explanations of the figures. Thus, the redundant explanation and description of the same configuration may be omitted.

As well, the terms for the elements used in the following descriptions, "module" and "unit" are named or combined considering only easier drafting of the disclosure. Therefore, the terms do not have any distinctive meanings or functions by themselves.

In addition, when it is determined that a detailed description about known function or structure relating to the present disclosure may evade the main point of the present disclosure, such detailed description may be omitted.

In addition, various exemplary embodiments will be described more fully hereinafter with reference to the enclosed figures, in which some exemplary embodiments are shown. The present inventive concept may, however, be embodied in many different forms and should not be construed as limited to the exemplary embodiments set forth herein. Rather, the described aspect is intended to embrace all such alterations, modifications, variations, and equivalents that fall within the scope and novel idea of the present disclosure.

Meanwhile, the terms including ordinal numbers such as "first" or "second" may be used for description of various elements. However, the elements shall not be limited by such the terms. The terms are used merely to distinguish a particular element from another element.

When an element is mentioned to be "connected" to or "accessing" another component, this may mean that it is directly connected to or accessing the other component, but it is to be understood that another element may exist in-between. On the other hand, when an element is mentioned to be "directly connected" to or "directly accessing" another element, it is to be understood that there are no other elements in-between.

As used herein, the singular forms "a", "an" and "the" are intended to include the plural forms as well, unless the context clearly indicates otherwise.

As used herein, the terms such as "include" or "have" are to state that there may be in existence of features, numbers, steps, functions, elements, components described herein, or compositions thereof. Therefore, they shall not be understood as to exclude the possibility of existence or addition of one or more other features, numbers, steps, functions, elements, components described herein, or compositions thereof.

A mobile terminal described in the present disclosure may include a mobile phone, a smart phone, a laptop computer, a digital broadcasting terminal, a PDA (Personal Digital Assistants), a PMP (Portable Multimedia Player), a navigation system, a slate PC, a tablet PC, an Ultrabook, and a wearable device {for example, a smartwatch, a smart glass, and a HMD (Head Mounted Display)}.

Meanwhile, it will be apparent to a person skilled in the art that a structure according to an exemplary embodiment of the present disclosure may be applied to a stationary terminal such as a digital TV, a desktop computer, and a digital signage system, except for a case where the structure according to an exemplary embodiment of the present disclosure is applicable only to a mobile terminal.

FIG. 1a is a block diagram illustrating a mobile terminal according to an exemplary embodiment of the present disclosure.

The mobile terminal (100) may include a wireless communication unit (110), an input unit (120), a sensing unit (140), an output unit (150), an interface unit (160), a memory (170), a controller (180), and a power supplier (190). Here, elements illustrated in FIG. 1a are not essential to implement the mobile terminal. Therefore, the mobile terminal to be described in the present disclosure may include elements more or less than enumerated in the foregoing.

In particular, the wireless communication unit (110) may include at least one module that enables wireless communication between the mobile terminal (100) and a wireless communication system, between the mobile terminal (100) and another mobile terminal, or between the mobile terminal (100) and an external server. In addition, the wireless communication unit (110) may include at least one module connecting the mobile terminal (100) to at least one network.

The wireless communication unit (110) may include at least one of a broadcast receiving module (111), a mobile communication module (112), a wireless internet module (114), and a location information module (115).

The input unit (120) may include a camera (121) (or a video input unit for inputting a video signal), a microphone (122) (or an audio input unit for inputting an audio signal), and a user input unit (123, for example, a touch key, a mechanical key, etc.) for receiving information input from a user. The audio data or video data collected by the input unit (120) may be analyzed to be used as a control command of a user.

The sensing unit (140) may include at least one sensor for sensing at least one of peripheral environment around the mobile terminal and user information. For example, the sensing unit (140) may include at least one of a proximity sensor (141), an illumination sensor (142), a touch sensor, an acceleration sensor, a magnetic sensor, a G-sensor, a gyroscope sensor, a motion sensor, an RGB sensor, an IR (infrared) sensor, a finger scan sensor, an ultrasonic sensor, an optical sensor {for example, a camera (121)}, a microphone (122), a battery gauge, an environment sensor (for example, a barometer, a hygrometer, a thermometer, a radiation sensor, a thermos sensor, a gas sensor, etc.), and a chemical sensor (for example, an electronic nose, a healthcare sensor, biometric sensor, etc.).

The output unit (150) may generate visual, auditory and/or tactile output. The output unit (150) may include at least one of a display unit (151), an audio output module (152), and a haptic module (153), and an optical output unit (154). The display unit (151) may implement a touch screen by forming a mutual layer structure along with a touch sensor or by being integrally formed with the touch sensor. The touch screen may function as a user input unit (123) for providing an input interface between the mobile terminal (100) and a user, and at the same time, may provide an output interface between the mobile terminal (100) and the user.

The interface unit (160) may serve as a path to external devices connected to the mobile device (100). The interface unit (160) may include at least one of a wired/wireless headset port, an external charger port, a wired/wireless data port, a memory card port, a port for connecting a device having a user identification module, an audio I/O port, a video I/O port, and an earphone port. The mobile terminal (100) may perform proper controls in relation to the connected external devices, in response to connection of the external devices to the interface unit (160).

In addition, the memory (170) may store data for supporting various functions of the mobile terminal (100). The memory (170) may store a plurality of application programs running in the mobile terminal (100), data and commands for operation of the mobile terminal (100). At least a part of the application programs may be downloaded from an external server through wireless communication. In addition, at least a part of the application programs may be pre-installed in the mobile terminal (100) from release time point of the mobile terminal (100), in order for basic functionalities (for example, answering calls, making calls, receiving messages, transmitting messages, etc.) of the mobile terminal (100). Meanwhile, the application program may be stored in the memory (170) and installed in the mobile terminal (100), such that the application program may being controlled by the mobile terminal (100) to perform operations (or functions) of the mobile terminal (100).

The controller (180) may generally control overall operations of the mobile terminal (100), as well as the operations relating to the application programs. The controller (180) may provide or process information or functions appropriate for the user, by processing signals, data, and/or information inputted or outputted through the aforementioned elements, or by operating the application programs stored in the memory (170).

In addition, the controller (180) may control at least a part of the elements illustrated in FIG. 1a, in order to operate the application programs stored in the memory (170). Furthermore, the controller (180) may control in combination with at least two of the elements included in the mobile terminal (100), in order to operate the application programs.

The power supplier (190) may, under control of the controller (180), be applied with external and internal electric power to supply the electric power to each of the elements included in the mobile terminal (100). The power supplier (190) may include a battery, and the battery may be a built-in battery or a replaceable battery.

At least a part of the elements may cooperate with one another, in order to implement operations, controls, and/or controlling methods of the mobile terminal (100) according to various exemplary embodiments to be described hereinafter. In addition, the operations, controls, and/or controlling methods of the mobile terminal (100) may be implemented on the mobile terminal (100) by operation of at least one of the application programs stored in the memory (170).

Hereinafter, in advance of describing various exemplary embodiments implemented through the mobile terminal (100), the aforementioned elements will be described in more detail with reference to FIG. 1a.

At first, the broadcast receiving module (111) of the wireless communication module (111) may receive broadcasting signals and/or information relating to the broadcasting from an external broadcast management server through a broadcasting channel. The broadcasting channel may include a satellite channel and a terrestrial channel. At least two of the broadcast receiving modules (111) may be provided in the mobile terminal (100), in order for simultaneous broadcast reception of at least two of broadcast channels or for switching of broadcasting channels.

The broadcasting management server may be a server that generates and transmits broadcasting signals and/or broadcasting related information or a server that receives previously created broadcasting signals and/or broadcasting related information and transmits the broadcasting signals and/or broadcasting related information to a terminal. The broadcasting signals may include not only TV broadcasting signals, radio broadcasting signals, and data broadcasting signals, but also signals in the form of a combination of a TV broadcasting signal and a radio broadcasting signal.

The broadcasting signal may be encoded according to at least one of technical standards for transmitting/receiving digital broadcasting signals (or broadcasting method, such as ISO, IEC, DVB, ATSC, etc.). The broadcast receiving module (111) may receive the digital broadcasting signals, using a method appropriate for technical specifications defined by the technical standards.

The broadcasting related information may be information on a broadcasting channel, a broadcasting program or a broadcasting service provider, and may be provided even through a mobile communication network. In the latter case, the broadcasting related information may be received by the mobile communication module (112).

The broadcasting related information may exist in various forms. For example, the broadcasting related information may exist in the form of an EPG (Electronic Program Guide) of a DMB (Digital Multimedia Broadcasting) system or in the form of an ESG (Electronic Service Guide) of a DVB-H (Digital Video Broadcast-Handheld) system. The broadcasting signal and/or broadcasting related information received through the broadcast receiving module (111) may be stored in the memory (170).

The mobile communication module (112) may transmit/receive a wireless signal to/from at least one of a base station, an external terminal and a server on a mobile communication network implemented according to technical standards for mobile communication {for example, GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), etc.}.

The wireless signal may include a voice call signal, a video telephony call signal or data in various forms according to transmission and reception of text/multimedia messages.

The wireless internet module (113) may correspond to a module for wireless Internet access and may be included in the electronic device (100) or may be externally attached to the electronic device (100). The wireless internet module (113) may be configured to transmit and receive wireless signals in a communication network according to wireless internet techniques.

The wireless internet technique used may include, for example, WLAN Wireless LAN), Wi-Fi (Wireless-Fidelity), Wi-Fi (Wireless Fidelity) Direct, DLNA Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), and LTE-A (Long Term Evolution-Advanced). The wireless internet module (113) may transmit and receive data according to at least one wireless internet technique within a range including the wireless internet techniques not enumerated in the foregoing.

From the viewpoint that wireless internet connections by techniques such as WiBro, HSDPA, HSUPA, GSM, CDMA, WCDMA, LTE, and LTE-A are made through a mobile communication network, it can be considered that the wireless internet module (113) performing wireless internet connection through the mobile communication network may be a kind of the mobile communication module (112).

The local area communication module (114) may correspond to a module for short range communication. In particular, the local area communication module (114) may support the short range communication using at least one technique of Bluetooth™, RFID (Radio Frequency Identification), IrDA (Infrared Data Association), UWB (Ultra Wideband), ZigBee, NFC (Near Field Communication), Wi-Fi (Wireless-Fidelity), Wi-Fi Direct, and Wireless USB (Wireless Universal Serial Bus). The local area network module (114) may support wireless communication through a wireless area network between the mobile terminal (100) and a wireless communication system, between the mobile terminal (100) and another mobile terminal (100), or between the mobile terminal (100) and a network where another mobile terminal (100) or an external server reside. The wireless area network may be a WPAN (Wireless Personal Area Network).

Here, the another mobile terminal (100) may be a wearable device {for example, a smartwatch, a smart glass, a HMD (Head Mounted Display), etc.} that can mutually exchange data with the mobile terminal (100) according to an exemplary embodiment of the present disclosure or can interlink with the mobile terminal (100) according to an exemplary embodiment of the present disclosure.

The local area communication module (114) may detect (or identify), around the mobile terminal (100), a wearable device communicable with the mobile terminal (100). Furthermore, the controller (180) may transmit at least some part of data processed in the mobile terminal (100) through the local area communication module (114) to the wearable device, when the detected wearable device is certified to communicate with the mobile terminal (100) according to an exemplary embodiment of the present disclosure. Therefore, a user of the wearable device may use the data processed in the mobile terminal (100) through the wearable device. For example, when the mobile terminal (100) has an incoming call, the user can have a telephone conversation using the wearable device. In addition, when the mobile terminal (100) receives a message, the user can confirm the received message through the wearable device.

The location information module (115) may obtain a location (or current location) of the mobile terminal (100). A GPS (Global Positioning System) module or a Wi-Fi (Wireless Fidelity) module may be a representative example of the location information module (115). For example, the mobile terminal (100) using the GPS module may obtain a location of the mobile terminal using a signal transmitted from GPS satellites. For another example, the mobile terminal (100) using the Wi-Fi module may obtain a location of the mobile terminal (100), based on information of a WAP (Wireless Access Point).

As occasion demands, the location information module (115) may substitutionally or additionally perform at least one function of other modules of the wireless communication unit (110), in order to obtain data relating to a location of the mobile terminal (100). The location information module (115) may correspond to a module used to obtain a location (or current location) of the mobile terminal (100), and is not limited to a module directly calculating or obtaining the location of the mobile terminal (100).

Next, the input unit (120) may serve for input of image information (or signal), audio information (or signal), data, and/or information inputted from the user. The mobile terminal (100) may include at least one camera (121). The camera (121) may process image frames, such as static images and motion pictures, obtained by an image sensor in a video telephony mode or a photographing mode. The processed image frames may be displayed on a display unit (151) or stored in the memory (170).

Meanwhile, a plurality of cameras (121) included in the mobile terminal (100) may be arranged to form a matrix structure. The mobile terminal (100) may receive a plurality of information pieces having various angles and focuses, through the camera (121) forming the matrix structure. In addition, the plurality of cameras (121) may be arranged in a stereo structure such that left images and right images can be obtained to implement three dimensional images.

The microphone (122) may process external audio signals to electrical voice data. The processed voice data may be used variously depending on functions performed in the mobile terminal (100) or depending on application programs being operated. Meanwhile, the microphone (122) may include various noise eliminating algorithms implemented to eliminate various noises generated in process of receiving external audio signals.

The user input unit (123) may receive input of information from the user. When information is inputted from the user through the user input unit (123), the controller (180) may control operation of the mobile terminal (100) in correspondence to the inputted information. The user input unit (123) may include a touch input means and a mechanical input means {or a mechanical key, such as, a button disposed on front/rear surfaces and lateral surfaces of the mobile terminal (100), a dome switch, a jog wheel, jog switch, etc.}. As an example, the touch input means may be implemented as a virtual key, a soft key or a visual key displayed on a touch screen through a software processing, or as a touch key arranged on areas other than the touch screen. Meanwhile, the virtual key or the visual key may be displayed in various forms on the touch screen. For example, the virtual key or the visual key may be implemented as graphic, text, icon, video, or a combination thereof.

Meanwhile, the sensing unit (140) may sense at least one kind of information among information in the mobile terminal (100), peripheral information around the mobile terminal (100), and user information, and may generate a sensing signal corresponding to the sensed information. Based on the sensing signal, the controller (180) may control operations or actions of the mobile terminal (100), or may perform data processing, functions, or operations in relation to the application programs installed in the mobile terminal (100). Hereinafter, typical sensors among various sensors that may be included in the sensing unit (140) will be described in more specific details.

At first, the proximity sensor (141) may correspond to a sensor configured to sense existence or non-existence of an object approaching to a predetermined sensing surface or an object present near to the sensing surface, without any mechanical contact, using infrared rays or electromagnetic force. The proximity sensor (141) may be arranged in an internal area of the mobile terminal (100) covered by the touch screen or may be arranged near to the touch screen.

The proximity sensor (141) may include, for example, a transparent photoelectric sensor, a direct reflective photoelectric sensor, a mirror reflective photoelectric sensor, a high-frequency oscillation-type proximity sensor, a capacitive proximity sensor, a magnetic proximity sensor, and an infrared proximity sensor. The proximity sensor (141) may be configured to sense proximity of an object based on change in electric field depending on proximity of an object having conductivity. In this case, the touch screen (or touch sensor) itself may be categorized as the proximity sensor.

Meanwhile, for the convenience of description, an act of approaching an object to a touch screen without contacting the touch screen such that the object can be sensed as being disposed on the touch screen will be named as "proximity touch", and an act of directly contacting an object on the touch screen will be named as "contact touch". A position on which an object is proximity-touched may correspond to a position to which the object is vertically corresponding with respect to the touch screen, when the object is proximity-touched. The proximity sensor (141) may sense proximity touches and proximity touch patterns (for example, proximity touch distance, proximity touch speed, proximity touch position, proximity touch moving status, etc.).

Meanwhile, as described in the above, the controller (180) may process data (or information) corresponding to a proximity touch action or a proximity touch pattern sensed by the proximity sensor (141). Furthermore, the controller (180) may output visual information corresponding to the processed data on the touch screen. Furthermore, the controller (180) may control the mobile terminal (100) such that difference operation or data (or information) can be processed depending on whether a touch on the same position of the touch screen is a proximity touch or a contact touch.

The touch sensor may sense a touch (or touch input) applied to the touch screen {or the display unit (151)}, using at least one of various touch types such as resistive overlay type, electrostatic capacity type, infrared ray type, ultrasonic type, magnetic field type, etc.

As an example, the touch sensor may be configured to convert change in pressure applied to a predetermined part of the touch screen or electrostatic capacity generated in a predetermined part of the touch screen into electrical input signals. The touch sensor may be configured to detect a position where a touching object touches on the touch screen, a touched area, a pressured applied when being touched, and an electrostatic capacity when being touched. Here, the touching object may correspond to an object to apply a touch on the touch sensor. For example, the touching object may be a finger, a touch pen, a stylus pen, or a pointer.

As described in the above, when a touch input for the touch sensor is generated, the signal or signals corresponding to the touch input may be delivered to a touch controller. The touch controller may process the signal or signals and transmit corresponding data to the controller (180). Thereby, the controller (180) may detect which position of the display unit (151) is touched. Here, the touch controller may be an independent component separate from the controller (180), or may be the controller (180) itself.

Meanwhile, the controller (180) may perform a different control or the same control, depending on types of the touching object touching the touch screen (or touch key provided separately from the touch screen). It may be determined by operation status of the mobile terminal or by the application program being executed, whether the different control or the same control will be performed.

Meanwhile, the touch sensor and the proximity sensor described in the above may, in combination with each other or independently, sense various types of touches such as a short or tap touch, a long touch, a multi touch, a drag touch, a flick touch, a pinch-in touch, a pinch-out touch, a swype touch, and a hovering touch.

The ultrasonic sensor may recognize position location information of a sensed subject, using ultrasonic waves. Meanwhile, the controller (180) may calculate a location of the wave source, based on information sensed by the optical sensor and a plurality of the ultrasonic sensors. The location of the wave source may be calculated based on a nature of light much faster than ultrasonic wave, that is, a fact that time for the light to reach the optical sensor is much faster than time for the ultrasonic wave to reach the ultrasonic sensor. More particularly, the location of the wave source may be calculated using time difference of the ultrasonic wave to reach the optical sensor, based on the light as a standard signal.

Meanwhile, the camera (121) as an element of the input unit (120) may include at least one of a camera sensor (for example, CCD, CMOS, etc.), a photo sensor (or image sensor), and a laser sensor.

The camera (121) and the laser sensor may, in combination with each other, sense a touch of the sensed subject with respect to a 3D image. The photo sensor may be stacked on a display element. The photo sensor may be configured to scan motions of the sensed object near to the touch sensor. More particularly, the photo sensor may include Photo Diodes and TRs (Transistors) on its rows/columns, and may scan an object disposed on or above the photo sensor, using an electrical signal changed depending on amount of light applied to the Photo Diode. That is, the photo sensor may perform a coordinate calculation of the sensed object depending on variation of light. Thereby, the location information of the sensed object may be obtained.

The display unit (151) may display (output) information processed by the mobile terminal (100). For example, the display unit (151) may display execution screen information of the application program operated in the mobile terminal (151) or UI (User Interface) information according to the execution screen information.

In addition, the display unit (151) may be configured as a 3D display unit displaying 3D images.

The 3D display unit may employ various 3D display methods, including a stereoscopic method (glass type), an autostereoscopic method (non-glass method), and a projection method (holographic method).

The audio output unit (152) may output audio data stored in the memory (170) or received from the wireless communication unit (110) in modes such as a telephony mode, a recording mode, a voice recognizing mode, and a broadcast receiving mode. The audio output unit (152) may also output audio signals relating to functions performed in the mobile terminal (100), for example, call sign receiving tones, message receiving tones, etc. The audio output unit (152) may include components such as a receiver, a speaker, and a buzzer.

The haptic module (153) may generate various tactile effects sensible by the user. Vibration may be one of representative tactile effects generated by the haptic module (153). Intension and pattern of vibrations generated by the haptic module (153) may be controlled by the user selection or the controller configuration. For example, the haptic module (153) may output a combination of different vibrations or may output a series of vibrations.

In addition to the vibration, the haptic module (153) may generate various tactile effects, such as arrangement of pins vertically reciprocating with respect to a contacting skin surface, jet force or suction force of air through a jet nozzle or a suction nozzle, brushing on a skin surface, contact of an electrode, effects by stimulations such as electrostatic force, effects by cold/warm sense reproduction using heat-absorbable/heat-emittable elements, etc.

The haptic module (153) may deliver tactile effects through direct contacts, and may be implemented as well, such that the user can sense the tactile effects through kinesthesia (muscular sense) of a finger or an arm. More than two of the haptic module (153) may be provided depending on configuration aspects of the mobile terminal (100).

The optical output unit (154) may output a signal for notifying generation of an event, using light of a light source of the mobile terminal (100). Examples of events generated by the mobile terminal (100) may include message reception, call sign reception, unanswered call, alarm, schedule notification, email reception, and information reception through application.

The signal outputted by the optical output unit (154) may be implemented whereby the mobile terminal (100) emits light in a single or plurality of colors toward a front or rear surface. The signal out may be finished when the mobile terminal (100) detects that the user confirms an event.

The interface unit (160) may serve as a connecting path with all external devices connected to the mobile terminal (100). The interface unit (160) may receive data or electric power from the external devices, and may deliver the received data or electric power to each component in the mobile terminal (100). For example, the interface unit (160) may include wired/wireless headset ports, an external charger port, wired/wireless data ports, a memory card port, a port for connecting a device including an identification module, audio I/O (Input/Output) ports, video I/O (Input/Output) ports, and an earphone port.

Meanwhile, the identification module may be a chip storing various information for certifying user authority of the mobile terminal (100), and may include a UIM (User Identify Module), a SIM (Subscriber Identity Module), and a USIM (Universal Subscriber Identity Module). The device including an identification module (hereinafter referred to as "identification device") may be manufactured in a form of a smart card. Therefore, the identification device may be connected to the mobile terminal (100) through the interface unit (160).

In addition, when the mobile terminal (100) is connected to an external cradle, the interface unit (160) may be a passage for supplying power from the cradle to the mobile terminal (100), or a passage for transmitting various instruction signals input to the cradle by the user to the mobile terminal (100). Various instruction signals or power input from the cradle may be operated as a signal for notifying that the mobile terminal (100) is accurately mounted in the cradle.

The memory (170) may store a program for operating the controller (180) and may temporarily store input/output data such as a phonebook, a message, a still image, and a motion picture. The memory unit (170) may store data relating to vibration and sound of various patterns to be output when the touch screen is touched.

The memory unit (170) may include at least one storage medium of a flash memory type, a hard disk type, a solid state disk type, a silicon disk drive type, a multimedia card micro type, a card type memory {for example, an SD (Secure Digital) memory or an XD (Extreme Digital) memory}, a RAM (Random Access Memory), an SRAM (Static Random Access Memory), a ROM (Read-Only Memory), an EEPROM (Electrically Erasable Programmable Read-Only Memory), a PROM (Programmable Read-Only Memory)}, a magnetic memory, a magnetic disk, and an optical disk. The mobile terminal (100) may be operated in relation with a web storage performing a storage function of the memory unit (170) via the internet.

Meanwhile, as described in the above, the controller (180) may control general operations of the mobile terminal (100), including operations relating to the application programs. For example, the controller (180) may run or release locked status restricting input of commands by the user for controlling the application programs, when the status of the mobile terminal (100) satisfies a predetermined condition.

In addition, the controller (180) may perform the control and a processing related to audio dedicated communication, data communication, and audiovisual communication, and may perform a pattern recognition processing that can recognize hand writing input or drawing input performed on the touch screen as a character and an image, respectively. Further, the controller (180) may control any one or a combination of a plurality of the elements described in the foregoing, in order to implement various exemplary embodiment (to be described hereinafter) on the mobile terminal (100) according to an exemplary embodiment of the present disclosure.

The power supplier (190) may receive external electric power and internal electric power by the control of the controller (180) to supply electric power necessary for operating constituent elements. The power supplier (190) may include a battery. The battery may be a rechargeable built-in battery. Alternatively, the battery may be detachably coupled to the terminal body in order for recharging.

In addition, the power supplier (190) may include a connecting port. The connecting port may be configured as an exemplary embodiment of the interface unit (160) electrically connected with an external charger supplying electric power in order for charging to the battery.

Alternatively, the power supplier (190) may be configured such that the battery can be charged in a wireless manner without using the connecting port. In this case, the power supplier (190) may receive electric power from an external wireless electric power transmitter using at least one of an inductive coupling method based on magnetic induction phenomenon and a magnetic resonance coupling method based on electromagnetic resonance phenomenon.

Meanwhile, various exemplary embodiments (to be described hereinafter) of the present disclosure may be implemented in a recording medium that can be read by a computer or a similar device using software, hardware or a combination thereof.

Meanwhile, the mobile terminal (100) is not limited to a hand-held device, but may be expanded to a wearable device that can be worn on a body of the user. The wearable device may include a smart watch, a smart glass, an HMD (Head Mounted Display). Hereinafter, some examples of the mobile terminal expandable to the wearable device will be described.

The wearable device may mutually exchange data with the mobile terminal (100), or may be linked with the mobile terminal (100). The local area network module (114) may detect or recognize a wearable device communicable with the mobile terminal (100) in a periphery of the mobile terminal (100).

Furthermore, when the detected wearable device is a device certified to communicate with the mobile terminal (100), the controller (180) may transmit at least some part of data processed in the mobile terminal (100) through the local area network module (114) to the wearable device. Therefore, the user may use the data processed in the mobile terminal (100) through the wearable device. For example, the user may have a telephone conversation with the wearable device, when the mobile terminal (100) has an incoming call. In another example, the user may confirm a message with the wearable device, when the mobile terminal (100) receives a message.

Meanwhile, a watch-type mobile terminal may include a main body including a display unit and a band connected to the main body to be wearable on a wrist of a user. In general, the watch-type mobile terminal may include features of the mobile terminal (100) illustrated in FIG. 1*a*, or features similar thereto.

The main body may include a case forming an external appearance. The case may include first and second cases proving internal space for accommodating various electronic components. However, the present disclosure is not limited hereto. Therefore, a single case may the internal space, such that a unibody mobile terminal may be implemented.

The watch-type mobile terminal may be configured to allow wireless communication. An antenna for the wireless communication may be installed at the main body. Moreover, the antenna may expand its performance by using the case. For example, a case including a conductive material is electrically connected to the antenna to expand a ground area or a radiation area.

The display unit may be disposed at the front of the main body to output information and a touch sensor may be equipped at the display unit to be implemented as a touch screen. A window of the display unit may be mounted at the first case to form the front of the terminal body together with the first case.

The main body may include a sound output unit, a camera, a microphone, and a user input unit. When the display unit is implemented as a touch screen, it may function as the user input unit and accordingly, no separate additional key may be provided at the main body.

The band may be worn on the wrist to surround the wrist and may be formed of a flexible material in order for easy wearing. As such an example, the band may be formed of leather, rubber, silicon, and synthetic resin. In addition, the band may be configured to be detachably attached to the main body, such that the band may be replaced with various forms of bands according to user preferences.

Meanwhile, the band may be used to expand the performance of an antenna. For example, a ground expansion unit (not shown) expanding the ground area may be built in the band, such that the antenna may be electrically connected to the ground expansion unit.

The band may include a fastener. The fastener may be implemented by a buckle, a snap-fit available hook structure, or velcro (a brand name), and may include a stretchable interval or material.

Hereinafter, some exemplary embodiments of the present disclosure will be described in detail with reference to the enclosed figures. It will be apparent to the persons skilled in the art that the present disclosure may be variously altered or modified within a range of spirits and essential features of the present disclosure.

Figure 1B:
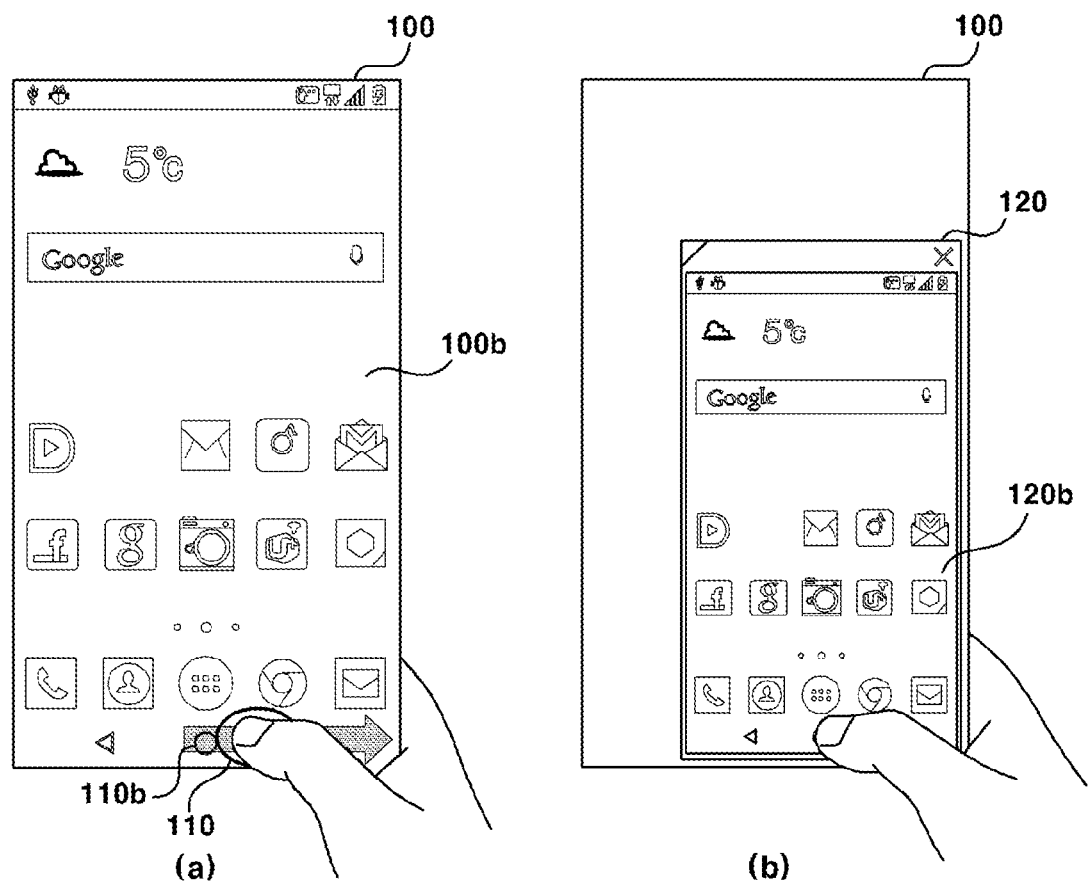
FIGS. 1b and 1c illustrate examples of entering one-hand operation mode in a mobile terminal for one-hand operation mode according to an exemplary embodiment of the present disclosure.
Figure 1C:
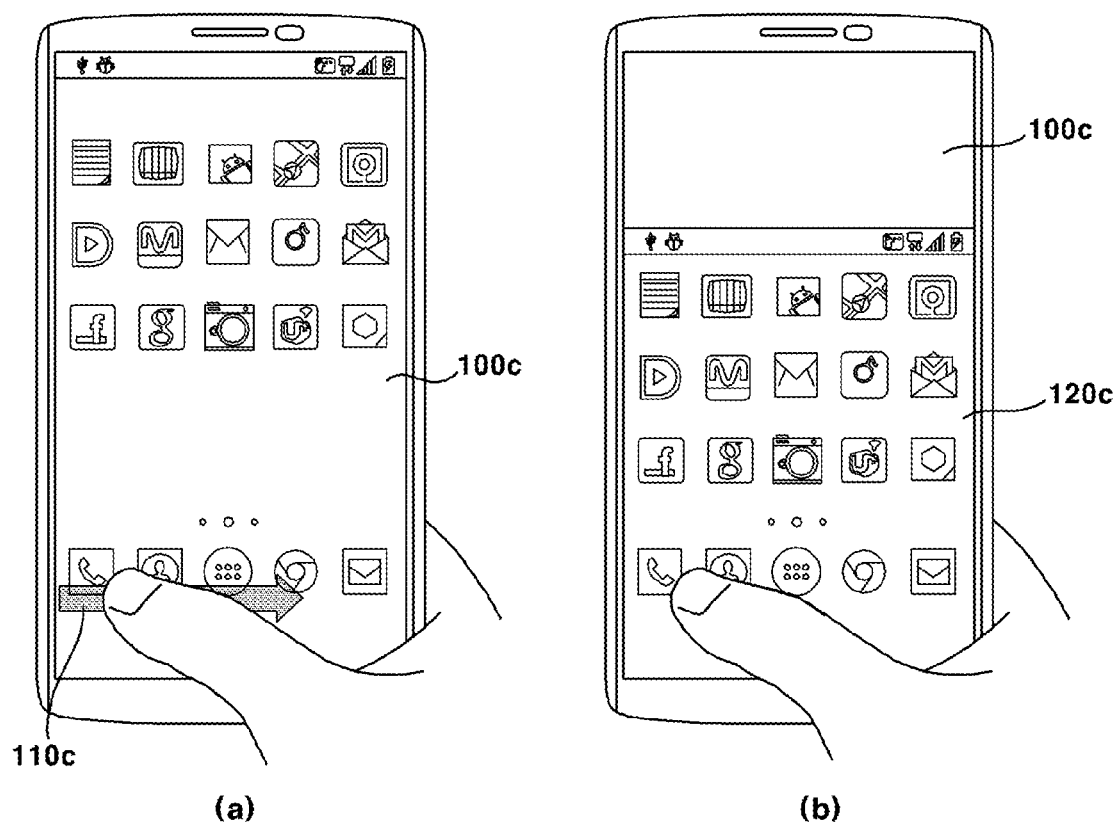

FIGS. 1*b* and 1*c* illustrate examples of entering one-hand operation mode in a mobile terminal for one-hand operation mode according to an exemplary embodiment of the present disclosure.

Referring to FIGS. 1*b* and 1*c*, the mobile terminal according to an exemplary embodiment of the present disclosure may be implemented to enter a one-hand operation mode (120*b*, 120*c*), when the mobile terminal receives a flicking input (110*b*, 110*c*) or an input operating a key (soft key or physical key, not illustrated) n-times (for example, twice, thrice, etc.) on the touch screen from the user.

Here, the one-hand operation mode (120*b*, 120*c*) may include both of the case where a screen (100*b*) displayed on a whole of the touch screen is reduced (120*b*) to be moved adjacent to a position on which the user holds the mobile terminal with one hand (FIG. 1*b*), and the case where the screen (100*b*) displayed on a whole of the touch screen is not reduced (120*c*) to be moved adjacent to a position on which the user holds the mobile terminal with one hand (FIG. 1*c*). That is, the one-hand operation mode is a mode where icons displayed on the touch screen are arranged adjacent to a single hand of the user holding the mobile terminal.

Hereinafter, for the convenience of description, the hand-one operation mode will be described with reference to the screen (120*b*) being reduced and moved illustrated in FIG. 1*b*.

Figure 2A:
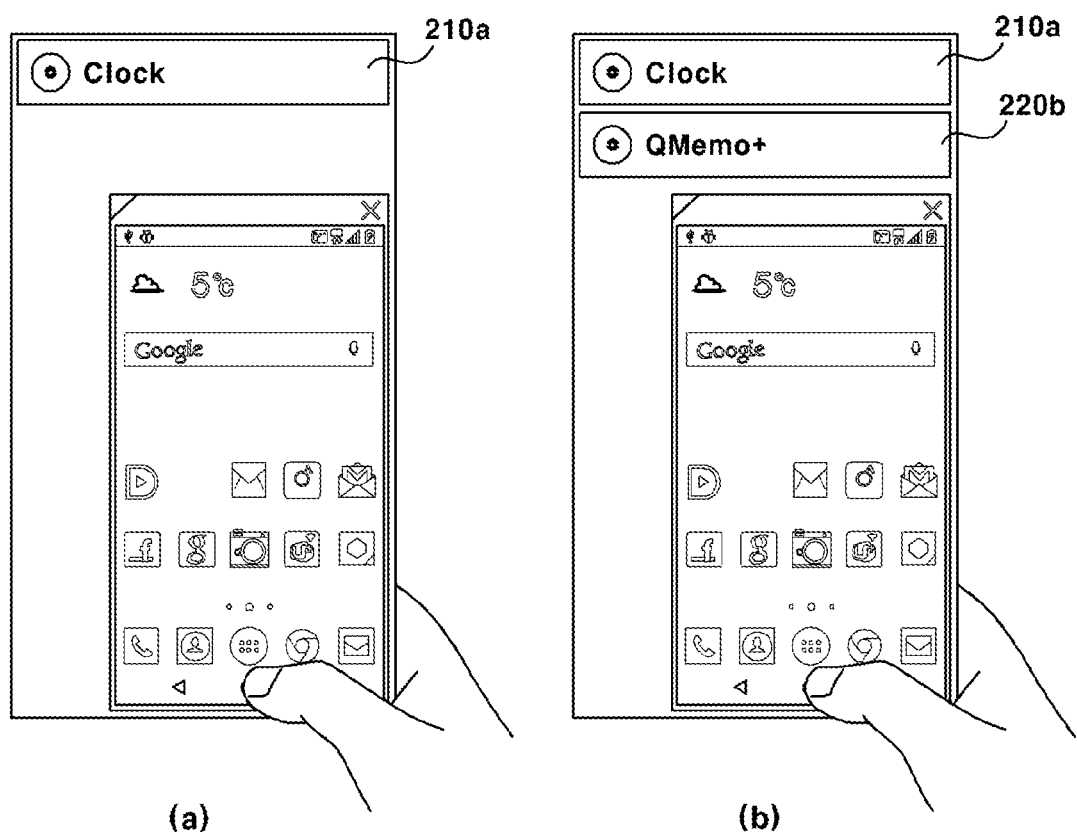
FIGS. 2a and 2b illustrate examples of generating notifications in one-hand operation mode of a mobile terminal for one-hand operation mode according to an exemplary embodiment of the present disclosure.
Figure 2B:
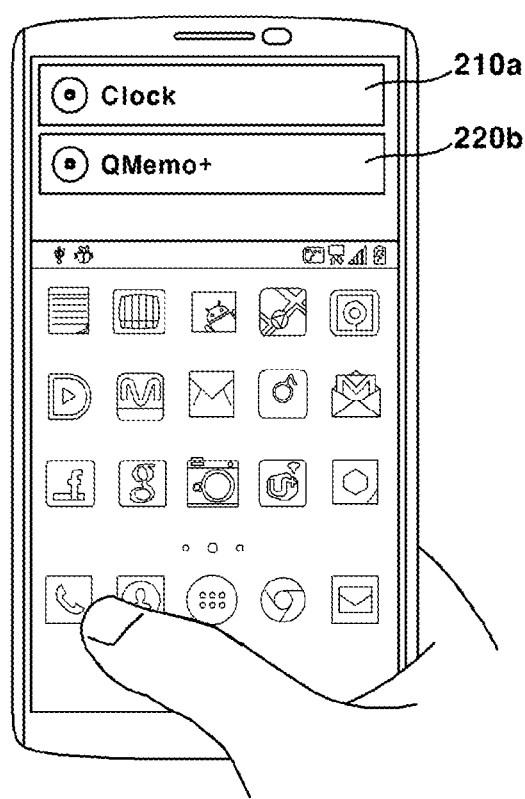

FIGS. 2*a* and 2*b* illustrate examples of generating notifications in one-hand operation mode of a mobile terminal for one-hand operation mode according to an exemplary embodiment of the present disclosure.

Referring to FIGS. 2*a* and 2*b*, when a notification is generated in the mobile terminal for one-hand operation mode according to an exemplary embodiment of the present disclosure, the generated notification (210*a*, 210*b*, 220*a*, 220*b*) may be displayed on an external screen (remaining screen) of the screen that is converted to the one-hand operation mode and displayed.

Here, as illustrated in FIGS. 2*a* and 2*b*, the position on which the generated notification (210*a*, 210*b*, 220*a*, 220*b*) is displayed is an upper portion of the external screen. However, the present disclosure is not limited hereto. Thus, the generated notification may be displayed on a right or left portion (not illustrated).

In general, when the mobile terminal is not in the one-hand operation mode, that is, the screen is displayed on a whole of the touch screen, a mini (small) icon symbolizing the relevant notification may be displayed on a top portion of the touch screen. In this case, the user may apply a touch input on the mini icon displayed on the top portion to confirm (recognize) the relevant notification. However, according to the recent trend of enlargement in size of the touch screen on the mobile terminal, it is hard for the user to apply a touch input on the mini icon at the top portion using one hand. Therefore, the user has to accept inconvenience of using another hand (other than the hand holding the mobile terminal) to apply the relevant touch input.

However, as illustrated in FIGS. 2a and 2b, the mobile terminal for one-hand operation mode according to an exemplary embodiment of the present disclosure may display the generated notification (210a, 210b, 220a, 220b) itself on the external screen except for the one-hand operation mode screen. Therefore, according to an exemplary embodiment of the present disclosure, the user is not required to apply a touch input on the top portion in order to confirm (recognize) the generated notification.

Meanwhile, in order for execution of the application program for the generated notification, a touch input for the notification is required to be applied. According to an exemplary embodiment of the present disclosure, the user can confirm (recognize) and execute the generated notification using only one hand, because the generated notification may be moved adjacent to the one hand holding the mobile terminal.

Hereinafter, in a mobile terminal for one-hand operation mode according to an exemplary embodiment of the present disclosure, an example of switching a position on which the notification for executing the generated notification will be described in detail.

FIGS. 3a to 3d illustrate examples of switching displayed positions, by moving generated notifications to lower portions, in one-hand operation mode of a mobile terminal for one-hand operation mode according to an exemplary embodiment of the present disclosure.

At first, referring to FIG. 3a, the mobile terminal for one-hand operation mode according to an exemplary embodiment of the present disclosure may include a motion sensor (for example, a gyro sensor). By means of this sensor, when the user flicks or shake the mobile device at once {311a, (b) of FIG. 3a}, the uppermost notification (301) among the notifications (301, 302) displayed at an upper portion of the mobile terminal may be moved to a lower portion of the mobile terminal ((c) of FIG. 3a). When the user flicks or shake the mobile terminal once more in succession {311a, (d) of FIG. 3a}, another uppermost notification (302) at the current state may be moved to the lower portion of the mobile terminal, and the notification (301) previously disposed at the lower portion may be moved to the upper portion, such that the positions of the displayed notifications may be switched with each other {(e) of FIG. 3a}.

That is, the user can move the mobile terminal with one hand, such that the notification disposed at the upper portion can be conveniently displaced to the lower portion of the mobile terminal.

In addition, referring to FIG. 3b, when a notification (303) is generated in one-hand operation mode of a mobile terminal according to an exemplary embodiment of the present disclosure, a soft key (310) may be generated and activated on a touch screen {(b) of FIG. 3b}.

Here, the position of the soft key (310) generated on the touch screen may be arranged on an area adjacent to the user's hand holding the mobile terminal, or may be arranged at a lower portion of the one-hand operation mode screen, as illustrated in FIG. 3b.

Meanwhile, although it is not illustrated in FIG. 3b, instead of the soft key, a floating icon in response to the generated notification may be generated and activated on the touch screen of a mobile terminal according to an exemplary embodiment of the present disclosure.

Afterwards, when the user applies a touch input (311b) on the activated soft key (310) {(c) of FIG. 3b}, the notification (303) displayed at the upper portion may be moved to the lower portion {(d) of FIG. 3b}.

That is, the user can conveniently move the notification displayed at the upper portion to the lower portion, by operating the activated soft key (310) with the user's one hand holding the mobile terminal.

In addition, as illustrated in FIG. 3c, when a plurality of notifications (304, 305) is generated in the mobile terminal for one-hand operation mode according to an exemplary embodiment of the present disclosure, the user may apply a touch input (311c) on the soft key (310) as previously described in FIG. 3b, such that the uppermost notification (304) among the notifications (304, 305) displayed at the upper portion may be moved to the lower portion {(b) of FIG. 3c} to switch the positions of displayed notifications {(c) of FIG. 3c}.

Figure 3D:
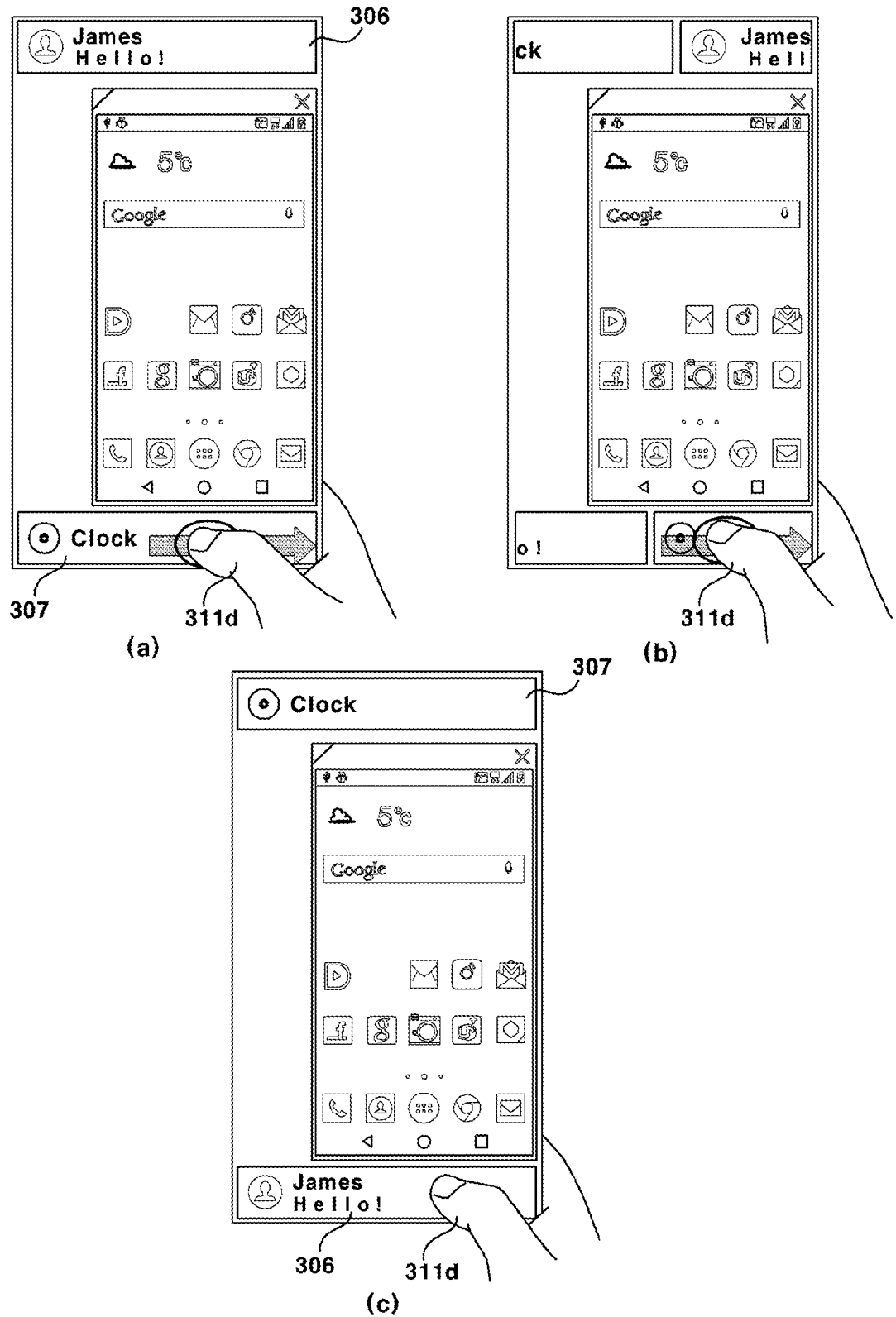

Furthermore, as illustrated in FIG. 3d, when a plurality of notifications (306, 307) is generated on the mobile terminal for one-hand operation mode according to an exemplary embodiment of the present disclosure, and one notification (307) among the notifications (306, 307) is moved to the lower portion {(a) of FIG. 3d}, the user may apply a touch input flicking (311d) the notification (307) disposed at the lower portion to control the mobile terminal with one hand, such that the positions of the displayed notifications (306, 307) can be switched with each other {(c) of FIG. 3d}.

Meanwhile, as illustrated in FIG. 3d, according to an exemplary embodiment of the present disclosure, an animation effect is provided such that the user can visually recognize that the notification (306) at the upper portion is moved down to the lower portion and the notification (307) at the lower portion is moved up to the upper portion {(b) of FIG. 3d}.

That is, the user may flick the notification disposed at the lower portion with one hand holding the mobile terminal to conveniently move the notification disposed at the upper portion to the lower portion.

FIG. 4 illustrates an example of displaying a notification generated by a soft key as a preview, in one-hand operation mode of a mobile terminal for one-hand operation mode according to an exemplary embodiment of the present disclosure.

Meanwhile, an exemplary embodiment using a soft key will be described hereinafter. However, the present disclosure is not limited hereto, because the soft key is one of examples that represent a structure for receiving a touch input of the user. In particular, the structure for receiving a touch input of the user may include a soft key or a visual key displayed on the touch screen, and touch keys arranged at other areas of the mobile terminal except for the touch screen as well.

Referring to FIG. 4, the mobile terminal for one-hand operation mode according to an exemplary embodiment of the present disclosure may generate and activate a soft key (410) on a touch screen {(b) of FIG. 4}, when a notification (401) is generated in the one-hand operation mode.

In this state, when the user applies a long touch on the soft key (410) displayed by being activated {(c) of FIG. 4}, the mobile terminal according to an exemplary embodiment of the present disclosure may display a preview screen (402)

corresponding to the displayed notification (401) on an external screen {(d) of FIG. 4}. Afterwards, when the long touch (411) input is released, the preview screen (402) displayed on the external screen may disappear.

That is, the user can conveniently confirm the notification disposed at the upper portion, by input a long touch on the soft key with a single hand holding the mobile terminal.

Meanwhile, although it is not illustrated in FIG. 4, the mobile terminal according to an exemplary embodiment may display a preview screen corresponding to the displayed notification on the external screen, when a force touch (not the long touch) is applied on the soft key. As used herein, the force touch may refer to a touch input where the input is categorized depending on the pressure applied on the touch screen, such that different functions can be implemented.

Figure 5:
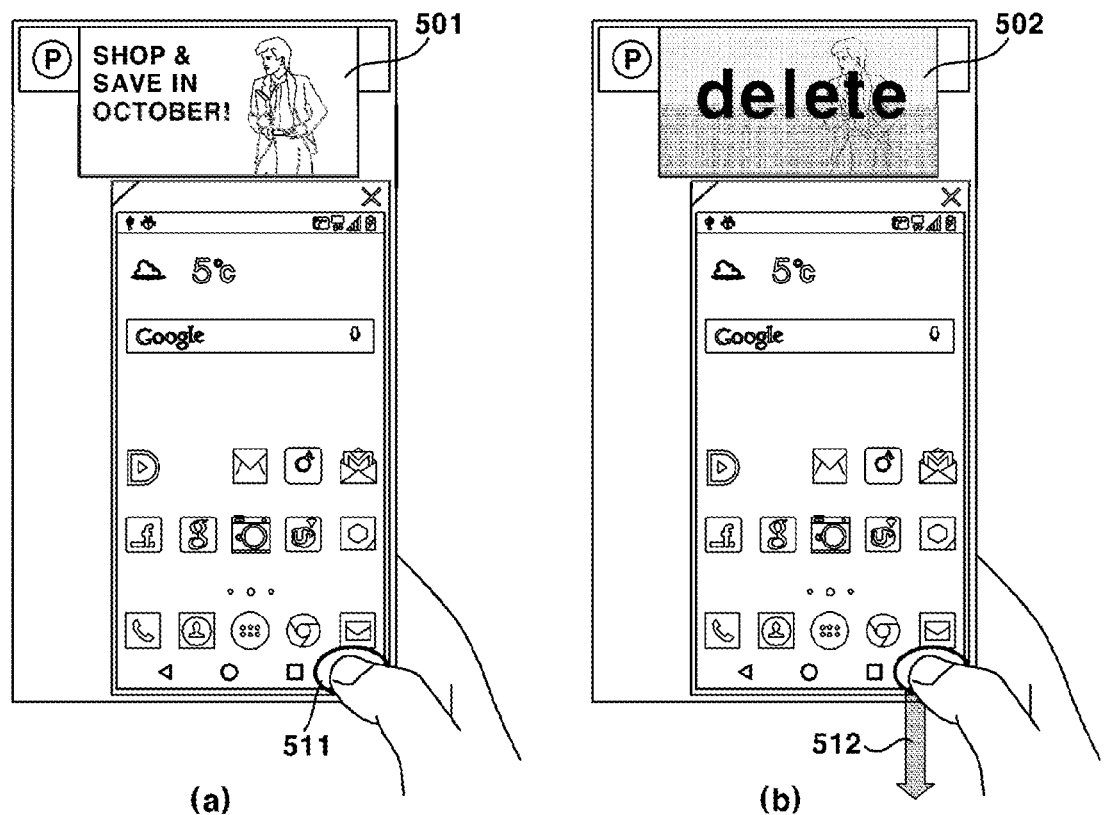
FIG. 5 illustrates an example of deleting a preview of a notification generated by a soft key, in one-hand operation mode of a mobile terminal for one-hand operation mode according to an exemplary embodiment of the present disclosure.

FIG. 5 illustrates an example of deleting a preview of a notification generated by a soft key, in one-hand operation mode of a mobile terminal for one-hand operation mode according to an exemplary embodiment of the present disclosure.

Referring to FIG. 5, the previously described (d) of FIG. 4 is displayed at (a) of FIG. 5. That is, the preview screen (501) corresponding to a long touch (511) input on the soft key is displayed on the external screen.

During the preview screen (501) being executed, when the user flicks (512) down the soft key while keeping on the long touch (511), the preview screen (501) may be deleted {(b) of FIG. 5}.

That is, the user can conveniently delete the preview screen of the generated notification, by applying a flicking input while keeping the long touch on the soft key with a single hand holding the mobile terminal.

Figure 6:
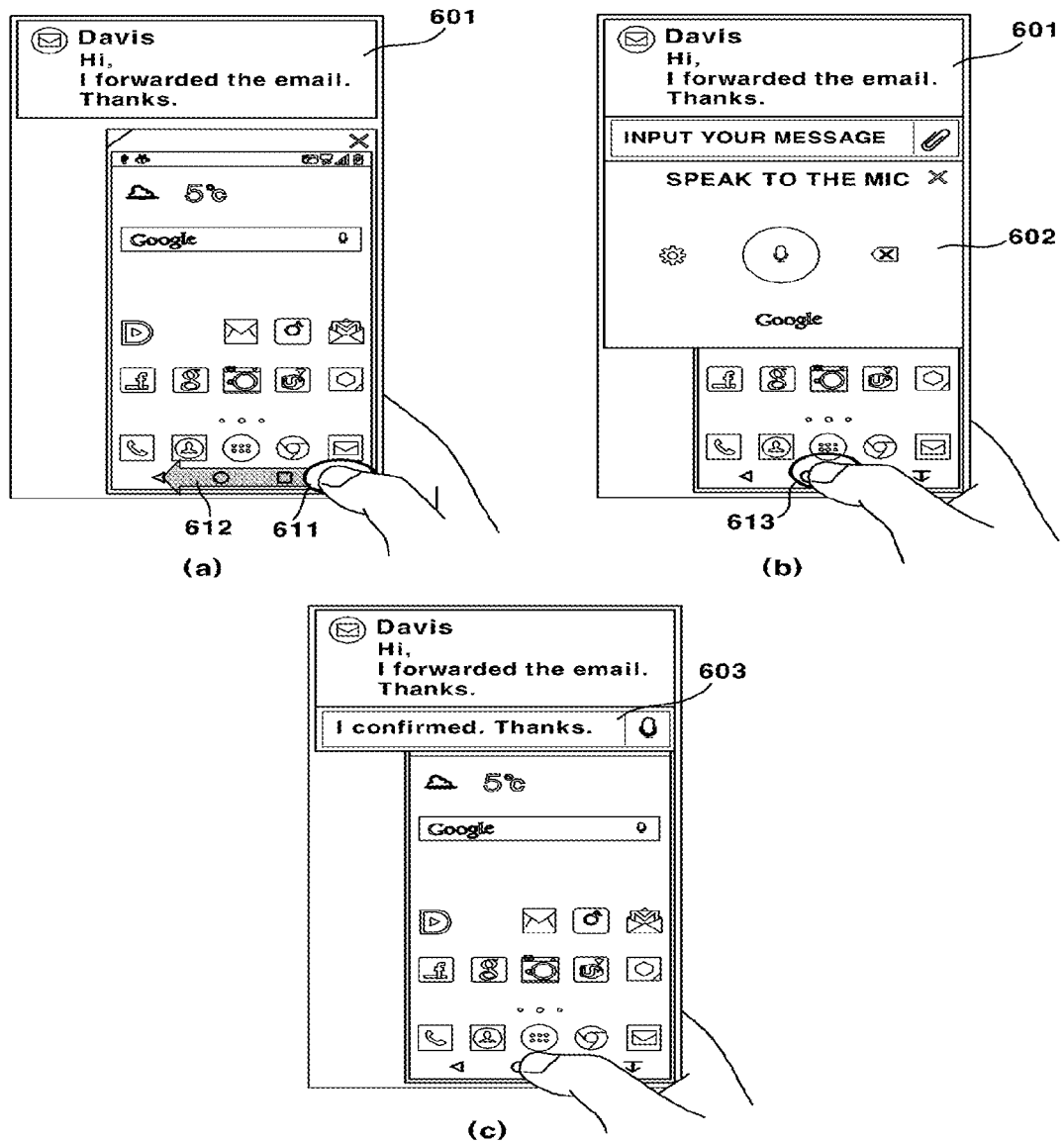
FIG. 6 illustrates an example of performing a reply function via a soft key, in one-hand operation mode of a mobile terminal for one-hand operation mode according to an exemplary embodiment of the present disclosure.

FIG. 6 illustrates an example of performing a reply function via a soft key, in one-hand operation mode of a mobile terminal for one-hand operation mode according to an exemplary embodiment of the present disclosure.

Referring to FIG. 6, when the generated notification is a message, a preview screen corresponding to the previously described (d) of FIG. 4 is displayed at (a) of FIG. 6. That is, a preview screen (601) of the received message may be displayed on the external screen in correspondence to a long touch (611) input on the soft key.

During the preview screen (601) being executed, when the user flicks (612) the soft key to the left direction while keeping on the long touch (611), a screen (601) for writing a reply may be generated, such that the user can use voice input to write the reply in the screen {(b) of FIG. 6}.

At this moment, when the user input a voice message while keeping on the left flicking (612) touch, the inputted voice message may be displayed a reply message (603) {(c) of FIG. 6}. Afterwards, when the user release the touch that was kept on during the voice input, the displayed reply message (603) may be immediately transmitted to a counterpart of the user.

That is, the user can conveniently write a reply in response to the received message, by applying a flicking input while keeping the long touch on the soft key with a single hand holding the mobile terminal, and can conveniently transmit the written reply message to the counterpart, by releasing the flicking touch.

Figure 7:
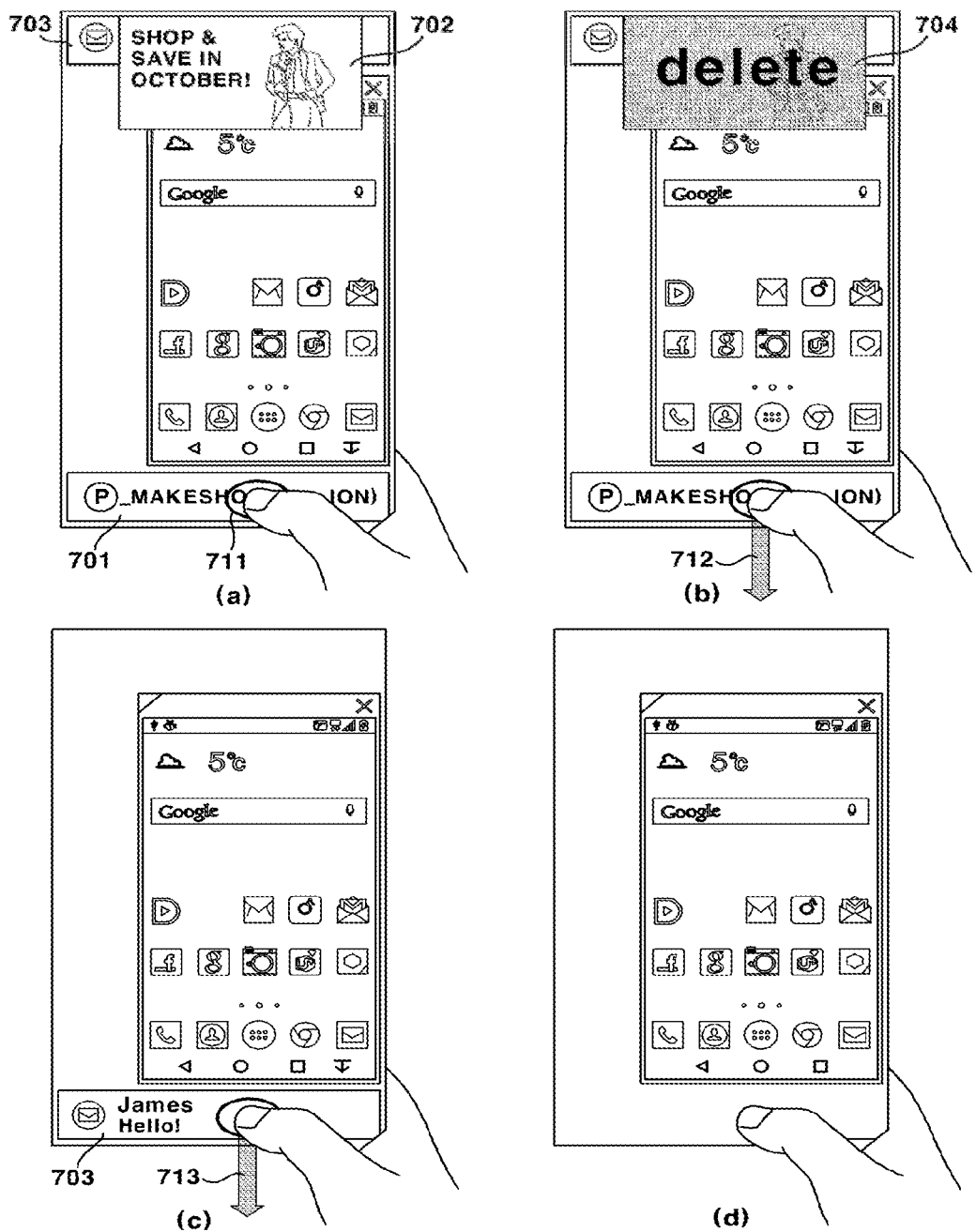
FIG. 7 illustrates an example of displaying a preview of a notification via a touch input for the notification generated, and deleting the preview and the notification in an orderly manner, in one-hand operation mode of a mobile terminal for one-hand operation mode according to an exemplary embodiment of the present disclosure.

FIG. 7 illustrates an example of displaying a preview of a notification via a touch input for the notification generated, and deleting the preview and the notification in an orderly manner, in one-hand operation mode of a mobile terminal for one-hand operation mode according to an exemplary embodiment of the present disclosure.

Referring to FIG. 7, the mobile terminal according to an exemplary embodiment of the present disclosure may display a preview screen (702) of the notification (701) disposed at a lower portion {(a) of FIG. 7}, using a long touch (711) input on the notification (701) disposed at a lower portion among the generated notifications (701, 703) except for the soft key as illustrated in FIG. 4.

In addition, the mobile terminal according to an exemplary embodiment of the present disclosure may delete (704) the preview screen (702) of the notification (701) disposed at a lower portion {(b) of FIG. 7}, using a flicking (712) input in a downward direction (bezel-out direction) on the notification (701) disposed at a lower portion except for the soft key as illustrated in FIG. 5.

When the preview screen (702) is deleted as illustrated in (b) of FIG. 7, the mobile terminal according to an exemplary embodiment of the present disclosure may move the notification (703) disposed at an upper portion to the lower portion {(c) of FIG. 7} such that the user can continue to operate the mobile terminal with one hand.

Afterwards, when the user applies a flicking (713) input in a downward direction on the notification (703) displayed at the lower portion {(c) of FIG. 7}, the notification (703) displayed at the lower portion may also be deleted {(d) of FIG. 7}. Meanwhile, the soft key described in the foregoing may disappear from the one-hand operation mode screen, when all the displayed notifications are deleted.

That is, the user may execute a preview screen by applying a long touch input on the notification disposed at the lower portion using a single hand holding the mobile terminal, and may conveniently delete the displayed preview screen by applying a flicking input on the notification disposed at the lower portion while the preview screen is being executed.

Figure 8:
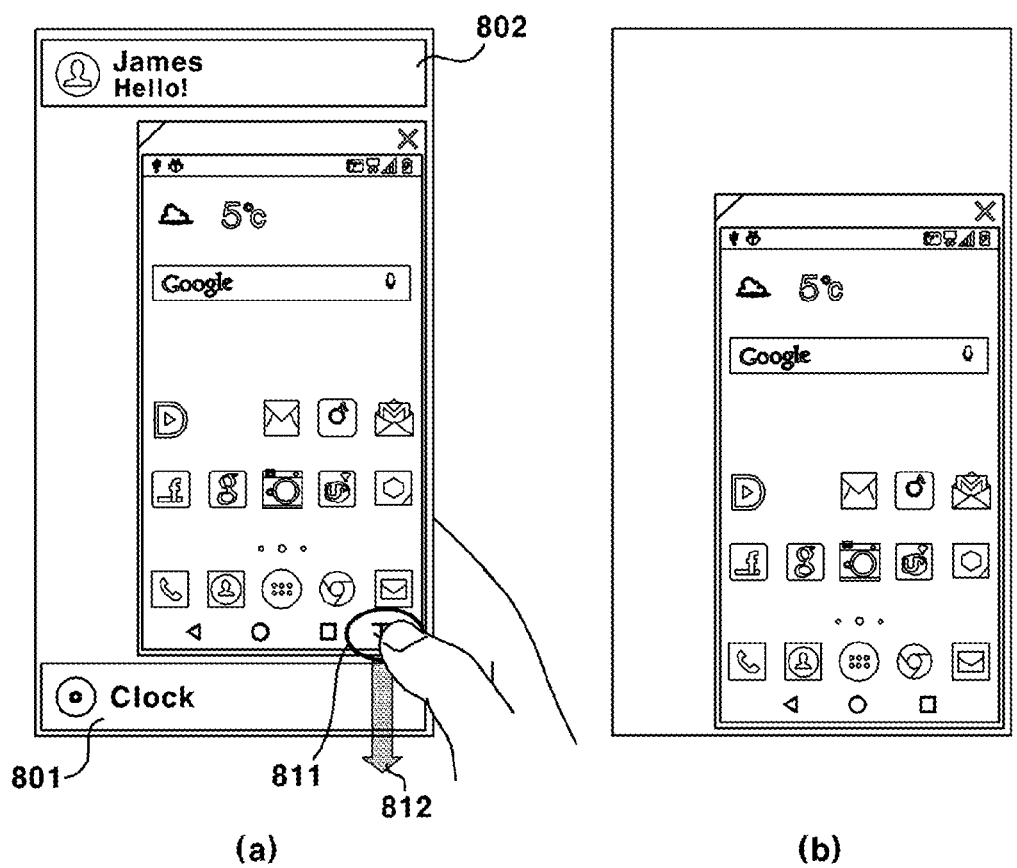
FIG. 8 illustrates an example of clearing all generated notifications using a soft key, when the generated notifications are in plural number, in one-hand operation mode of a mobile terminal for one-hand operation mode according to an exemplary embodiment of the present disclosure.

FIG. 8 illustrates an example of clearing all generated notifications using a soft key, when the generated notifications are in plural number, in one-hand operation mode of a mobile terminal for one-hand operation mode according to an exemplary embodiment of the present disclosure.

Referring to FIG. 8, when the user applies an input flicking (812) the activated soft key in a downward direction (bezel-out direction) while a plurality of notifications (801, 802) is displayed on the external screen in one-hand operation mode, the mobile terminal according to an exemplary embodiment of the present disclosure may delete all notifications (801, 802) displayed on the external screen with one single operation {(b) of FIG. 8}. Meanwhile, when all the displayed notifications are deleted, the soft key may also disappear from the one-hand operation mode screen, as previously described.

That is, the user can delete all displayed preview screens at once, by applying one flicking on the soft key disposed at the lower portion, using a single hand holding the mobile terminal.

Figure 9:
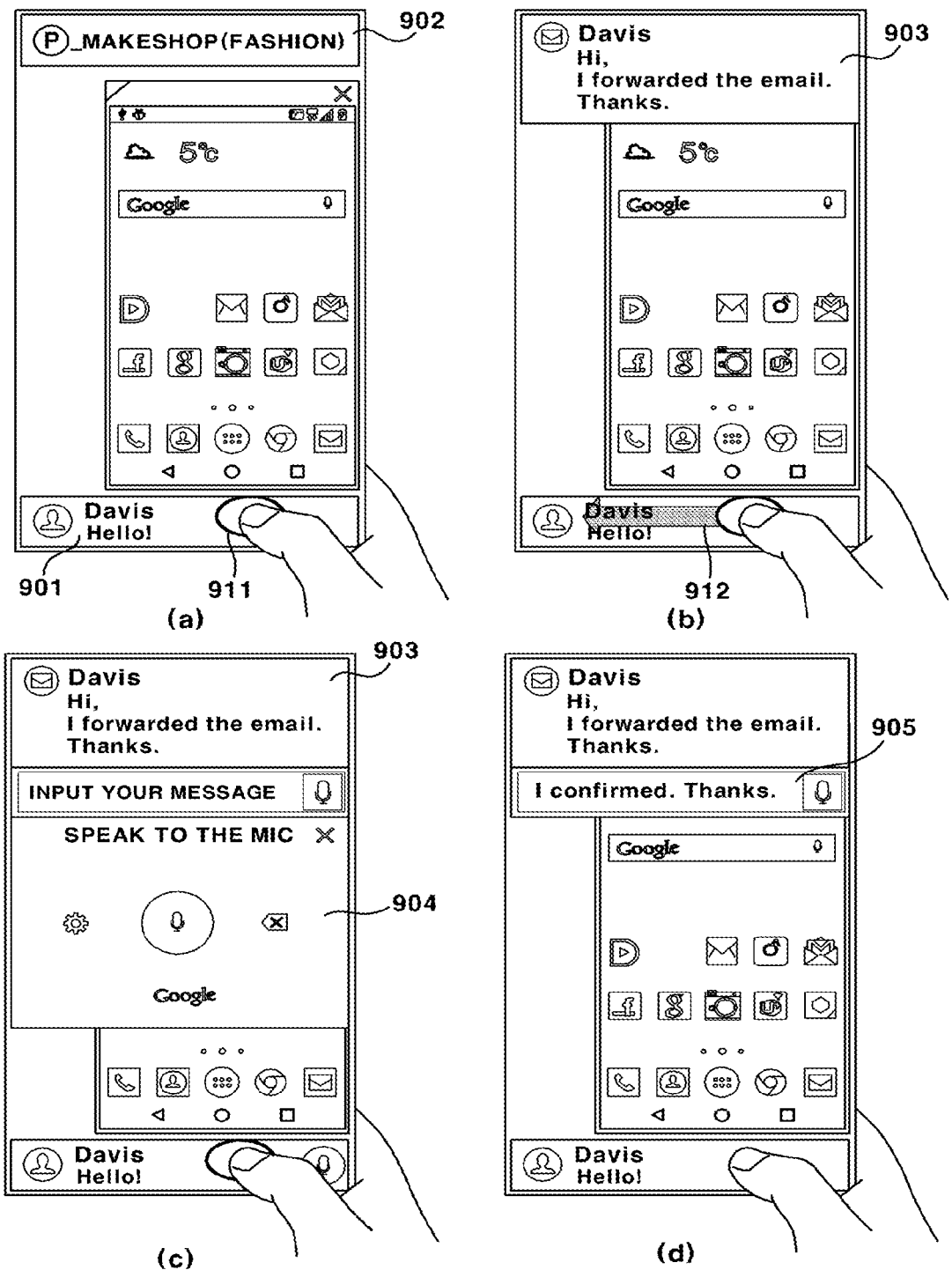
FIGS. 9 to 11 illustrate an example of performing a reply function via a soft key for a generated notification, when the generated notification is a message, in one-hand operation mode of a mobile terminal for one-hand operation mode according to an exemplary embodiment of the present disclosure.
Figure 10:
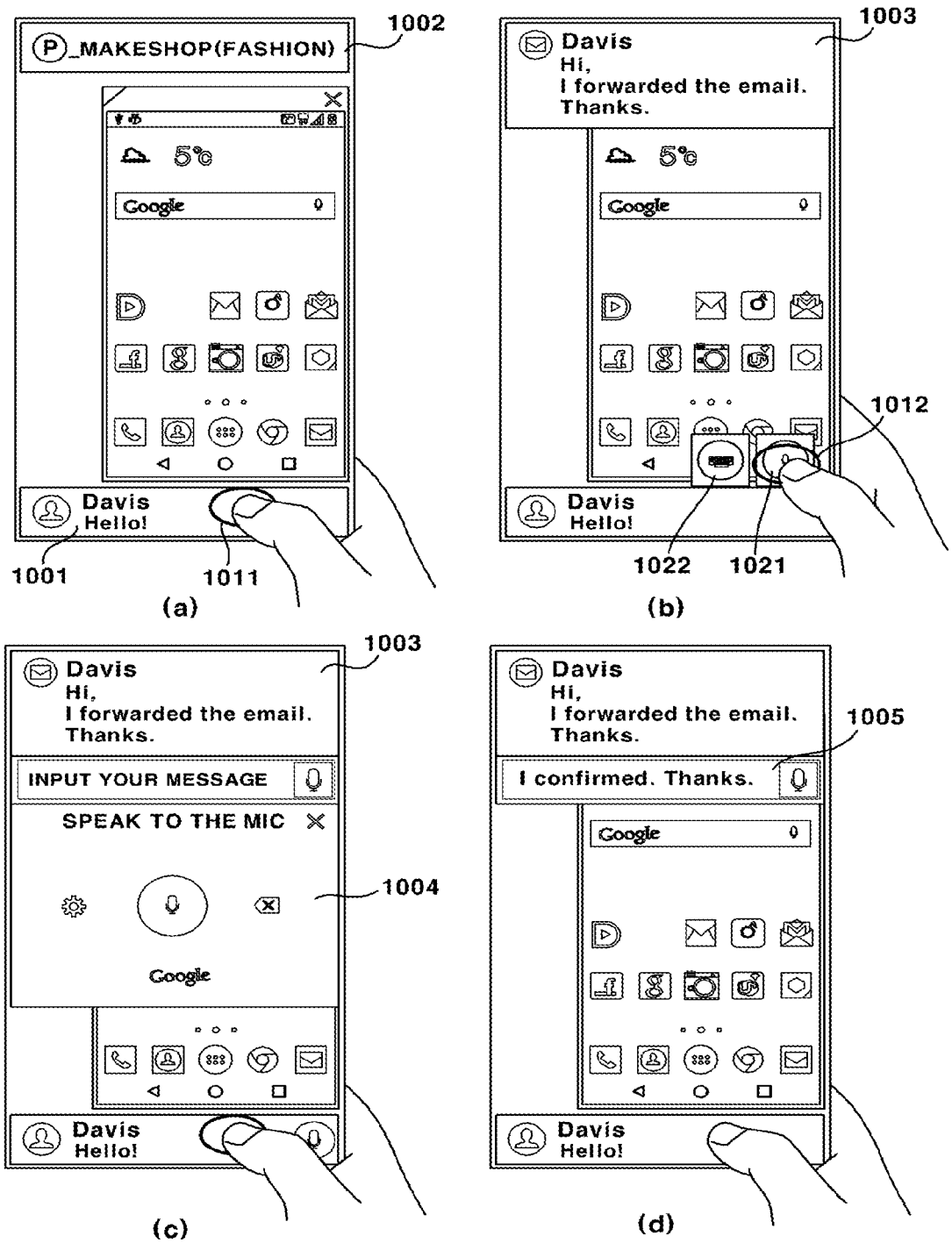
Figure 11:
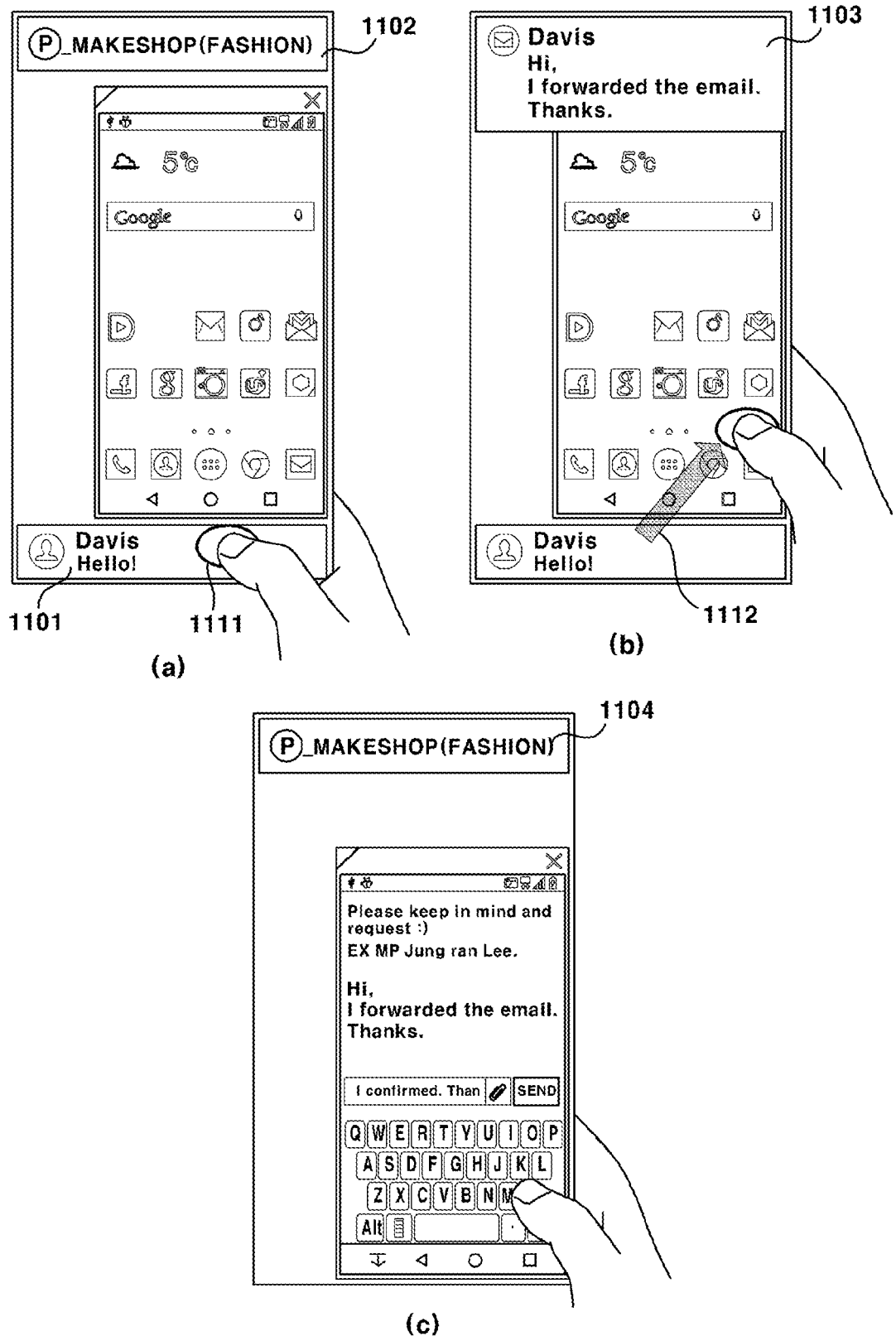

FIGS. 9 to 11 illustrate an example of performing a reply function via a soft key for a generated notification, when the generated notification is a message, in one-hand operation mode of a mobile terminal for one-hand operation mode according to an exemplary embodiment of the present disclosure.

Referring to FIGS. 9 and 10, the mobile terminal according to an exemplary embodiment of the present disclosure may display a preview screen (903, 1003) of the notification (901, 1001) at the lower portion {(b) of FIG. 9, (b) of FIG. 10}, in response to the long touch (911, 1011) input on the notification (901, 1001) disposed at the lower portion among the notifications (901, 902, 1001, 1002) displayed in the one-hand operation mode.

At first, referring to FIG. 9, in the state that a preview screen (903) is displayed, when the user applies a left flicking (912) input on the lower notification (901) while a long touch (911) being maintained, a screen (904) may be generated {(c) of FIG. 9}, such that the user can write a reply using voice input in response to a message displayed on the preview screen (903).

Here, when the user inputs voice while the left flicking (912) touch being maintained, the inputted voice may be displayed as a reply message (905) {(d) of FIG. 9}. Thereafter, when the user release the touch that has been maintained while the voice being inputted, the displayed reply message may be transmitted to the conversation counterpart.

In addition, referring to FIG. 10, the mobile terminal according to an exemplary embodiment of the present disclosure may display, along with a preview screen (1003), at least one icon (1022, 1021) for selecting a method to write a reply message in response to a long touch (1011) input {(b) of FIG. 10}.

In this state, when the user applies a touch (1021) on an icon (1021) corresponding to the voice input method, a screen (1004) may be generated for the user to write a reply in response to the message displayed on the preview screen (1003) using voice input {(c) of FIG. 10}. Here, when the user input voice, the inputted voice may be displayed as a reply message (1005) {(d) of FIG. 10}, and the displayed reply message (1005) may be transmitted to the conversation counterpart.

Meanwhile, referring to FIG. 11, the mobile terminal for one-hand operation mode according to an exemplary embodiment of the present disclosure may display a preview (1103) of the lower notification (1101) {(b) of FIG. 11}, in response to a long touch (1111) input of the notification (1101) disposed at the lower portion among the displayed notifications (1101, 1102) {(a) of FIG. 11}.

In addition, in the state where the preview (1103) is displayed, when the user applies a flicking (1112) input toward inside of the one-hand operation mode screen while maintaining a long touch (1111) on the notification (1101) at the lower portion, a screen (1104) for writing a reply to the message displayed as the preview (1103), such that the user may write a reply message by operating the keyboard with one hand, and may transmit the reply message to the conversation counterpart {(c) of FIG. 11}.

That is, according to exemplary embodiments illustrated in FIGS. 9 to 11, the user may write a reply message in response to a received message using a long touch or flicking input on a notification disposed at a lower portion via voice input or keyboard operation, and may conveniently transmit the reply message to the conversation counterpart.

Meanwhile, although exemplary embodiments using a long touch input and a flicking input are illustrated in FIGS. 9 to 11, the present disclosure is not limited hereto. That is, any type of input corresponding to the function described in FIGS. 9 to 11 may be employed in the present disclosure.

Figure 12:
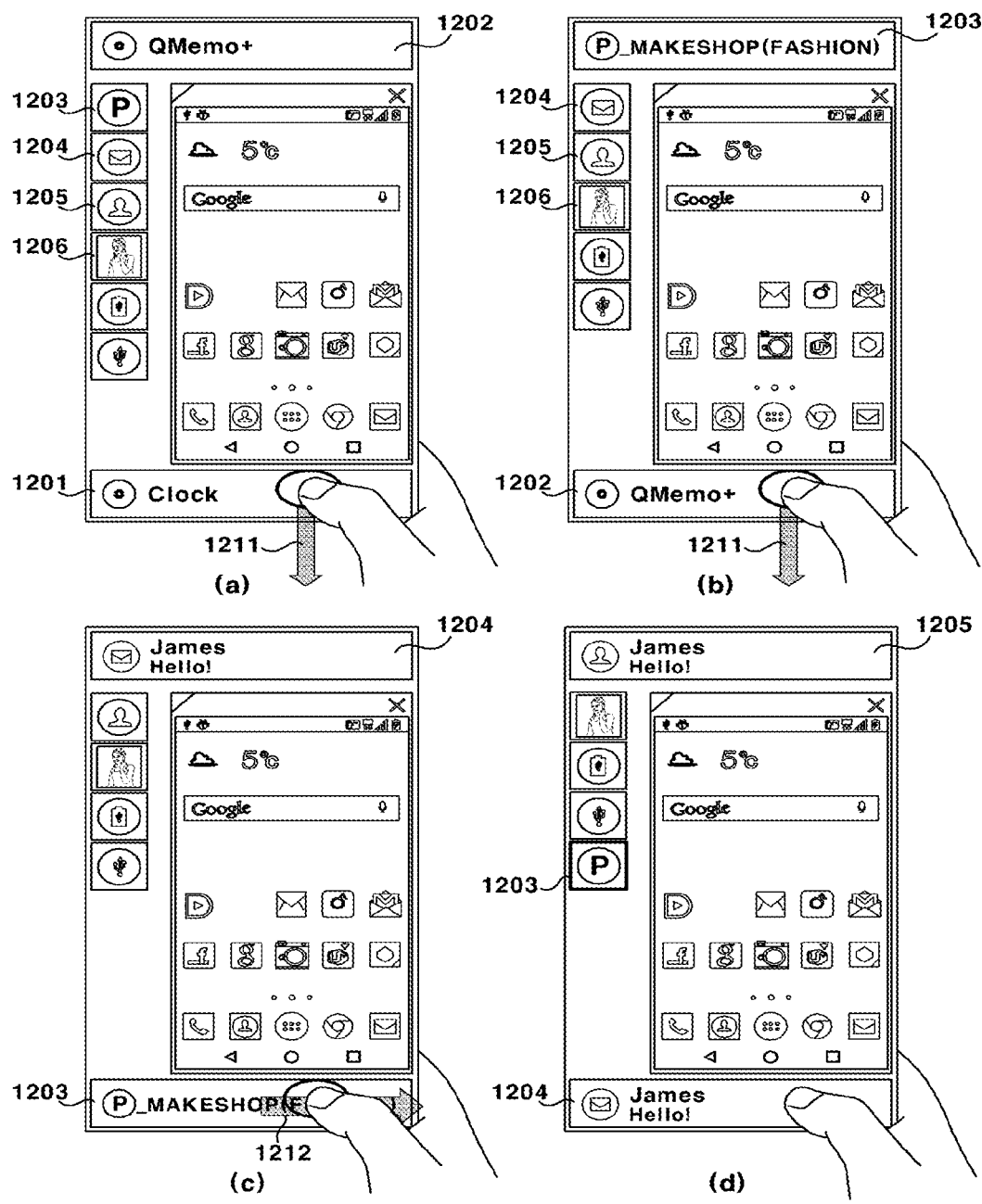
FIG. 12 illustrates an example of deleting a generated notification or switching a position of the displayed notification using a soft key, when the generated notifications are in plural number and space for displaying all the generated notification is insufficient, in one-hand operation mode of a mobile terminal for one-hand operation mode according to an exemplary embodiment of the present disclosure.

FIG. 12 illustrates an example of deleting a generated notification or switching a position of the displayed notification using a soft key, when the generated notifications are in plural number and space for displaying all the generated notification is insufficient, in one-hand operation mode of a mobile terminal for one-hand operation mode according to an exemplary embodiment of the present disclosure.

Referring to FIG. 12, when a plurality of notifications is generated and external space is insufficient to display all the notifications in the external space, the mobile terminal according to an exemplary embodiment of the present disclosure may stack some part (1203 to 1205) among the plurality of notifications (1201 to 1205) in a predetermined direction in an order of earlier generation, and may display the stacked notification as icons on the external screen. For example, the most recently generated notification may be displayed on the top of the stack {(a) of FIG. 12}.

In this state, when the user flicks (1211) the lower notification (1210) in a downward direction (bezel-out direction) {(a) of FIG. 12}, the relevant notification (1201) may be deleted, and a notification (1202, the notification on the top) that has been generated next to the deleted notification (1201) may be moved to the lower portion to be displayed {(b) of FIG. 12}.

In this state, when the user flicks (1211) the lower notification (1202) in a downward direction once more {(b) of FIG. 12}, the relevant notification (1202) may be deleted, and a notification (1203) that has been generated next to the deleted notification (1202) may be moved to the lower portion to be displayed in the same manner {(c) of FIG. 12}.

Here, when the notification (1203) disposed at the lower portion is flicked (1212) to the right direction, the relevant notification (1203) may not be deleted, and may be moved to the last order in the stack displayed on the external screen {(d) of FIG. 12}.

That is, the user may flick a notification not in a downward direction, but in the right direction to be stacked, if the user wants the relevant notification undeleted to be confirmed later. Here, the notification (1204) that has been generated next to the stacked notification (1203) may be moved and displayed at the lower portion. The notification (1205) that has been generated next to the moved notification (1204) may be displayed on the top of the external screen.

Figure 13:
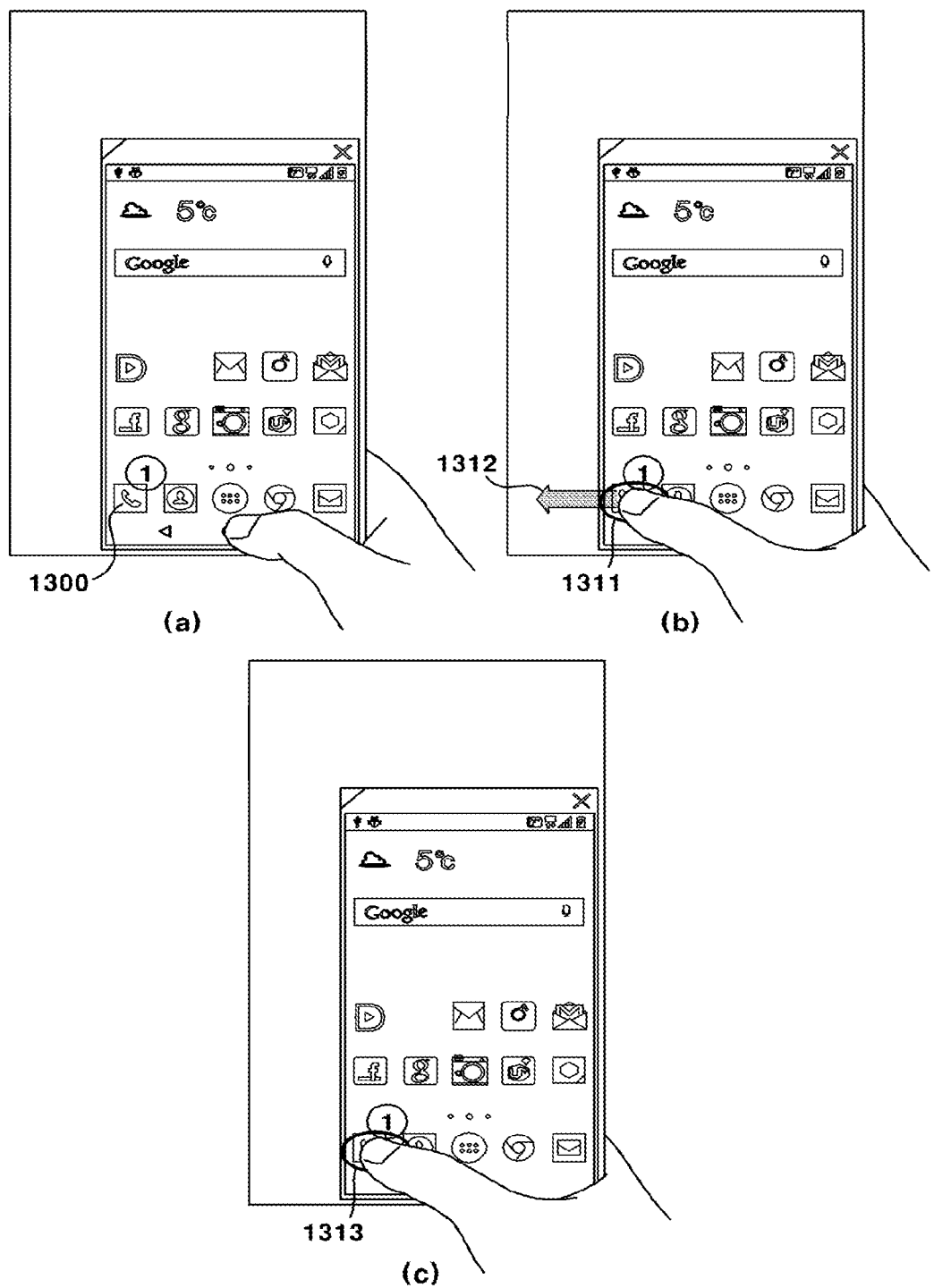
FIGS. 13 and 14 illustrate an example of, when a badge is displayed on an icon, confirming a notification corresponding to the badge, and controlling the notification, in one-hand operation mode of a mobile terminal for one-hand operation mode according to an exemplary embodiment of the present disclosure.
Figure 14:
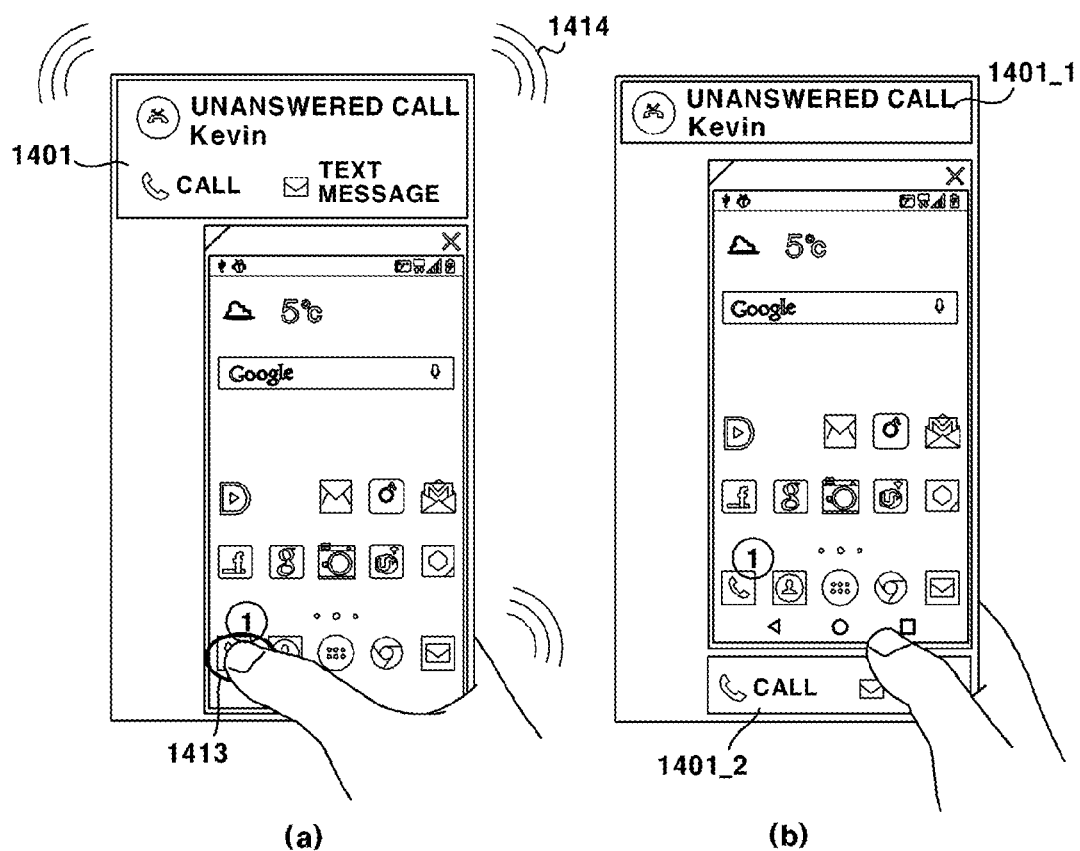

FIGS. 13 and 14 illustrate an example of, when a badge is displayed on an icon, confirming a notification corresponding to the badge, and controlling the notification, in one-hand operation mode of a mobile terminal for one-hand operation mode according to an exemplary embodiment of the present disclosure.

Referring to (a) of FIG. 13, it is illustrated a badge is displayed on an icon (1300) for executing a telephone application in the mobile terminal for one-hand operation mode according to an exemplary embodiment of the present disclosure. The badge indicates that an event unconfirmed by the user has been generated in the telephone application although the event is currently not displayed as a notification. In addition, the number corresponding to the badge may indicate a number of events unconfirmed by the user.

In this state, when a touch input clicking (1311) and dragging (1312) the relevant icon (1300) out to the external screen is applied by the user {(b) of FIG. 13}, or when the user applies a long touch (1313) on the relevant icon {(c) of FIG. 13}, the mobile terminal according to an exemplary embodiment of the present disclosure may display a notification (1401), corresponding to information in relation to the badge displayed on the application (1300) on which the touch input is applied, on an upper portion of the external screen {(a) of FIG. 14}.

Here, when the notification (1401) displayed on the upper portion of the external screen is an unanswered call as illustrated in FIG. 14, the notification (1401) displayed on the external screen may provide a call button and a text message button {(a) of FIG. 14}.

In this state, when the user applies a gesture such as shaking (1414) using a gyro sensor to the mobile terminal, the mobile terminal according to an exemplary embodiment of the present disclosure may move the call button and the text message button (1401_1), from the notification (1401) displayed on the upper portion of the external screen, to a lower portion of the one-hand operation mode screen {(b) of FIG. 14}. Furthermore, the user may manipulate the call button and the text message button (1401_1) that have been moved to the lower portion with a single hand, to make a telephone call to the counterpart of the unanswered call.

Meanwhile, the mobile terminal may also move the whole notification itself to the lower portion of the one-hand operation mode screen, as in previously described FIG. 3a.

That is, the user may touch an application displaying a badge to confirm the notification relating to the badge, and may move the displayed notification to the lower portion to perform the relevant function.

FIGS. 15 to 18 illustrate an example of executing an application as a preview and controlling the application, in one-hand operation mode of a mobile terminal for one-hand operation mode according to an exemplary embodiment of the present disclosure.

The user may touch an icon displayed on the one-hand operation mode screen of the mobile terminal according to an exemplary embodiment of the present disclosure, and may execute a preview of the application corresponding to the icon.

Figure 15:
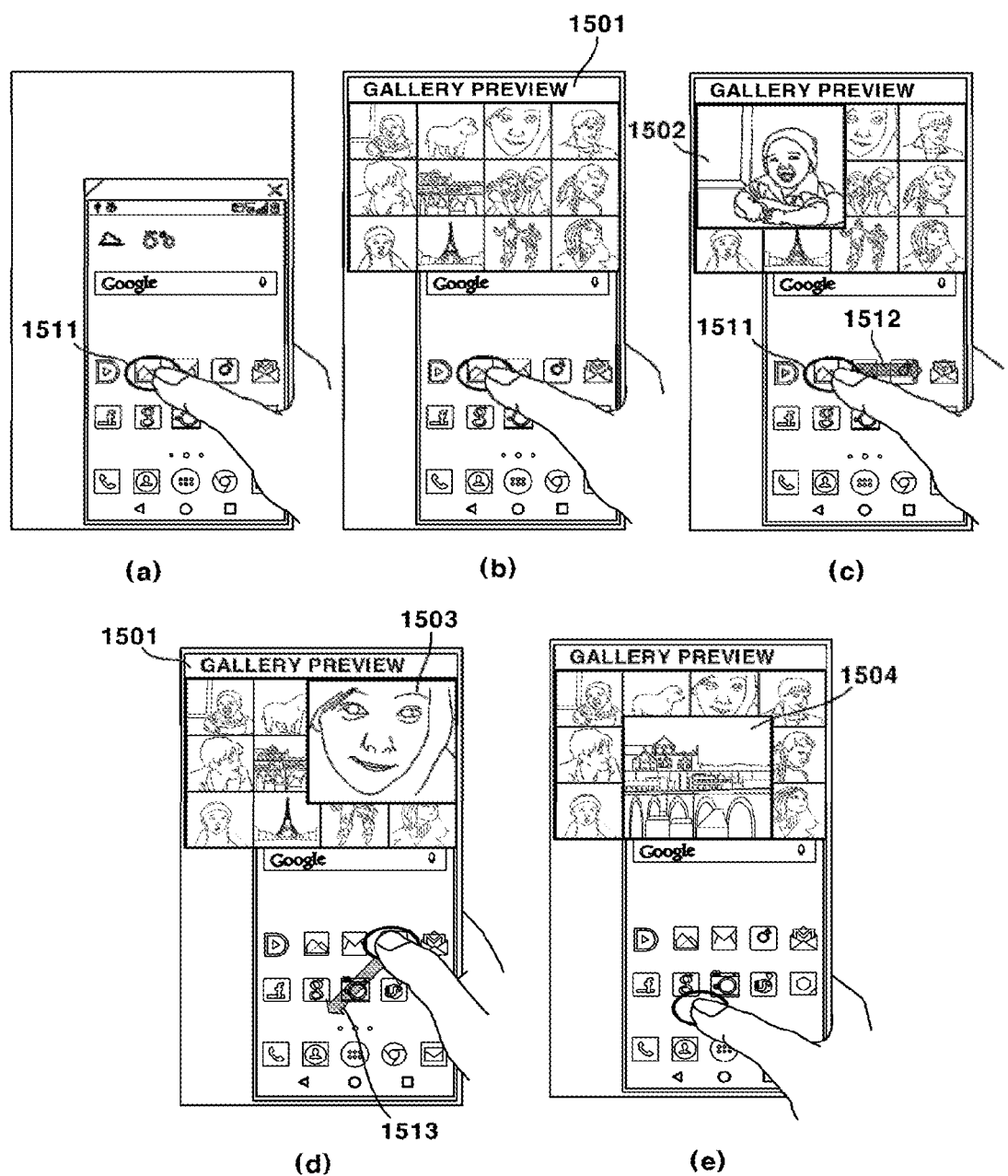

At first, referring to FIG. 15, the user may apply a long touch (1511) input on an icon corresponding to a gallery application configured to show image files stored in the mobile terminal {(a) of FIG. 15}. The mobile terminal may, in response to the long touch input (1511), execute the gallery application in a preview format, and may display the preview on the upper portion of the touch screen {(b) of FIG. 15}.

Here, the preview (1501) of the gallery application may display the images stored in the mobile terminal in a thumbnail format. However, the present disclosure is not limited hereto. Therefore, the image files may be displayed in a list format.

When the user maintains the long touch (1511) on the icon during the preview (1501) being executed, the mobile terminal according to an exemplary embodiment of the present disclosure may enlarge the image (1502) disposed at the left uppermost portion among the images displayed in the thumbnail format, such that the image (1502) may be displayed larger than the other images {(c) of FIG. 15}.

In this state, when the user flicks the icon to the right while keeping on the long touch (1511), the mobile terminal according to an exemplary embodiment of the present disclosure may display anther image (1503) in the flicked direction, based on the enlarged image (1502) disposed at the left uppermost portion, in the enlarged size. In this case, the previously enlarged image (1502) may be scaled down to be displayed in the same size as other images {(d) of FIG. 15}.

Furthermore, in this state, when the user flicks (1513) the icon in a left-down direction while still keeping on the long touch (1511), the mobile terminal according to an exemplary embodiment of the present disclosure may display anther image (1504) in the flicked direction, based on the image (1503) displayed larger than the other images, in the enlarged size. In this case, the previously enlarged image (1503) may be scaled down to be displayed in the same size as other images {(e) of FIG. 15}.

That is, according to an exemplary embodiment of the present disclosure, the user may apply a long touch input on an application displayed on the one-hand operation mode screen, and may execute the application as a preview. When the executed application, such as a gallery application, includes an executable file, the result of executing the relevant file may be displayed in a thumbnail format. Furthermore, the user may apply a flicking touch while keeping on the long touch applied on the icon, such that the executed image file can be controlled to be selectively enlarged.

Figure 16:
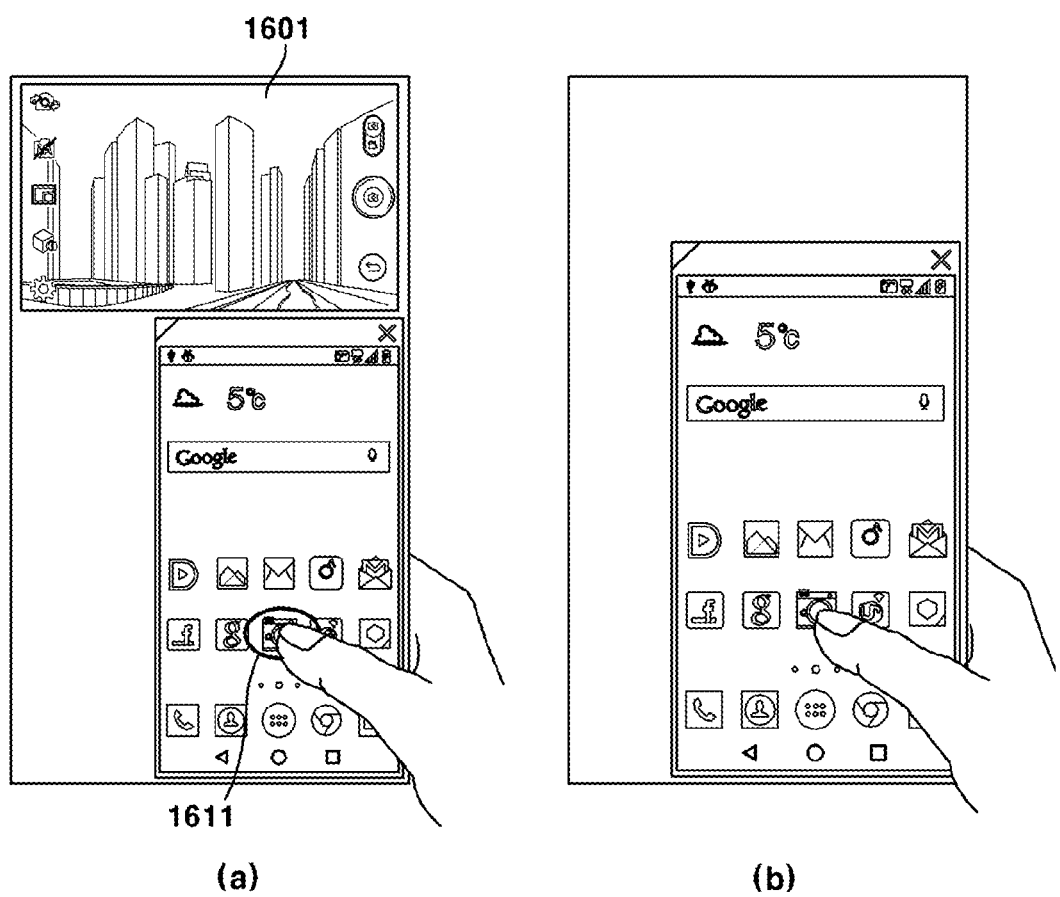

Referring to FIG. 16, it is illustrated a case where the executed application is a camera application. When the user applies a long touch (1611) on an icon corresponding to a camera application in the same manner as illustrated in FIG. 15, the mobile terminal may execute the camera application to display a photographing mode in a preview format on an upper portion of the touch screen {(a) of FIG. 16}.

In this state, when the user maintains the long touch (1611), the executed camera application may perform a process to obtain an image of the subject according to the selected photographing mode. That is, focus and/or brightness of the photographing mode may be automatically controlled.

Furthermore, when the user releases the long touch (1611), the executed camera application may obtain an image and store the image, and may finish the photographing mode displayed as the preview (1601) {(b) of FIG. 16}.

That is, according to an exemplary embodiment of the present disclosure, the user may apply a long touch input on an icon displayed on the one-hand operation mode screen, so as to conveniently execute the relevant icon as a preview.

Figure 17:
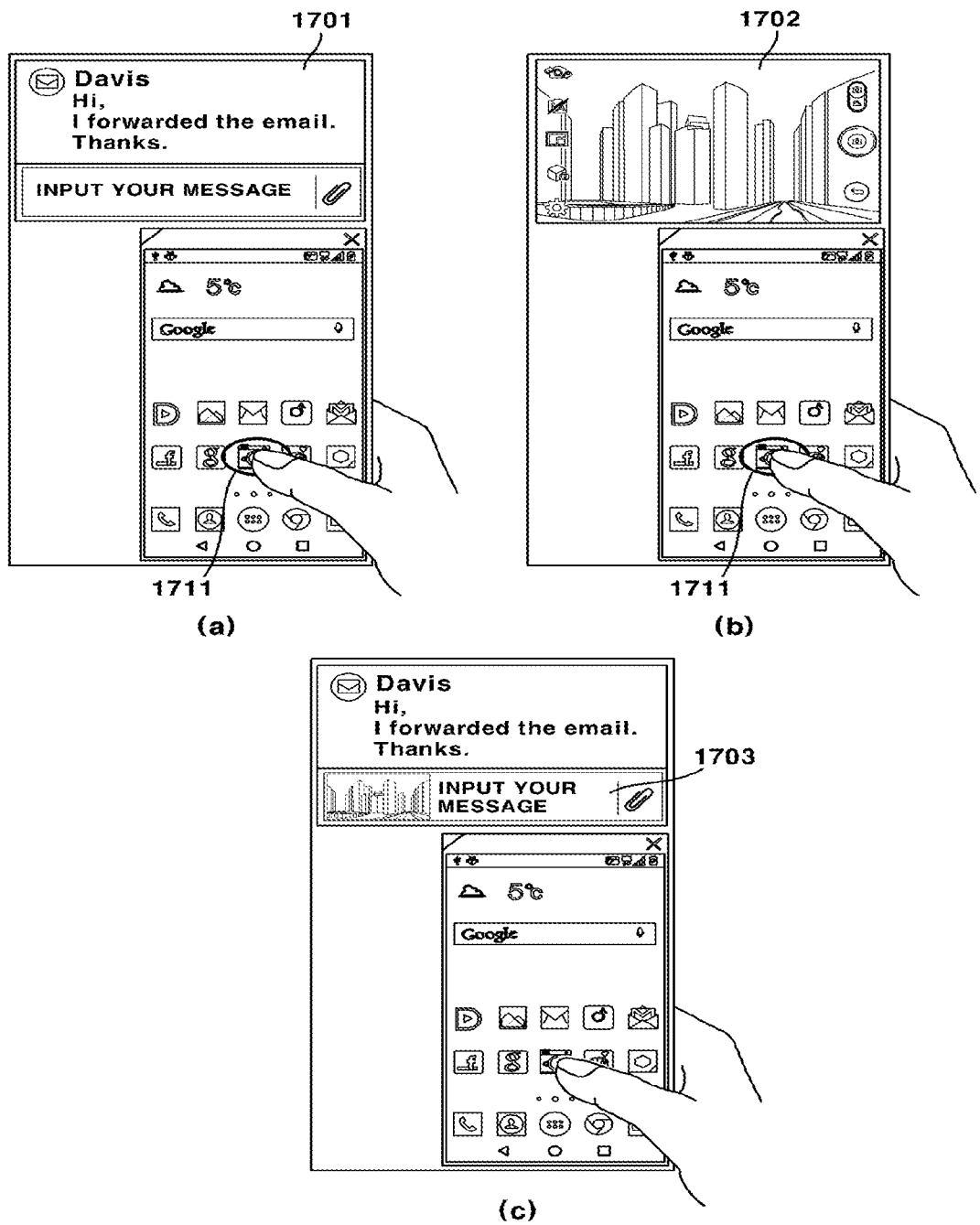

Referring to FIG. 17, it illustrated an exemplary embodiment of confirming a message and displaying a screen for writing a replay message as a preview (1701) {(a) of FIG. 17}, when the executed application is a camera application. When the user applies a long touch (1711) on an icon corresponding to a camera application in the same manner as illustrated in FIG. 16, the mobile terminal may execute the camera application to display a photographing mode in another preview (1702) format on an upper portion of the touch screen {(b) of FIG. 17}.

In this state, when the user maintains the long touch (1711), the executed camera application may perform a process to obtain an image of the subject according to the selected photographing mode. When the user releases the long touch (1711), the executed camera application may obtain an image, store the image in a reply message writing screen (1703), attach the image on the reply message writing screen (1703) displayed as a preview (1601), and may finish the photographing mode {(c) of FIG. 17}.

That is, according to an exemplary embodiment of the present disclosure, the user may execute a plurality of previews, and may conveniently control the executed application with a single hand using the one-hand operation mode.

Referring to FIG. 18, it illustrated a case where the executed application is an email application. When the user applies a long touch (1811) on an icon corresponding to a camera application in the same manner as illustrated in FIGS. 15 to 17 {(a) of FIG. 18}, the mobile terminal may execute the email application, and may display the email application in a preview (1801) format on an upper portion of the touch screen {(b) of FIG. 18}.

In this state, when the user flicks (1812) the icon in an upward direction while keeping on the long touch (1811), the mobile terminal may, in response to the flicking (1812), move the email list displayed as the preview (1801) to an upper portion {(b) of FIG. 18}.

In addition, when the user flicks (1813) down the icon while still keeping on the long touch (1811) in this state, the mobile terminal may move the email list displayed as the preview (1801) to a lower portion in response to the flicking (1813) {(c) of FIG. 18}.

Meanwhile, when the user flicks (1814) the icon in a downward direction {(d) of FIG. 18} in the state where the email list displayed as a preview (1801) reaches at the uppermost portion (1804), the mobile terminal may refresh (1805) the email list displayed as the preview (1801) in response to the flicking (1814) {(e) of FIG. 18}.

That is, according to an exemplary embodiment of the present disclosure, the user may execute an email application as a preview, by applying a long touch input on the email application displayed on the one-hand operation mode screen. Furthermore, the user may move or refresh the displayed email application, by inputting a flicking touch while keeping on the applied long touch.

Figure 19:
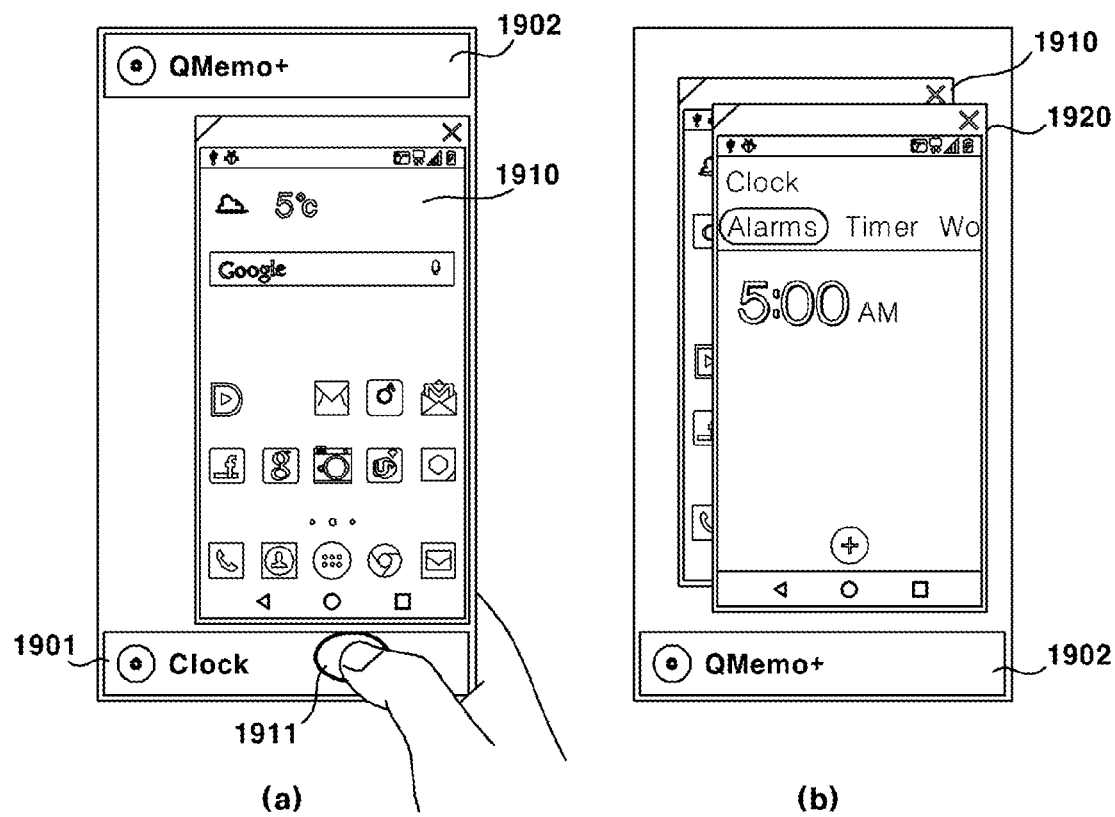
FIGS. 19 and 20 illustrate an example of executing an application corresponding to a notification, via a touch input for the relevant notification, in one-hand operation mode of a mobile terminal for one-hand operation mode according to an exemplary embodiment of the present disclosure.
Figure 20:
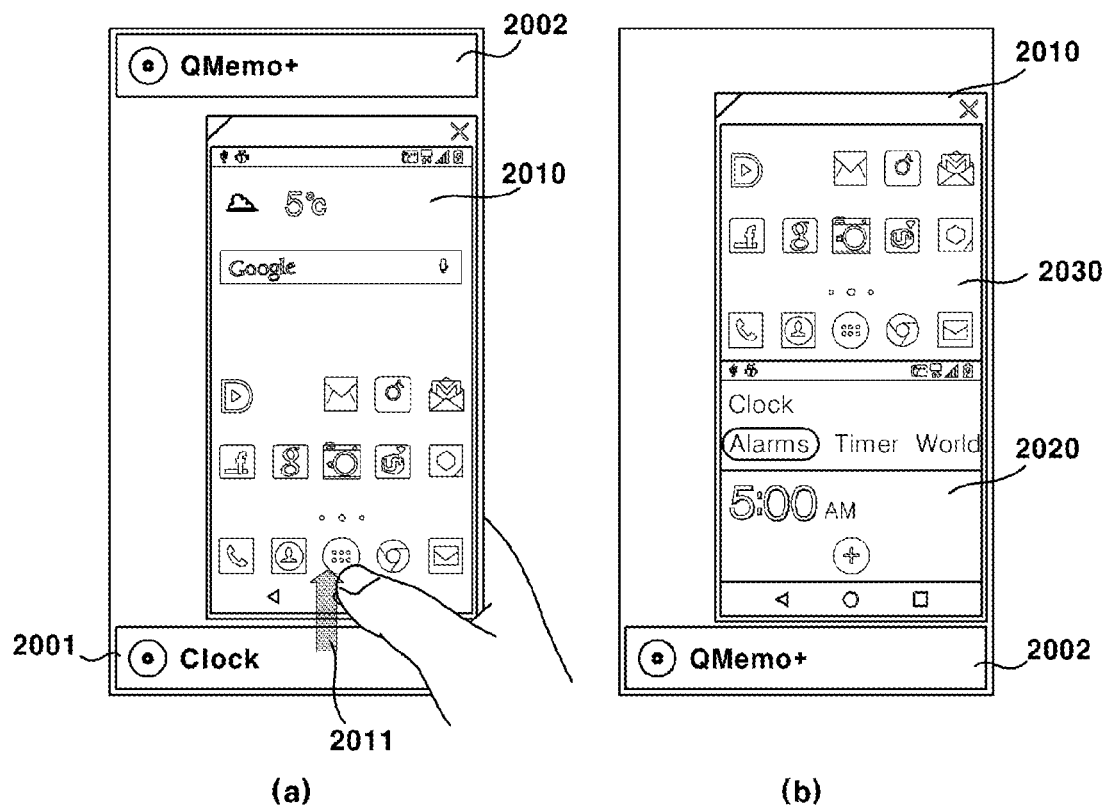

FIGS. 19 and 20 illustrate an example of executing an application corresponding to a notification, via a touch input for the relevant notification, in one-hand operation mode of a mobile terminal for one-hand operation mode according to an exemplary embodiment of the present disclosure.

Referring to FIG. 19, it is illustrated an exemplary embodiment where the user may apply a touch (1911) input on a notification (1901) disposed at a lower portion {(a) of FIG. 19} to execute an application (clock application) corresponding to the notification (1901) {(b) of FIG. 19}, when the notifications (1901, 1902) are displayed on the external screen outside of the one-hand operation mode screen (1910).

Here, the screen (1920) on which the application corresponding to the notification is executed in response to the touch (1911) input by the user on the notification (1901) may be displayed to be overlapped with a predetermined portion of the one-hand operation mode screen (1910). In particular, the screen (1920) of the executed application may be displayed in front of the one-hand operation mode screen (1910), such that the application may continuously receive touch inputs from the user to perform required functions {(b) of FIG. 19}.

Afterwards, the notification (1901) corresponding to the executed application may disappear. Instead, another notification (1902) disposed at the upper portion may be moved to the lower portion of the touch screen so as to be ready to receive a touch input from the user using a single hand.

Referring to FIG. 20, it is illustrated an exemplary embodiment where the user may apply a touch (2011) input dragging a notification (2001) disposed at a lower portion and dropping the notification (2001) on the one-hand operation mode screen (2010) {(a) of FIG. 20} to execute an application (clock application) corresponding to the notification (2001) {(b) of FIG. 20}, when the notifications (2001, 2002) are displayed on the external screen outside of the one-hand operation mode screen (2010).

Here, the screen (2020) of the application may be executed in response to the touch (2011) input dragging a notification (2001) disposed at a lower portion and dropping the notification (2001) on the one-hand operation mode screen (2010). The screen (2020) of the executed application may be controlled to be displayed simultaneously with the one-hand operation mode screen (2030). Here, the screens (2020, 2030) may be controlled such that the sum of both screen (2020, 2030) sizes are the same as that of the current one-hand operation mode screen (2010) {(b) of FIG. 20}. In particular, the executed application screen (2020) may be simultaneously displayed with the one-hand operation mode screen (2030) in the front, such that both of the screens (2020, 2030) can continuatively receive touch inputs from the user to perform required functions {(b) of FIG. 20}.

Figure 21:
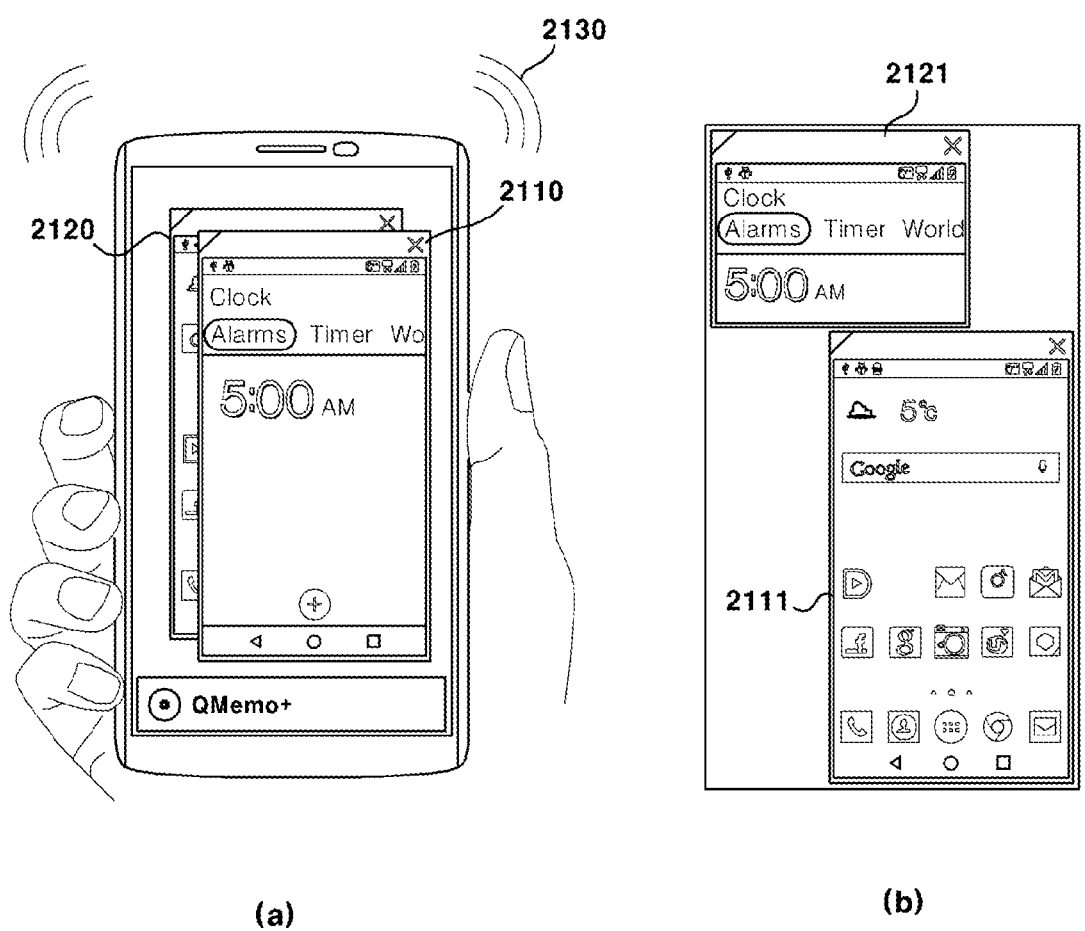
FIG. 21 illustrates an example of changing a manner of displaying the executed application, in one-hand operation mode of a mobile terminal for one-hand operation mode according to an exemplary embodiment of the present disclosure.

FIG. 21 illustrates an example of changing a manner of displaying the executed application, in one-hand operation mode of a mobile terminal for one-hand operation mode according to an exemplary embodiment of the present disclosure.

Referring to FIG. 21, it is illustrated that two screens (2110, 2120) are overlapped with each other by predetermined portions thereof, in the same manner as illustrated in FIG. 19. Currently, the one-hand operation mode screen (2110) is displayed in front, among the two screens (2110, 2120). It may be required that positions of the screens (2110, 2120) are to be switched, or that both of the screens (2110, 2120) are to be displayed in front, in order for the user to apply a touch input on the screen (2120) that is currently displayed behind the screen (2110).

The mobile terminal according to an exemplary embodiment of the present disclosure may include a motion sensor, for example, a gyro sensor. Therefore, in this case, the screen (2120) disposed in the behind may be displayed (2121) on the external screen outside of the one-hand operation mode screen (2111) {(b) of FIG. 21}, in response to a shaking or flicking by the user using the motion sensor {(a) of FIG. 21}.

Meanwhile, although it is not illustrated in FIG. 21, the mobile terminal according to an exemplary embodiment of the present disclosure may switch a position of the front screen (2110) with that of the behind screen (2120), when the user once shakes or flicks the mobile terminal {2111, (a) of FIG. 21}.

That is, the user may control a desired screen to be displayed in the front, by applying a simple gesture on the mobile terminal held by a single hand of the user.

Figure 22B:
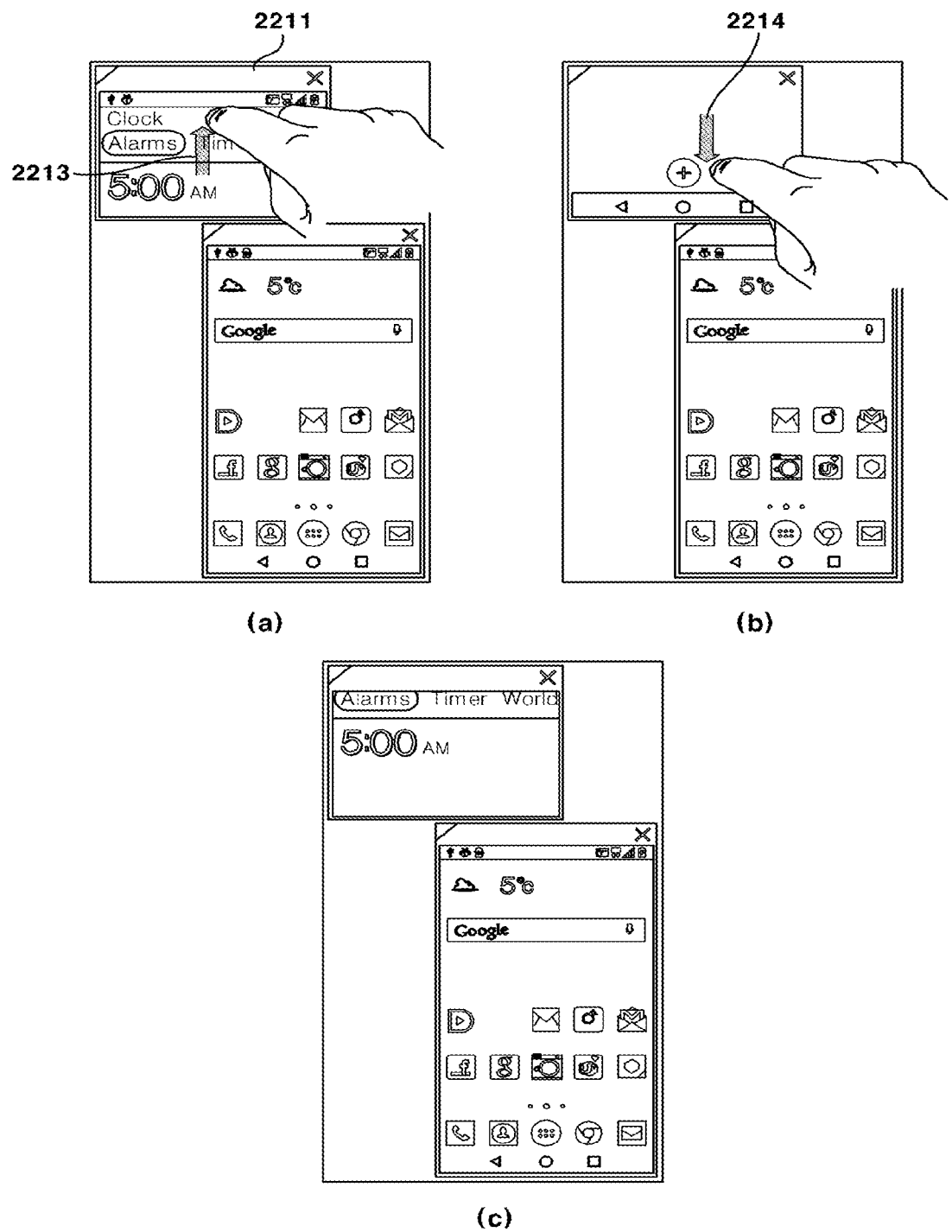

FIGS. 22a and 22b illustrate an example of changing a size of a displayed screen or scrolling a particular screen, in one-hand operation mode of a mobile terminal for one-hand operation mode according to an exemplary embodiment of the present disclosure.

Referring to FIG. 22a, it is illustrated that both of the screens (2210, 2220) are simultaneously displayed without being overlapped with each other, in a similar manner as illustrated in FIG. 21. In this state, when the user touches and drags an edge of any one screen (2220) among the two displayed screens (2210, 2220) in order to control sizes of the two displayed screens (2210, 2220), the size of the relevant screen (2220) may be controlled to be enlarged or downscaled in response to the touch and drag (2211). In this case, the size of the other screen (2210) may be enlarged or downscaled in contrary response to that of the screen (2220) controlled in response to the touch and drag (2211).

That is, the user may control sizes of two displayed screens, by touching and dragging an edge of any one screen among the two screens.

Referring to FIG. 22b, it is illustrated that both of the screens (2210, 2220) are simultaneously displayed without being overlapped with each other, in a similar manner as illustrated in FIG. 21. When the user desires to further confirm information displayed on any one screen in this state, the user may touch and drag (2213, 2214) a predetermined area of the relevant screen (2211). In particular, a scrolling of information displayed on the relevant screen (2211) may be performed in response to a direction of the touch and drag (2213, 2214) inputted by the user.

That is, the user may apply a touch and drag input to scroll an area displayed on the screen, when the user desires to further confirm information displayed on any one screen among simultaneously displayed two screens.

Figure 23A:
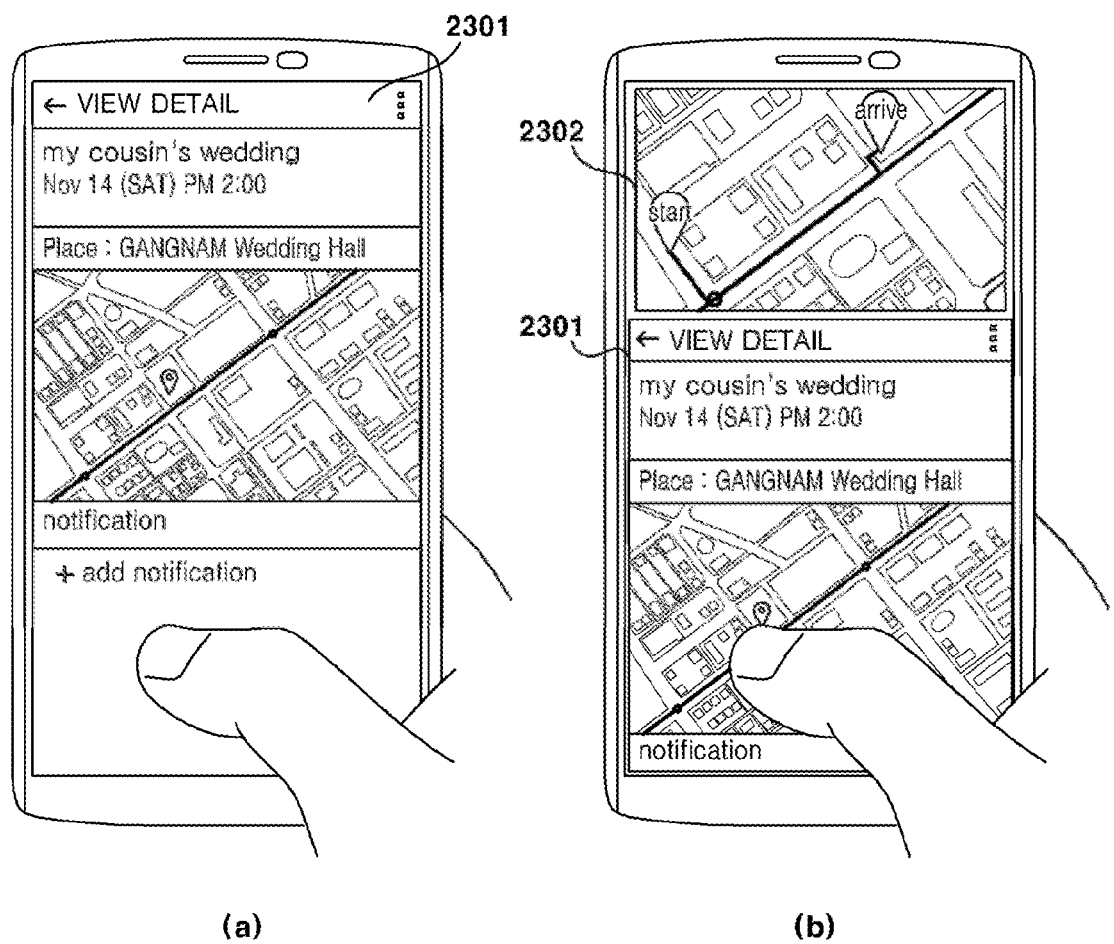
FIGS. 23a and 23b illustrate an example of providing route information, when a schedule including a location is confirmed, in one-hand operation mode of a mobile terminal for one-hand operation mode according to an exemplary embodiment of the present disclosure.
Figure 23B:
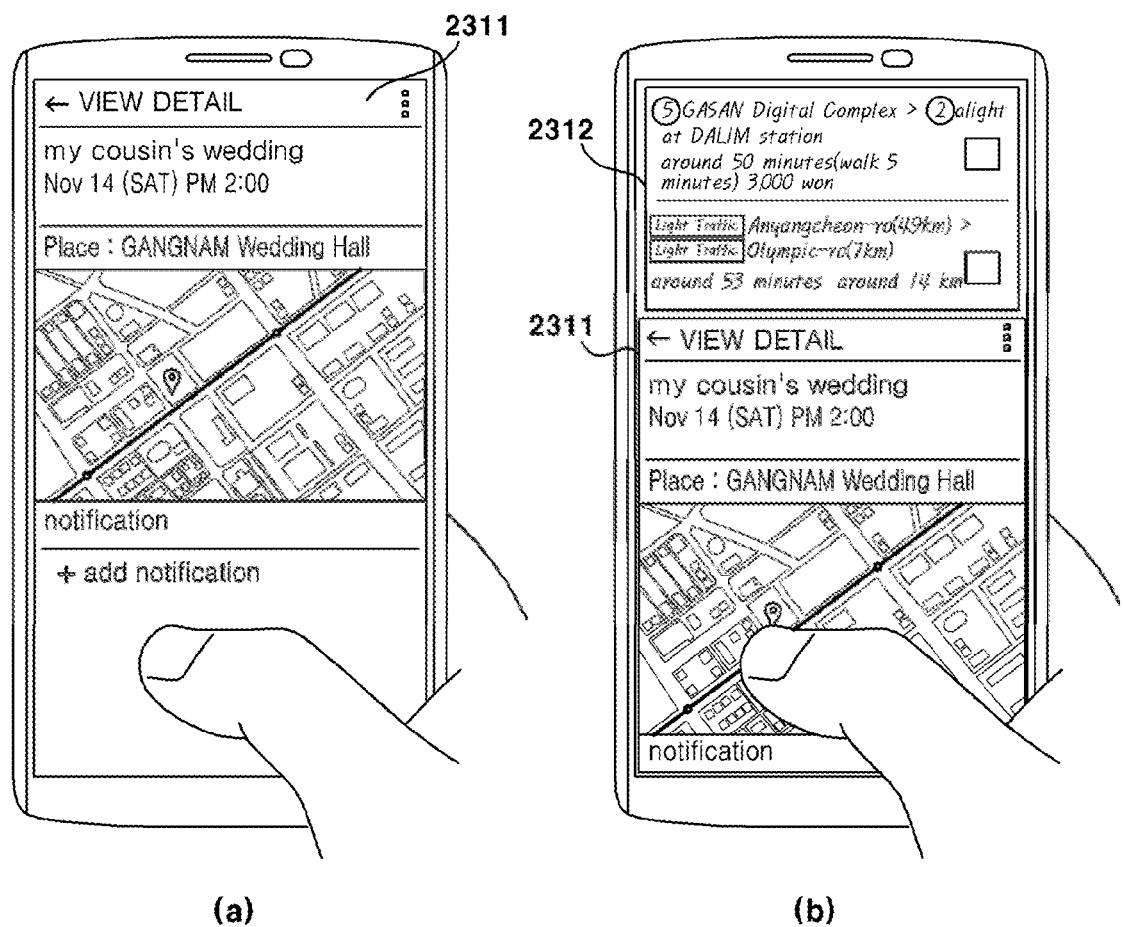

FIGS. 23a and 23b illustrate an example of providing route information, when a schedule including a location is confirmed, in one-hand operation mode of a mobile terminal for one-hand operation mode according to an exemplary embodiment of the present disclosure.

Referring to FIGS. 23a and 23b, it is illustrated an exemplary embodiment where the user executes a scheduling application (for example, a calendar application) provided in the mobile terminal. In particular, when the user execute the one-hand operation mode while looking at a schedule including location information, among schedules stored in the executed scheduling application, displayed on the entire touch screen (2301, 2311) {(a) of FIG. 23a, (a) of FIG. 23b}, the scheduling screen (2301, 2311) displayed on the entire touch screen may be downscaled to the one-hand operation mode screen and displayed on the touch screen. Furthermore, a map application (2302, 2312) showing information regarding the schedule may be automatically executed on the remaining screen (for example, on an upper portion of the touch screen) {(b) of FIG. 23a, (b) of FIG. 23b}.

Here, the location information showed by the executed map application (2302, 2312) may include the shortest road path, distance, and time required {(b) of FIG. 23a}, when a straight distance from the user's current location to the location included in the schedule is no more than around 2 km. Meanwhile, it may not be appropriate for the user to move on foot, when the straight distance from the user's current location to the location included in the schedule is more than around 2 km. Therefore, the location information may include the optimal path depending on transportation means, distance, and time required {(b) of FIG. 23b}.

That is, when the user enters one-hand operation mode via a simple operation while looking at a schedule including location information, a map application regarding the location information may be automatically executed. Thereby, the user can conveniently obtain path information to the location.

Figure 24:
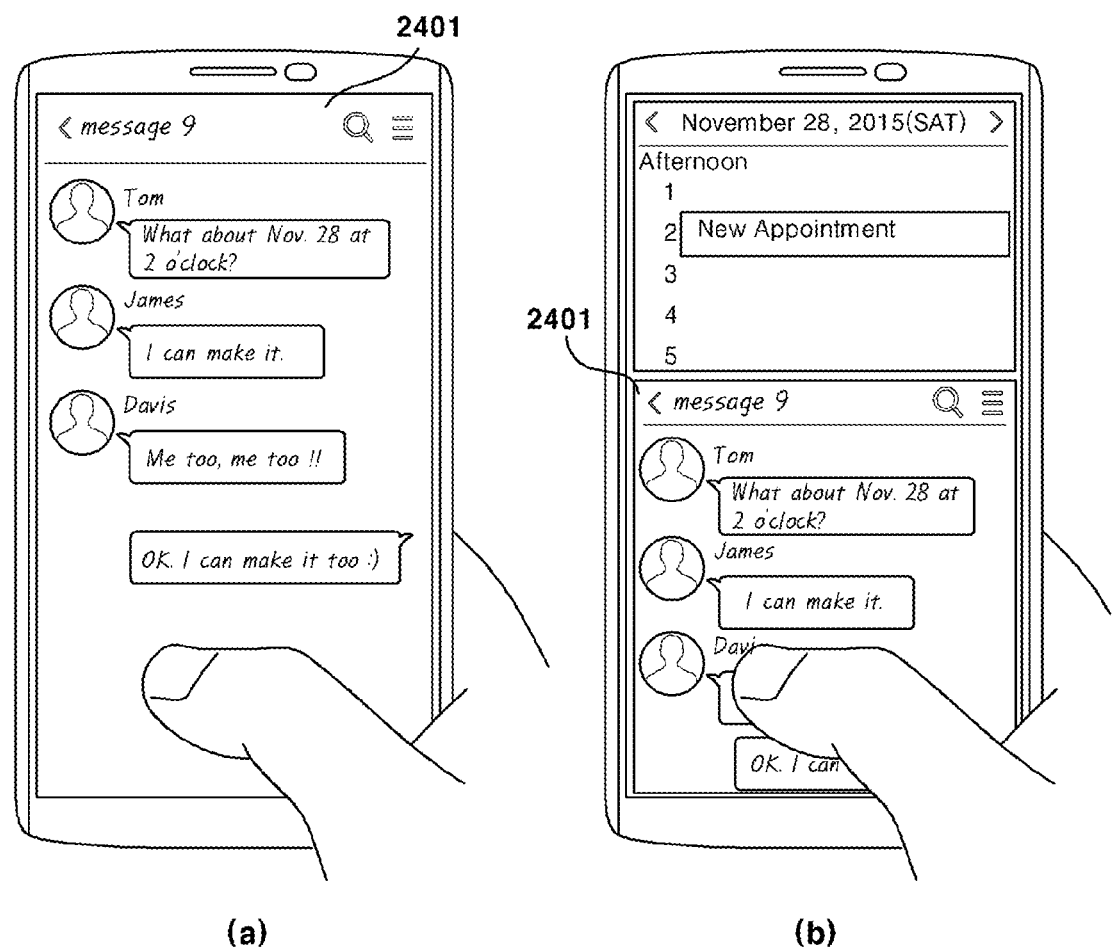
FIG. 24 illustrates an example of storing schedule information, when date information is generated during conversation, in one-hand operation mode of a mobile terminal for one-hand operation mode according to an exemplary embodiment of the pre sent disclosure.

FIG. 24 illustrates an example of storing schedule information, when date information is generated during conversation, in one-hand operation mode of a mobile terminal for one-hand operation mode according to an exemplary embodiment of the present disclosure.

Referring to FIG. 24, it is illustrated an exemplary embodiment where the user executes a conversation application (for example, a messenger application) provided in the mobile terminal. In particular, when date information is generated during conversation and the user executes the one-hand operation mode in response to the generated date information in a state where a conversation application is executed on the entire touch screen (2401) {(a) of FIG. 24}, the conversation screen (2401) displayed on the entire touch screen may be downscaled to the one-hand operation mode screen and displayed on the touch screen. Furthermore, an application for confirming a schedule of the data or adding a new schedule may be executed on the remaining screen (for example, on an upper portion of the touch screen), or as occasion demands, the schedule may be automatically added to the relevant date {(b) of FIG. 24}.

That is, the user may enter the one-hand operation mode to conveniently a schedule of the date or add a new schedule to the date, when date information is generated during conversation using a conversation application.

Figure 25A:
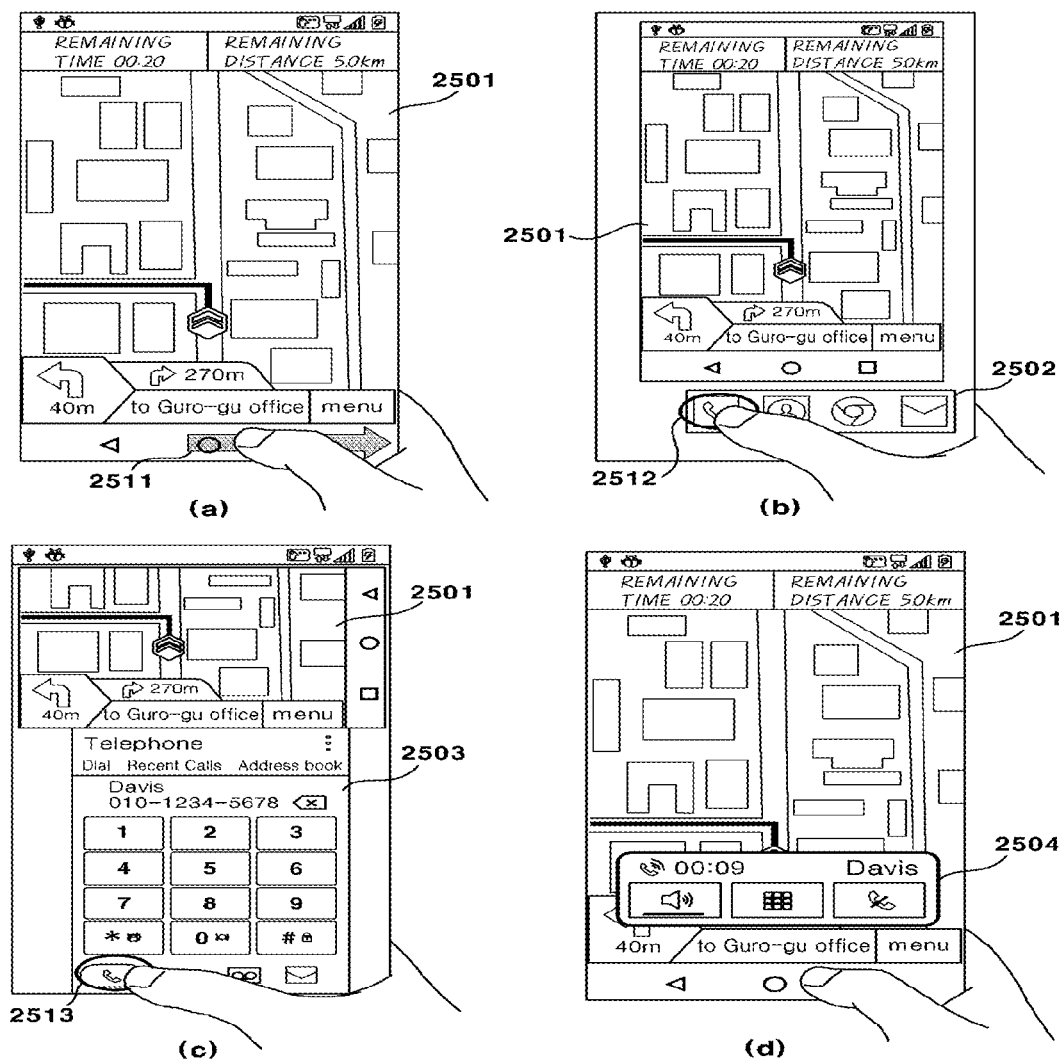
FIGS. 25a and 25b illustrate an example of executing a telephone application and a message application, while a navigation application is being executed, in one-hand operation mode of a mobile terminal for one-hand operation mode according to an exemplary embodiment of the present disclosure.
Figure 25B:
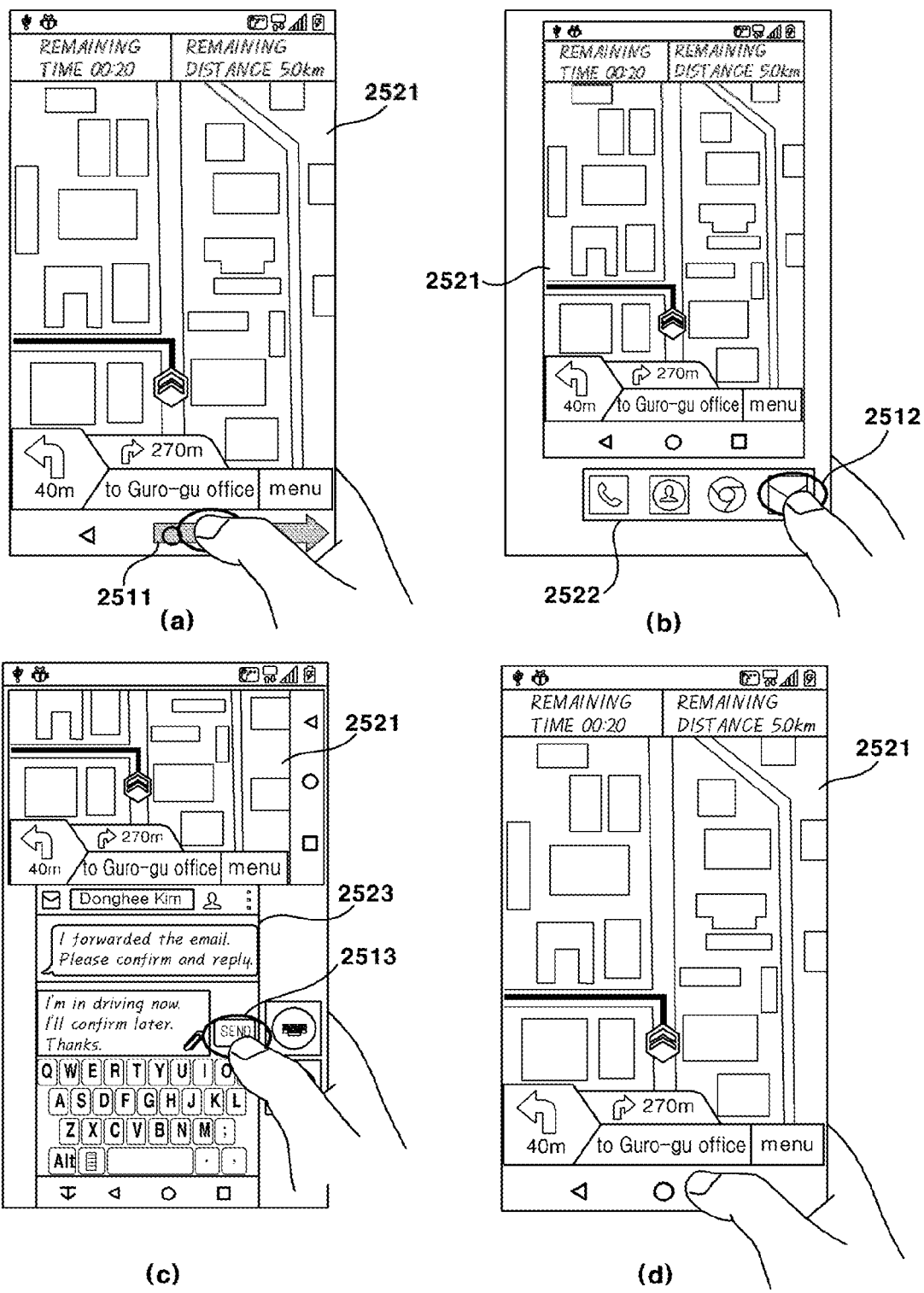

FIGS. 25a and 25b illustrate an example of executing a telephone application and a message application, while a navigation application is being executed, in one-hand operation mode of a mobile terminal for one-hand operation mode according to an exemplary embodiment of the present disclosure.

Referring to FIGS. 25a and 25b, it is illustrated an exemplary embodiment where the user executes a navigation application (2501, 2521) provided in the mobile terminal. In this state, when the user enters the one-hand operation mode by applying a touch (2511) input {(a) of FIG. 25a, (a) of FIG. 25b}, a quick launch application (2502, 2522) may be executed {(b) of FIG. 25a, (b) of FIG. 25b}. Here, the quick launch application (2502, 2522) may be displayed on a lower portion of the touch screen. The navigation screen (2501, 2521) may be displayed on an upper portion by being downscaled to the extent that the quick launch application (2502, 2522) is displayed.

Here, the executed quick launch application may at least one preset application as required by the user. The quick launch application illustrated in FIGS. 25a and 25b includes icons corresponding to applications executing a phone call, an address book, an internet, and a text message.

In this state, when the user applies a touch (1512) input on an icon corresponding to an application (phone call or text message) desired to be executed among icons included in the quick launch application (2502, 2522), the relevant application (2503, 2523) may be executed on a lower portion of the touch screen {(c) of FIG. 25a, (c) of FIG. 25b}. Here, the navigation screen (2501, 2521) may be displayed on an upper portion by being further downscaled depending on the screen size on which the executed application (2503, 2523) is displayed.

Thereafter, the navigation screen (2501, 2521) may be returned to an entire size of the screen {(d) of FIG. 25a, (d) of FIG. 25b}, when the user makes a phone call {(c) of FIG. 25a} or transmits by writing a text message to a counterpart {(c) of FIG. 25b}.

Meanwhile, according to an exemplary embodiment of the present disclosure, a telephone application may be executed, such that telephone options (for example, volume control, hanging up the phone, etc.) may be displayed in a popup (2504) on a lower portion of the touch screen.

Furthermore, according to an exemplary embodiment of the present disclosure, when the executed application is a text message application, the text message application may receive driving information (for example, an arrival place and time required, etc.) from the navigation application running on the upper portion of the touch screen, and may automatically add the driving information in the message being written.

That is, the use may conveniently enter the one-hand operation mode while the navigation is running on, such that a quick launch application (2502, 2522) may be displayed on the lower portion of the touch screen as the navigation application is continuously running on and displayed. Thereby, the user can conveniently execute desired applications using a single hand.

Figure 26A:
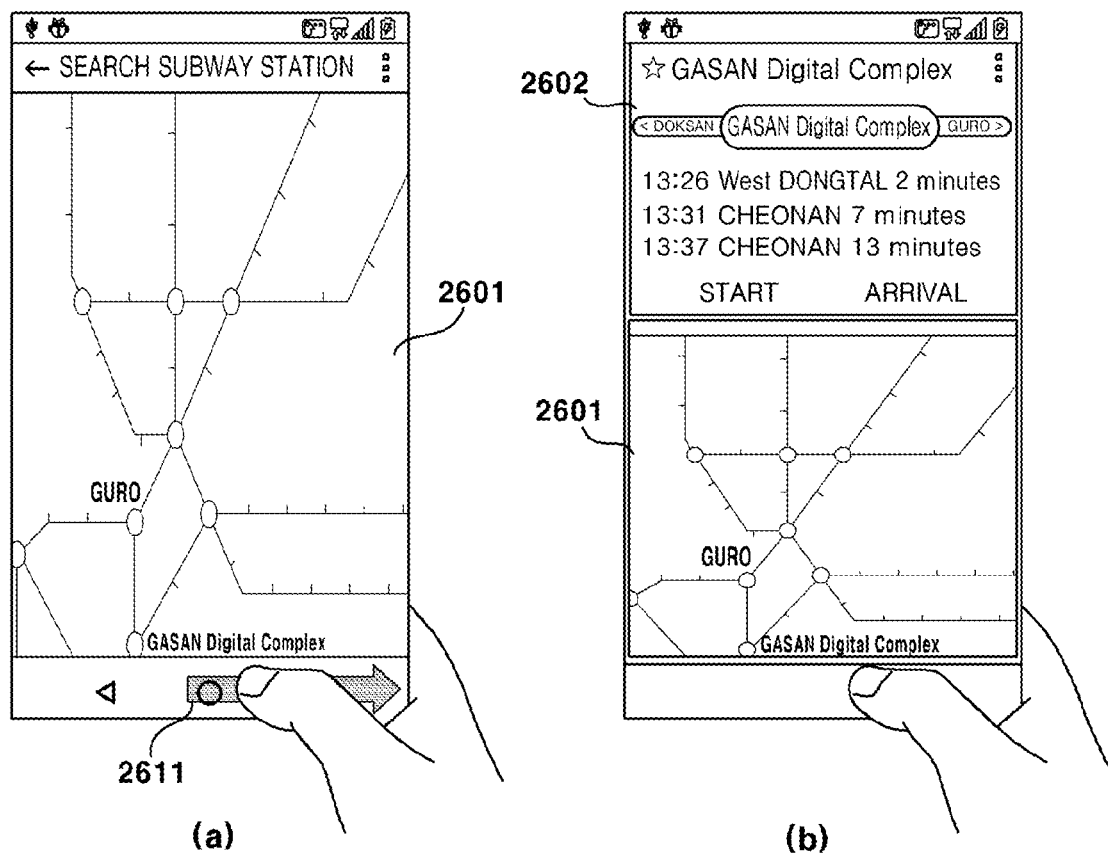
FIGS. 26a and 26b illustrate an example of providing subway arrival information and a map depending on a current location of a user, when executing an application relating to an application relating to subway routes, in one-hand operation mode of a mobile terminal for one-hand operation mode according to an exemplary embodiment of the present disclosure.
Figure 26B:
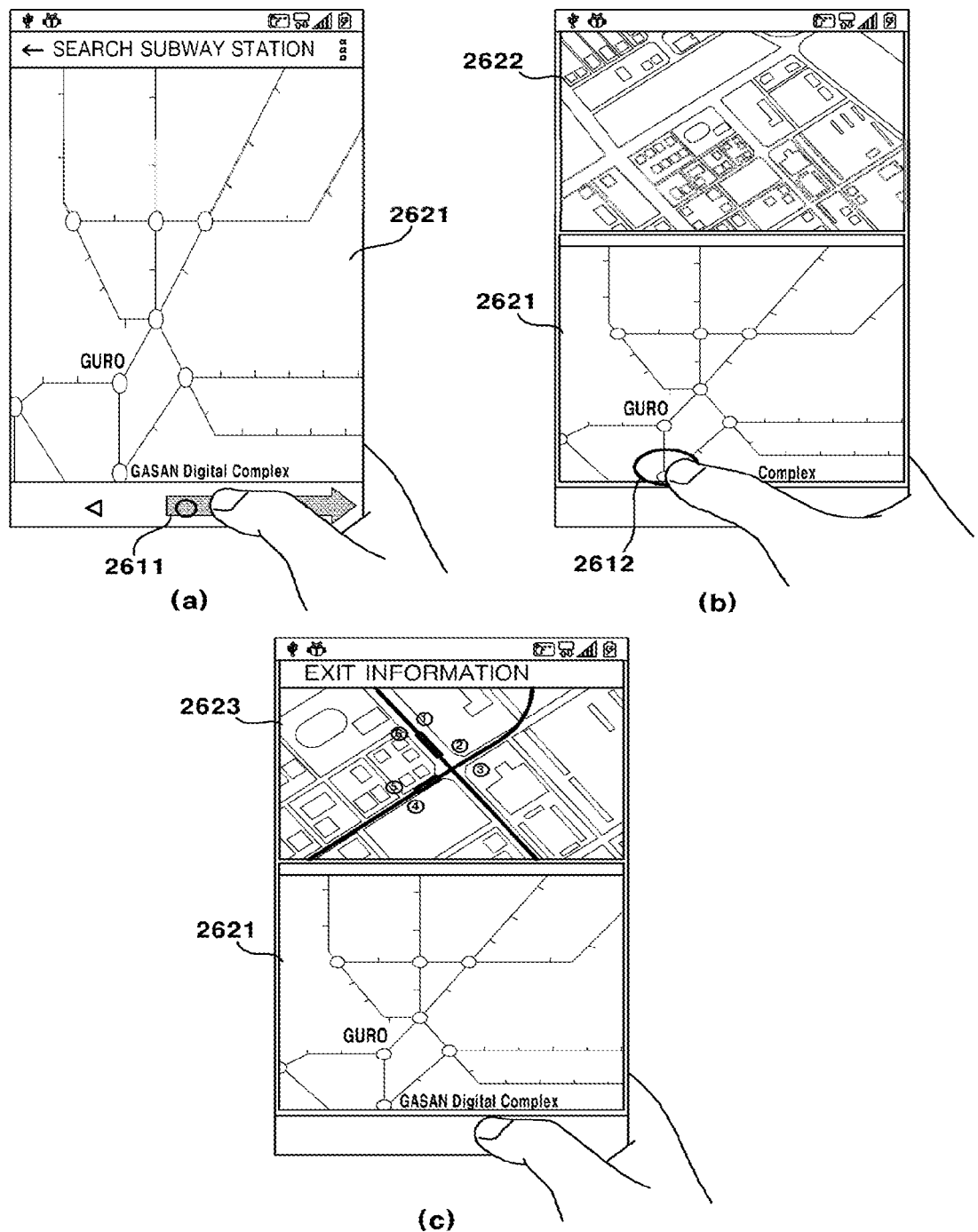

FIGS. 26a and 26b illustrate an example of providing subway arrival information and a map depending on a current location of a user, when executing an application relating to an application relating to subway routes, in one-hand operation mode of a mobile terminal for one-hand operation mode according to an exemplary embodiment of the present disclosure.

Referring to FIGS. 26a and 26b, it is illustrated an exemplary embodiment where the user executes a subway application provided in the mobile terminal. In particular, when the user enters the one-hand operation mode by applying a touch (2611) input {(a) of FIG. 26a, (a) of FIG.

26*b*} in a state where a subway route map screen (2601, 2621) is currently displayed on the entire touch screen, the subway route map screen (2601, 2621) displayed on the entire touch screen may be downscaled to the one-hand operation mode screen and displayed on a lower portion of the touch screen. In addition, information regarding the current location (2602, 2622) may be displayed on the remaining screen (for example, an upper portion) {(b) of FIG. 26*a*, and (b), (c) of FIG. 26*b*}.

Here, the information (2602, 2622) displayed on the external screen outside of the subway route map screen (2601, 2621) downscaled to the one-hand operation mode screen may be variously implemented depending on the current location of the user. More specifically, when the user is currently located inside of a subway station, the information (2602) displayed on the upper portion of the touch screen may include train arrival information of the relevant subway station {(b) of FIG. 26*a*}.

Meanwhile, a map information (2622, 2623) centering on the current location may be displayed on an upper portion of the touch screen, when the user is not currently located in the subway station {(b), (c) of FIG. 26*b*}. More specifically, when the user touches a particular subway station (2612) on the subway route map screen (2621) in a state where the map information centering on the current location is displayed {(b) of FIG. 26*b*}, a map information (2623) centering on the selected station including exit information of the selected station may be displayed on an upper portion of the touch screen. Thereby, the user can certainly appreciate the exit information of the selected statin {(c) of FIG. 26*b*}.

That is, the user may conveniently obtain subway information centering on the user's current location or map information regarding the user's current location, by entering the one-hand operation mode during use of the subway application in the mobile terminal according to an exemplary embodiment of the present disclosure.

FIG. 27 illustrates an example of displaying a record of pages visited when using a browser, or changing the record, in one-hand operation mode of a mobile terminal for one-hand operation mode according to an exemplary embodiment of the present disclosure.

Referring to FIG. 27, the mobile terminal according to an exemplary embodiment of the present disclosure may display visit history by use of a browser in the one-hand operation mode, in a card format by levels (2710, 2720, 2730) {(a) of FIG. 27}. According to an exemplary embodiment of the present disclosure, a series of the visit histories may be displayed in a horizontal direction, when levels of the visit histories are the same with one another. Alternatively, a series of the visit histories may be displayed in a vertical direction, when levels of the visit histories are different from one another.

Here, the user may apply a flicking (2701) input on the lower portion of the touch screen, that is, on the visit history corresponding to the lowest level (2710). In response to a direction of the inputted flicking (2701), the mobile terminal according to an exemplary embodiment of the present disclosure may control movement of screens displaying the visit history {(b), (c) of FIG. 27}.

In particular, when a flicking (2701) input is applied in a right direction as illustrated in (b) of FIG. 27, the visit history belonging to the same level may be moved to the right direction {(b) of FIG. 27}. When the flicking (2702) input is applied in an upward direction as illustrated, the visit history in different level may be moved to the upper level {(c) of FIG. 27}.

That is, the user can certainly appreciate the visit history by use of a browser at a glance by levels. When it is required, the user can conveniently move the visit history by applying a touch input on a lower portion of the touch screen with a single hand holding the mobile terminal.

FIG. 28 illustrates an example of writing a reply email when confirming an email message, in one-hand operation mode of a mobile terminal for one-hand operation mode according to an exemplary embodiment of the present disclosure.

Referring to FIG. 28, it is illustrated an exemplary embodiment where the user confirms an email and writes a reply mail using the mobile terminal. In particular, when the user enters the one-hand operation mode by applying a touch (2811) input in a state where an email application is executed such that the received mail is displayed on the entire touch screen (2801) {(a) of FIG. 28}, the email screen (2801) displayed on the entire touch screen may be downscaled by the one-hand operation mode, and may be displayed on an upper portion of the touch screen.

In addition, a screen for writing a reply mail (2802, 2803) may be displayed on the remaining screen (for example, on a lower portion) {(b), (c) of FIG. 28}. In particular, the screen for writing a reply mail (2802, 2803) may include a screen for writing a reply mail using a keyboard (2802) and a screen for writing a reply mail using voice (2803). According to an exemplary embodiment of the present disclosure, the screen including a keyboard (2802) may be displayed on a lower portion of the touch screen at first when the user enters the one-hand operation mode. Then, when a touch (2812) input is applied on a voice input button included in the keyboard, the screen may be converted to the screen for writing a reply mail using voice (2803). However, the present disclosure is not limited hereto. Therefore, the screen displayed when entering the one-hand operation mode may vary depending on setting by the user.

That is, the user may enter the one-hand operation mode while confirming an email to confirm the received email, and may write a reply mail.

Figure 29:
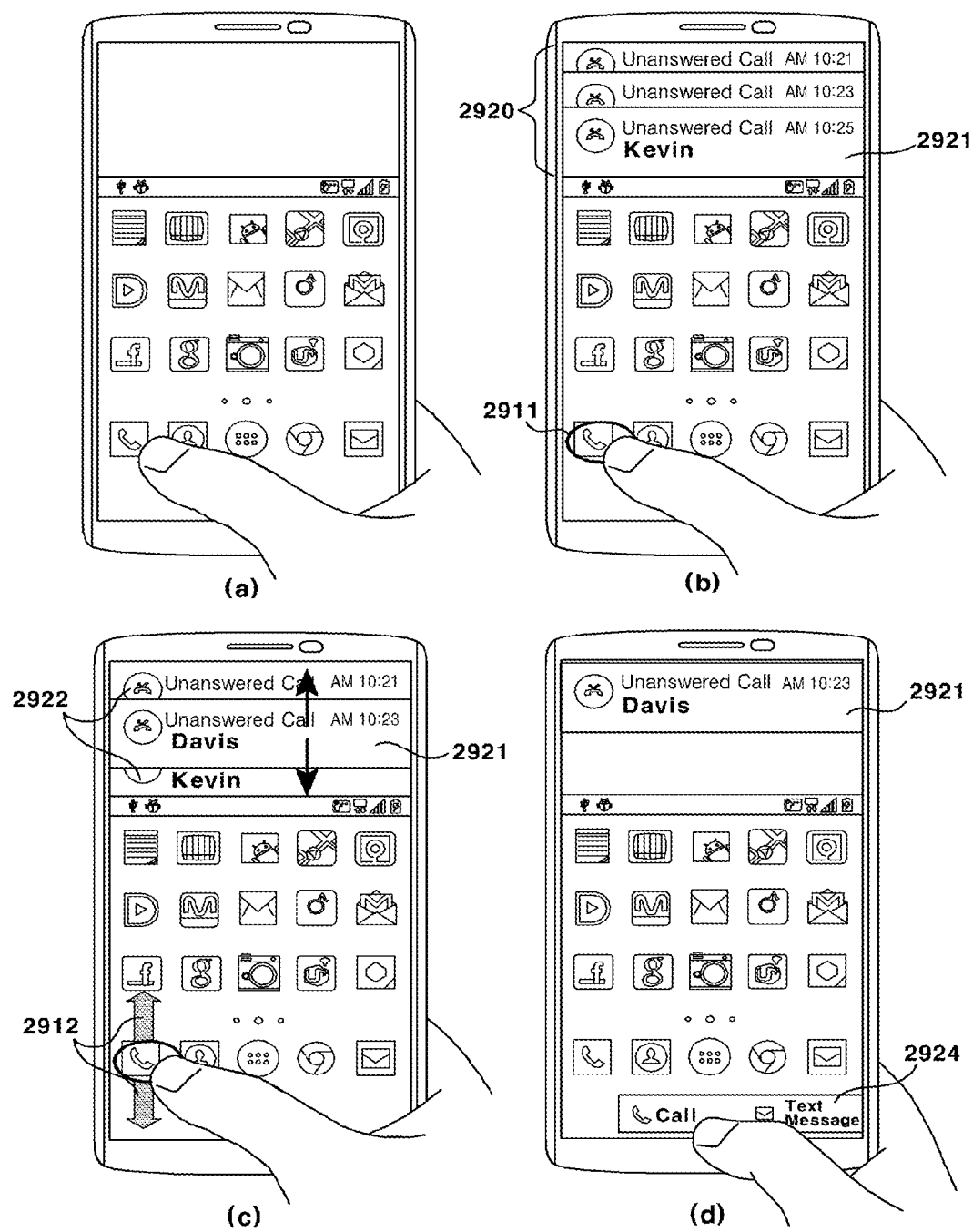
FIG. 29 illustrates an example of confirming a notification for a relevant application or performing an action for the notification by touching an icon, in one-hand operation mode of a mobile terminal for one-hand operation mode according to an exemplary embodiment of the present disclosure.

FIG. 29 illustrates an example of confirming a notification for a relevant application or performing an action for the notification by touching an icon, in one-hand operation mode of a mobile terminal for one-hand operation mode according to an exemplary embodiment of the present disclosure.

As illustrated in FIG. 29, when the user applies a touch (2911) on an icon corresponding to an application the user desires to execute (for example, a telephone application) in one-hand operation mode with no notification displayed {(a) of FIG. 29}, notifications (2920) previously generated in relation to the relevant application may be displayed on the external screen (for example, an upper portion of the touch screen) {(b) of FIG. 29}.

In this state, the user may apply a flicking (2912) input in upward or downward direction while maintaining the touch (2911) input applied on the icon in (b) of FIG. 29. The mobile terminal according to an exemplary embodiment of the present disclosure may scroll the notifications (2920) displayed on the external screen, in response to the direction of the flicking (2912) {(c) of FIG. 29}. Here, the user may apply the flicking (2912) such that the notification (2921) the user desires to confirm may be displayed in front of the other notifications or in a center of the other notifications, and may select the relevant notification (2921).

Afterwards, when the user release all touch inputs on the touch screen, an action for the selected notification may be performed. In particular, when the selected notification is a notification notifying an unanswered call as illustrated in (d) of FIG. 29, the other notifications except for the selected notification (2921) may disappear from the external screen and only the selected notification (2921) may be displayed on the external screen. Furthermore, a screen (2924) for making a phone call or sending a text message to a counterpart of the unanswered call may be displayed on a lower portion of the touch screen.

That is, the user may certainly appreciate notifications previously generated in relation to a particular application through the external screen of the one-hand operation mode screen. Furthermore, the user may simply apply a flicking action to select the desired notification, and may perform the relevant action using a single hand.

Figure 30:
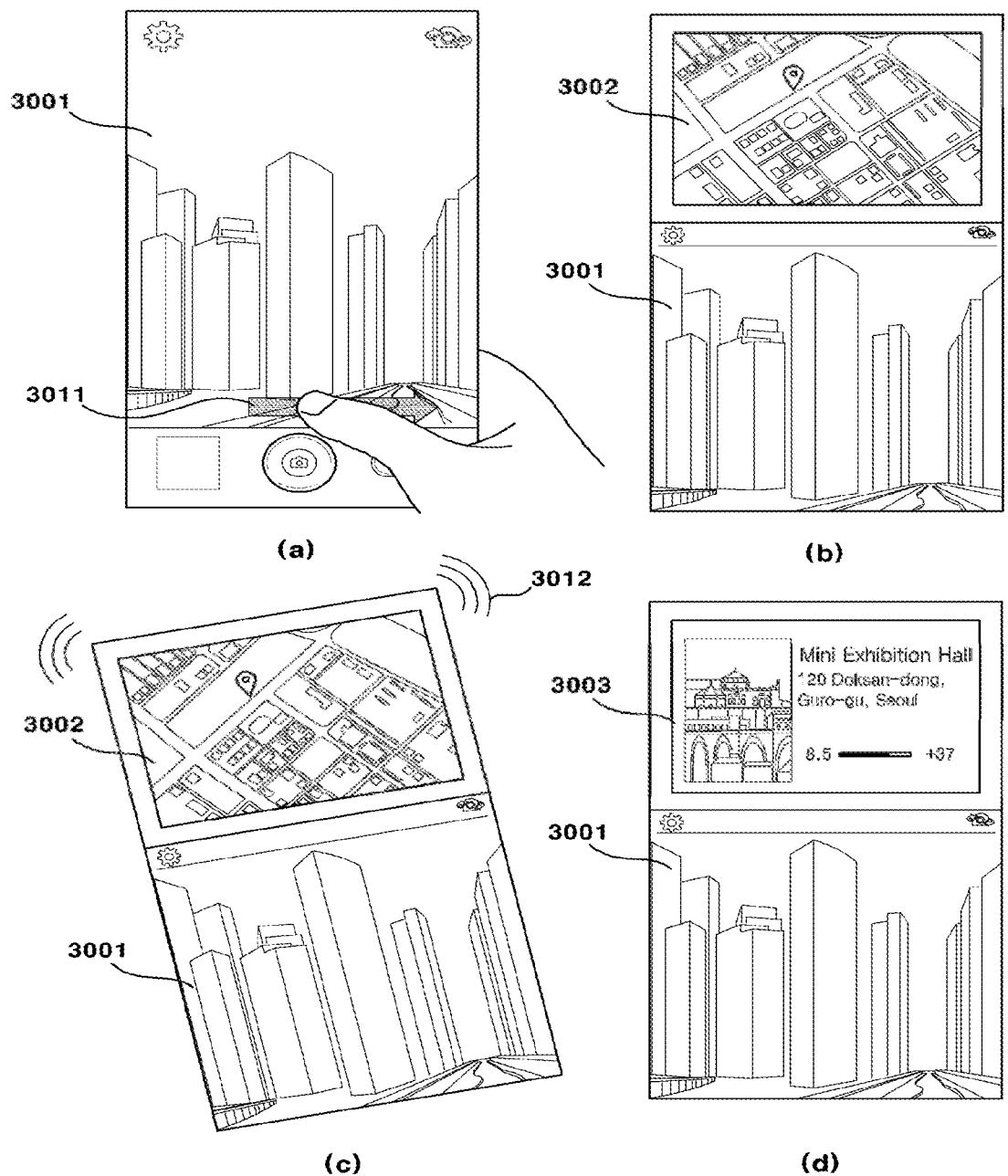
FIG. 30 illustrates an example of performing an action for a camera application, in one-hand operation mode of a mobile terminal for one-hand operation mode according to an exemplary embodiment of the present disclosure.

FIG. 30 illustrates an example of performing an action for a camera application, in one-hand operation mode of a mobile terminal for one-hand operation mode according to an exemplary embodiment of the present disclosure.

Referring to FIG. 30, the user may enter the one-hand operation mode by applying a touch (3011) input in a state where a camera application (3001) is being executed {(a) of FIG. 30}. When the mobile terminal enters the one-hand operation mode, a photographing mode screen (3001) of the currently executed camera application may be downscaled to the one-hand operation mode screen, and may be displayed on a lower portion of the touch screen {(b) of FIG. 30}. In addition, the mobile terminal may detect a current location of the mobile terminal, and may display map information centering on the current location (3002) on the external screen (for example, on an upper portion of the touch screen).

As a particular example, the map information (3002) displayed on the external screen may include a current location of the user and a recommended location for photographing. When the current location corresponds to the recommended location, the mobile terminal may provide a notification to the user {(c) of FIG. 30}. In this state, when the user recognizes the notification, and then bounces or shakes (3012) the mobile terminal for once, information regarding the recommended location (3003) may be displayed on the external screen {(d) of FIG. 30}. Here, the information regarding the recommended location may include position information of the location, review information, and star-rating information.

That is, the user may execute a camera application in the one-hand operation mode in order to take a picture, and may obtain map information of a recommended location and specific information of the recommended location, while the camera application is being executed.

Figure 31:
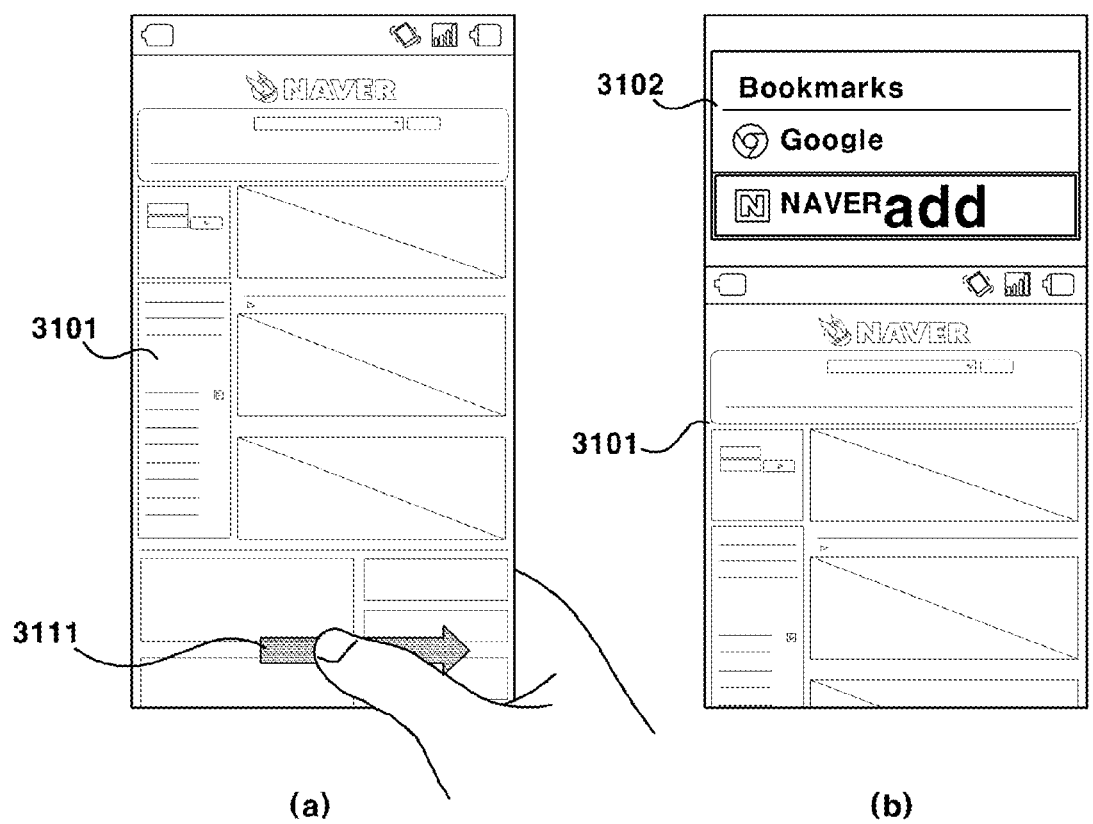
FIG. 31 illustrates an example of performing an action for a browser, in one-hand operation mode of a mobile terminal for one-hand operation mode according to an exemplary embodiment of the present disclosure.

FIG. 31 illustrates an example of performing an action for a browser, in one-hand operation mode of a mobile terminal for one-hand operation mode according to an exemplary embodiment of the present disclosure.

Referring to FIG. 31, the user may apply a touch (3111) input to enter the one-hand operation mode while an internet browser application (3101) is being executed {(a) of FIG. 31}. When the user enters the one-hand operation mode, the currently executed internet browser screen (3101) may be downscaled to the one-hand operation mode screen and may be displayed on a lower portion of the touch screen {(b) of FIG. 31}. In addition, the mobile terminal may display a bookmark screen (3102) on the external screen (for example, on an upper portion of the touch screen).

According to an exemplary embodiment of the present disclosure, when the mobile terminal enters the one-hand operation mode, a displayed page may be stored as a bookmark of the bookmark screen (3102). The user may control the browser using a single hand to confirm and select another bookmark displayed on the bookmark screen (3102), such that the relevant page may be displayed on the touch screen.

Figure 32:
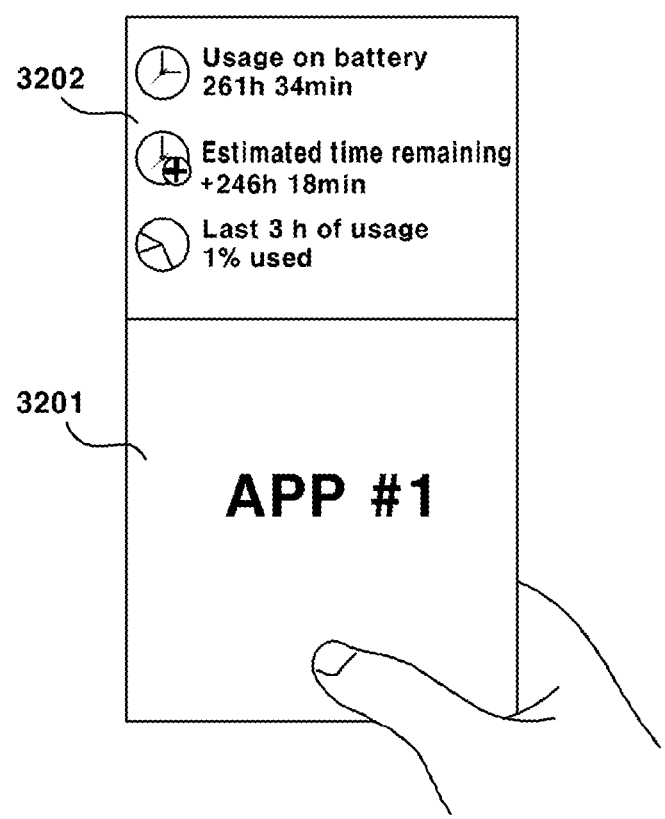
FIG. 32 illustrates an example of performing an action for a browser, in one-hand operation mode of a mobile terminal for one-hand operation mode according to an exemplary embodiment of the present disclosure.

FIG. 32 illustrates an example of performing an action for a browser, in one-hand operation mode of a mobile terminal for one-hand operation mode according to an exemplary embodiment of the present disclosure.

Referring to FIG. 32, the mobile terminal in one-hand operation mode is illustrated. Here, the external screen out of the one-hand operation mode screen (3201) may include battery information (3202) relating to the currently executed application, when the application (3201) does not have any particular operation executed in the one-hand operation mode. In particular, the battery information (3202) of the application may include battery usage of the application, available battery lifetime for running the application, etc.

That is, the user may confirm battery information of a particular application through the external screen in real time, even when the application running in the one-hand operation mode screen does not have any particular operation executed in the one-hand operation mode.

Figure 33A:
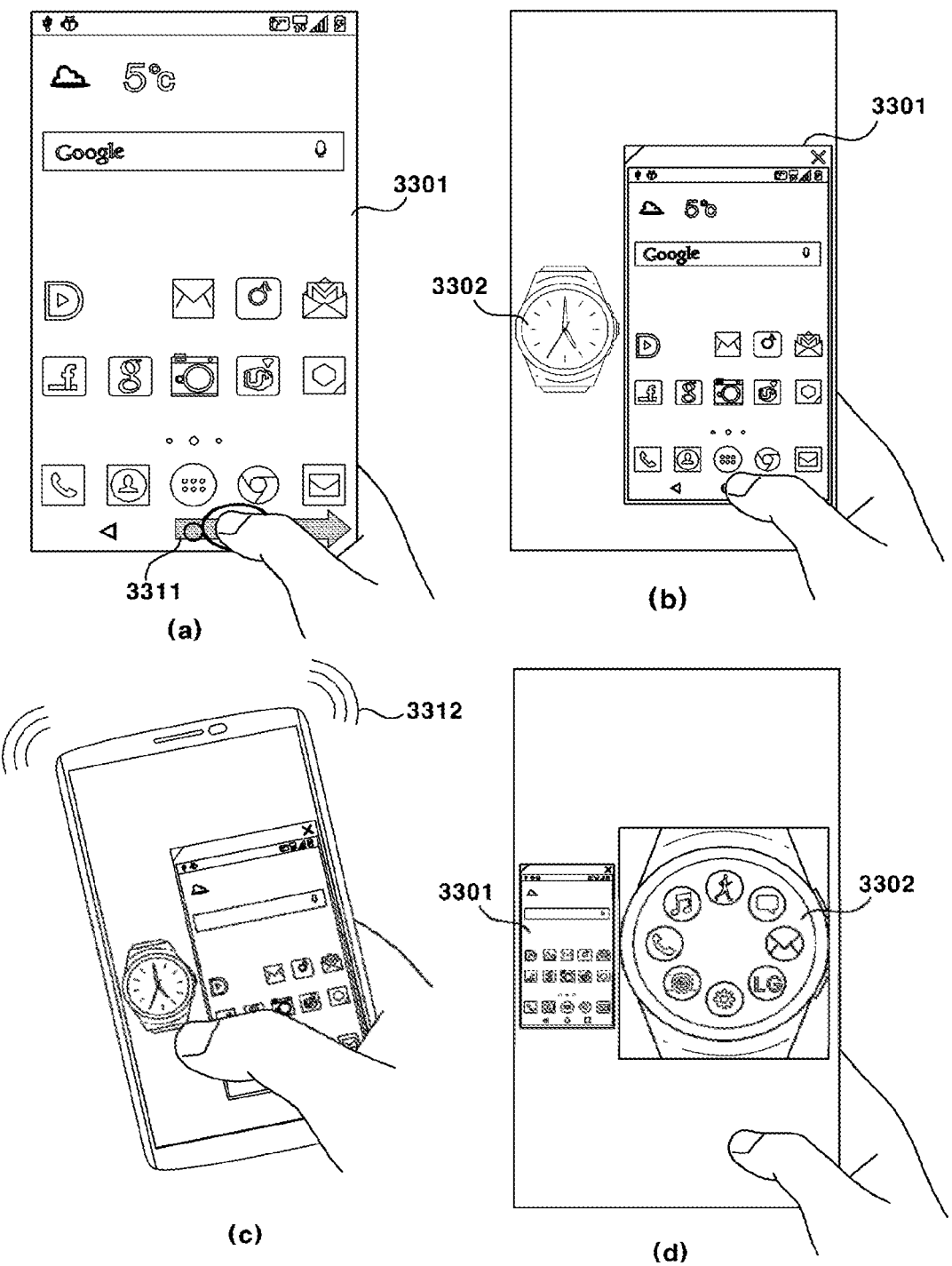

FIGS. 33*a* and 33*b* illustrate an example of changing display of a paired device and a displayed position of the paired device, in one-hand operation mode of a mobile terminal for one-hand operation mode according to an exemplary embodiment of the present disclosure.

Referring to FIGS. 33*a* and 33*b*, the mobile terminal according to an exemplary embodiment of the present disclosure may be paired with an external device (for example, a smart watch) through a local area network (for example, Bluetooth). Here, a screen (for example, a wallpaper, 3301, 3321) may be displayed throughout the screen.

In this state, when the user applies a touch (3311) input to enter the one-hand operation mode {(a) of FIG. 33*a*, (a) of FIG. 33*b*}, the mobile terminal may downscale the wallpaper (3301, 3321) to one-hand operation mode screen (3301, 3321), and may display the wallpaper (3301, 3321) on a lower right portion (FIG. 33*a*) or on a lower portion (FIG. 33*b*). Furthermore, the mobile terminal may display the currently paired device (3302, 3322) on the external screen outside of the one-hand operation mode screen (3301, 3321) {(b) of FIG. 33*a*, (b) of FIG. 33*b*}.

Meanwhile, the screen displaying the paired device (3302, 3322) displayed on the external screen may be displayed in various ways in response to the current status of the paired device. For a particular example, when the paired device is a smart watch and a screen displaying the present time is displayed on the smart watch, the screen of the paired device displayed on the external screen may also display the present time. When a notification is being executed on the paired device, the screen of the paired device displayed on the external screen may display a notification being executed.

Here, the paired device (3302, 3322) displayed on the external screen may be on a position harder to control using a single hand, in comparison with the position of the downscaled one-hand operation mode screen (3301, 3321). However, the mobile terminal according to an exemplary embodiment of the present disclosure may change positions of the paired device (3302, 3322) and the downscaled one-hand operation mode screen (3301, 3321) in a similar manner as illustrated in (c) of FIG. 3*a* moving a notification to a lower portion of the touch screen.

Meanwhile, according to an exemplary embodiment of the present disclosure, the mobile terminal may display a subject adjacent to the single hand holding the mobile terminal comparatively larger than the other subject. Thus, the other subject may be displayed comparatively smaller than the subject adjacent to the single hand holding to the mobile terminal.

In particular, the mobile terminal according to an exemplary embodiment of the present disclosure may include a motion sensor (for example, a gyro sensor). The mobile terminal may exchange positions of the paired device (3302, 3322) and the downscaled one-hand operation mode screen (3301, 3321) in a horizontal (FIG. 33*a*) or vertical (FIG. 33*b*) direction {(d) of FIG. 33*a*, (d) of FIG. 33*b*} using the motion sensor, when the user bounces or shakes the mobile terminal once {3312, (c) of FIG. 33*a*, (c) of FIG. 33*b*}.

That is, according to an exemplary embodiment of the present disclosure, the user may enter the one-hand operation mode to confirm a device currently paired with the mobile terminal, and may change positions of the downscaled one-hand operation mode screen and the paired device using a simple gesture. Thereby, the user may conveniently control both of the one-hand operation mode screen and the paired device using a single hand.

Figure 34A:
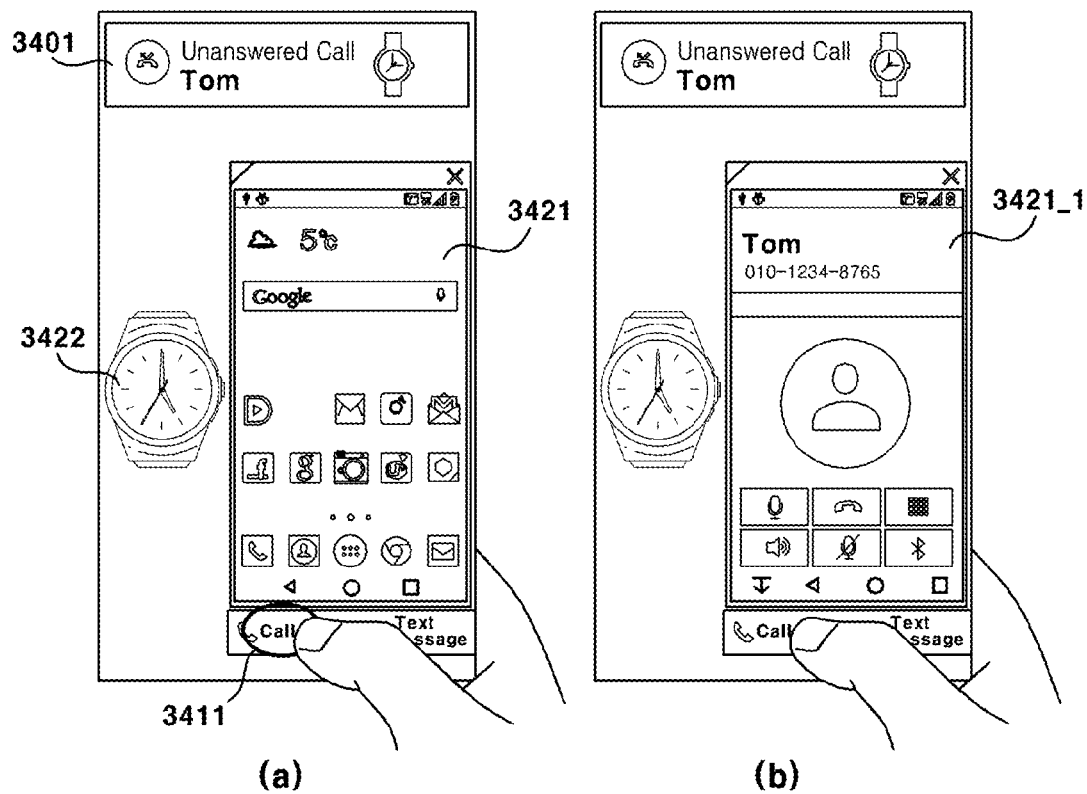
FIGS. 34a and 34b illustrate an example of performing telephone conversation, when a notification for an unanswered call is generated, in one-hand operation mode of a mobile terminal for one-hand operation mode according to an exemplary embodiment of the present disclosure.
Figure 34B:
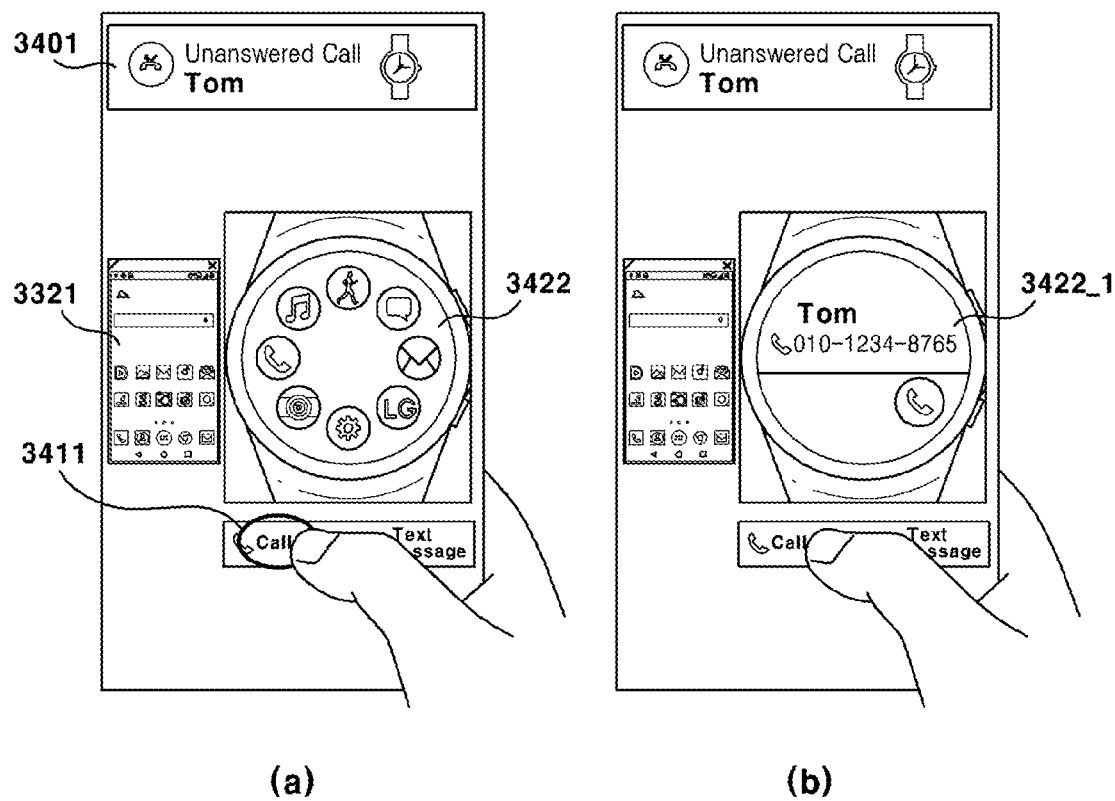

FIGS. 34*a* and 34*b* illustrate an example of performing telephone conversation, when a notification for an unanswered call is generated, in one-hand operation mode of a mobile terminal for one-hand operation mode according to an exemplary embodiment of the present disclosure.

Referring to FIGS. 34*a* and 34*b*, it is illustrated a state where a notification (3401) for an unanswered call is generated on an upper portion of the touch screen in one-hand operation mode, and a menu for making a phone call or sending a text message to the counterpart of the unanswered call may be displayed on the lower portion of the touch screen {(a) of FIG. 34*a*, (a) of FIG. 34*b*}.

In this state, the user may input a touch (3411) on a call button disposed on a lower portion, when the user desires to make a phone call to the counterpart of the unanswered call. Meanwhile, the device (3421 of FIG. 34*a*, 3422 of FIG. 34*b*) adjacent to the single hand holding the mobile terminal may perform the call function (3421_1 of FIG. 34*a*, 3422_1 of FIG. 34*b*) in response to the touch (3411) input of the user {(b) of FIG. 34*a*, (b) of FIG. 34*b*}, even when both of the mobile terminal (3421) and the paired device (3422) are capable of performing the phone call in response to the touch (3411) input of the user.

That is, according to an exemplary embodiment of the present disclosure, the device displayed adjacent to the single hand holding the mobile terminal in the one-hand operation mode may be recognized as the device currently being operated by the user. The phone call operation may be performed through the relevant device, when any particular setting is not applied.

Figure 35A:
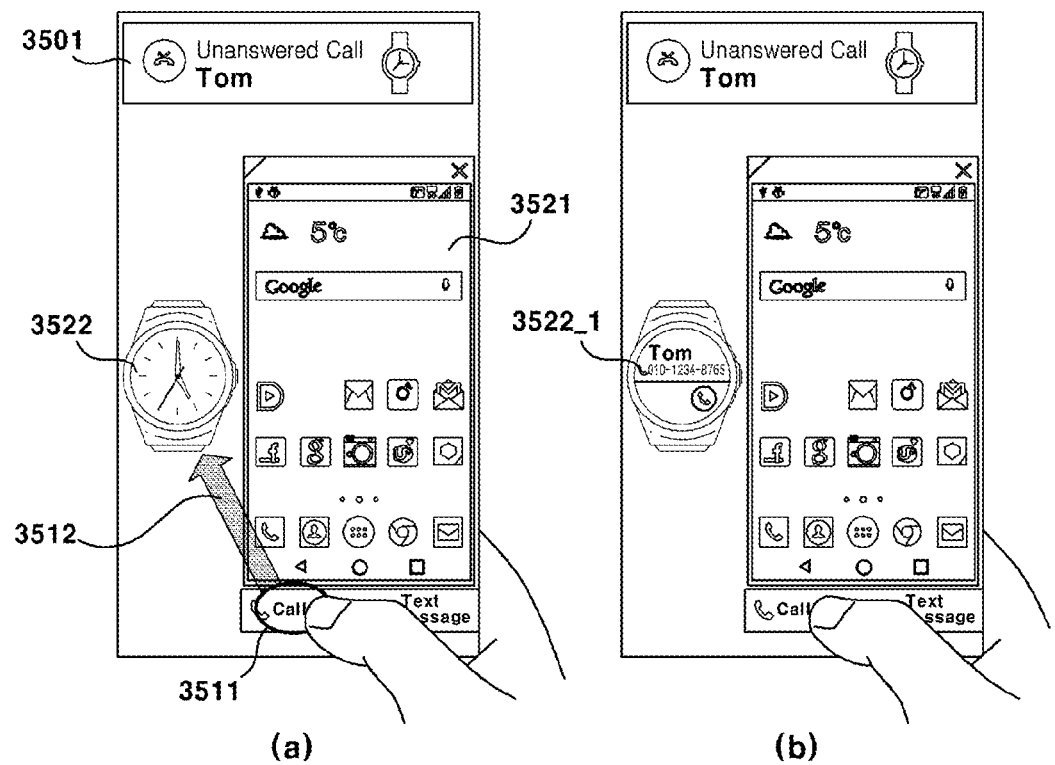
FIGS. 35a and 35b illustrate an example of selecting a device for telephone conversation, when a notification for an unanswered call is generated, in one-hand operation mode of a mobile terminal for one-hand operation mode according to an exemplary embodiment of the present disclosure.
Figure 35B:
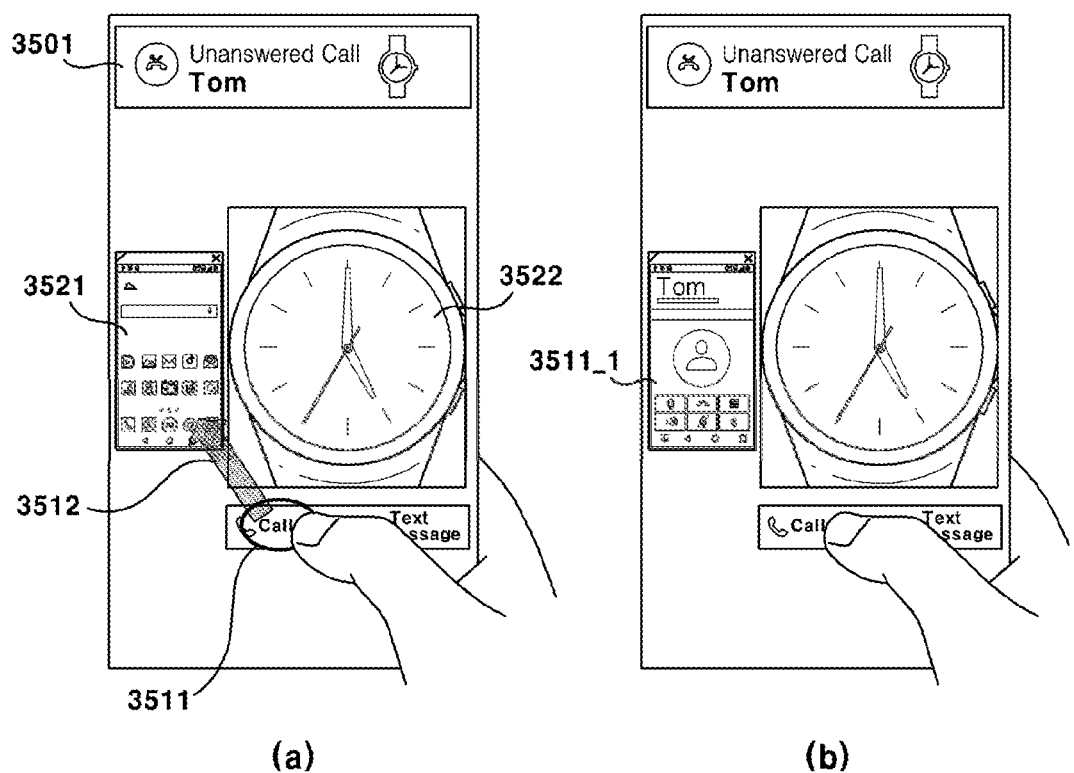

FIGS. 35*a* and 35*b* illustrate an example of selecting a device for telephone conversation, when a notification for an unanswered call is generated, in one-hand operation mode of a mobile terminal for one-hand operation mode according to an exemplary embodiment of the present disclosure.

FIGS. 35*a* and 35*b* illustrate an example where the phone call function is performed through another device other than the device (3521 of FIG. 35*a*, 3522 of FIG. 35*b*) displayed adjacent to the single hand of the user, in a situation similar to that of previously described FIGS. 34*a* and 34*b*.

Referring to FIGS. 35*a* and 35*b*, it is illustrated a state where a notification (3501) for an unanswered call is generated on an upper portion of the touch screen, and a menu for making a phone call or sending a text message to a counterpart of the unanswered call is displayed on a lower portion of the touch screen {(a) of FIG. 35*a*, (a) of FIG. 35*b*}.

The user may input a touch (3511) on the call button disposed on the lower portion in this state, when the user desires to make a phone call to the counterpart of the unanswered call. The user may select a desired device to make a phone call, when both of the mobile terminal (3521) and the paired device (3522) are capable of performing the phone call function.

In particular, when the user moves a call button to the desired device (3522 of FIG. 35*a*, 3521 of FIG. 35*b*) using a drag (3512) input while maintaining the touch (3511) inputted on the call button, the telephone function may be performed through the relevant device (3522 of FIG. 35*a*, 3521 of FIG. 35*b*).

To describe in comparison with the previously described FIGS. 34*a* and 34*b*, the device displayed adjacent to the single hand of the user may perform the telephone call function (FIGS. 34*a* and 34*b*), when the user simply touches the call button. Meanwhile, when the user selects a desired device using drag input on the call button, the telephone function may be performed through the selected device.

That is, the user may apply a drag action to select a device performing a function in response to the displayed notification.

Figure 36A:
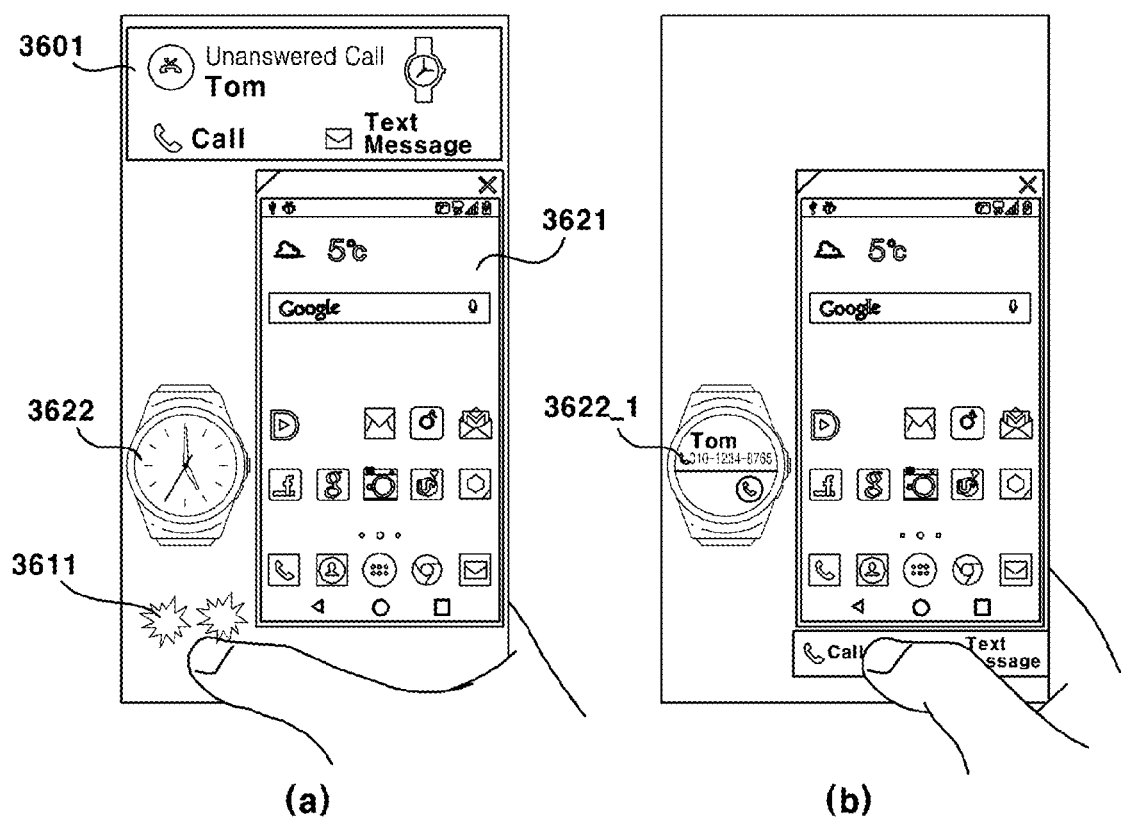
FIGS. 36a and 36b illustrate an example of selecting a device for telephone conversation, when a notification for an incoming call is generated, in one-hand operation mode of a mobile terminal for one-hand operation mode according to an exemplary embodiment of the present disclosure.
Figure 36B:
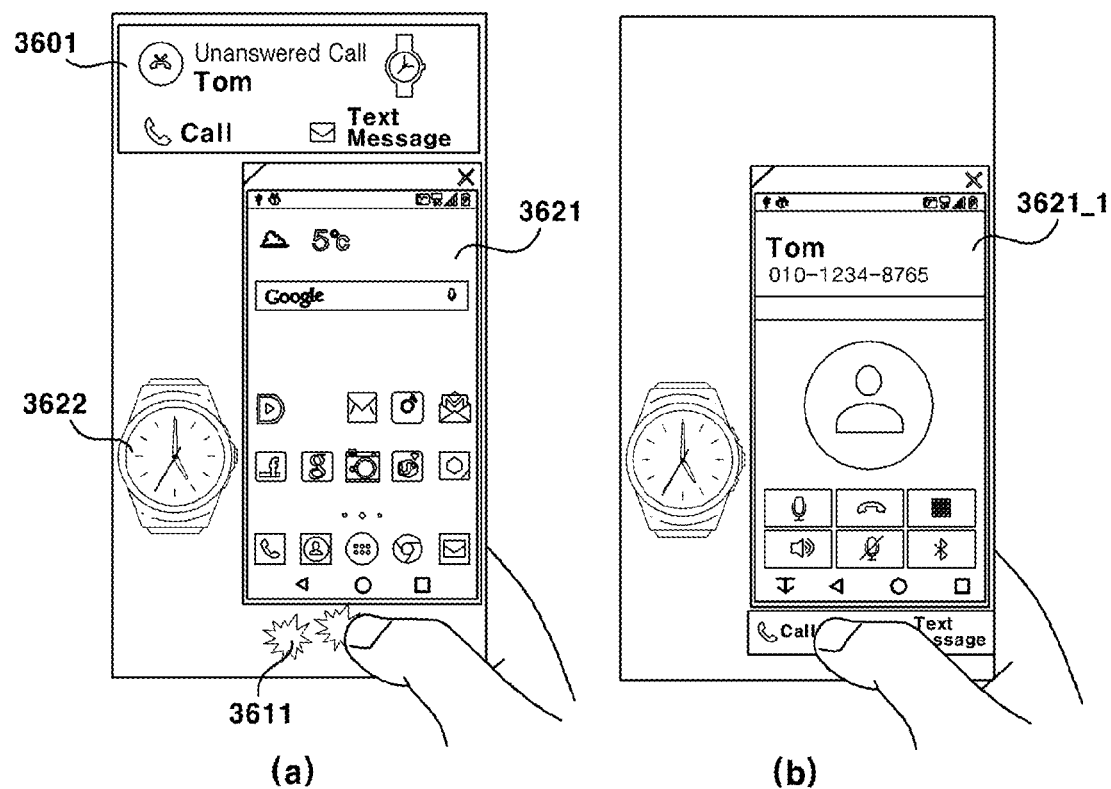

FIGS. 36*a* and 36*b* illustrate an example of selecting a device for telephone conversation, when a notification for an incoming call is generated, in one-hand operation mode of a mobile terminal for one-hand operation mode according to an exemplary embodiment of the present disclosure.

Referring to FIGS. 36*a* and 36*b*, it is illustrated a state where a notification (3601) on a call reception is generated on an upper portion of the touch screen, and a paired device (3622) and the one-hand operation mode screen (3621) are displayed {(a) of FIG. 36*a*, (a) of FIG. 36*b*}.

Here, the user may select a desired device to perform the telephone conversation function {(b) of FIG. 36*a*, (b) of FIG. 36*b*}, when the user desires to perform a telephone conversation in response to the call being received and both of the mobile terminal (3621) and the paired device (3622) are capable of performing the telephone conversation function.

In particular, the user may apply a tapping action (3611) on a lower portion of the screen displaying the desired device at least twice to perform the telephone conversation function through the relevant device in response to the call being received. For example, the user may receive a phone call through the paired device (3622_1), when the user twice taps (3611) a lower portion of the paired device (3622) as illustrated in FIG. 36*a*, rather than the mobile terminal (3621) displayed adjacent to the single hand of the user. In the same manner, the user may receive a phone call through the mobile terminal (3621_1), when the user twice taps a lower portion of the mobile terminal (3621) displayed adjacent to the single hand of the user as illustrated in FIG. 36*b*.

That is, according to an exemplary embodiment of the present disclosure, the user may make a telephone conversation of an incoming call through the selected device, when the user selects a desired device among the mobile terminal and the paired device displayed in the one-hand operation mode using a simple tapping action.

FIGS. 37*a* to 38*b* illustrate an example of selecting a device for telephone conversation, when a transmission object is searched, in one-hand operation mode of a mobile terminal for one-hand operation mode according to an exemplary embodiment of the present disclosure.

Figure 37A:
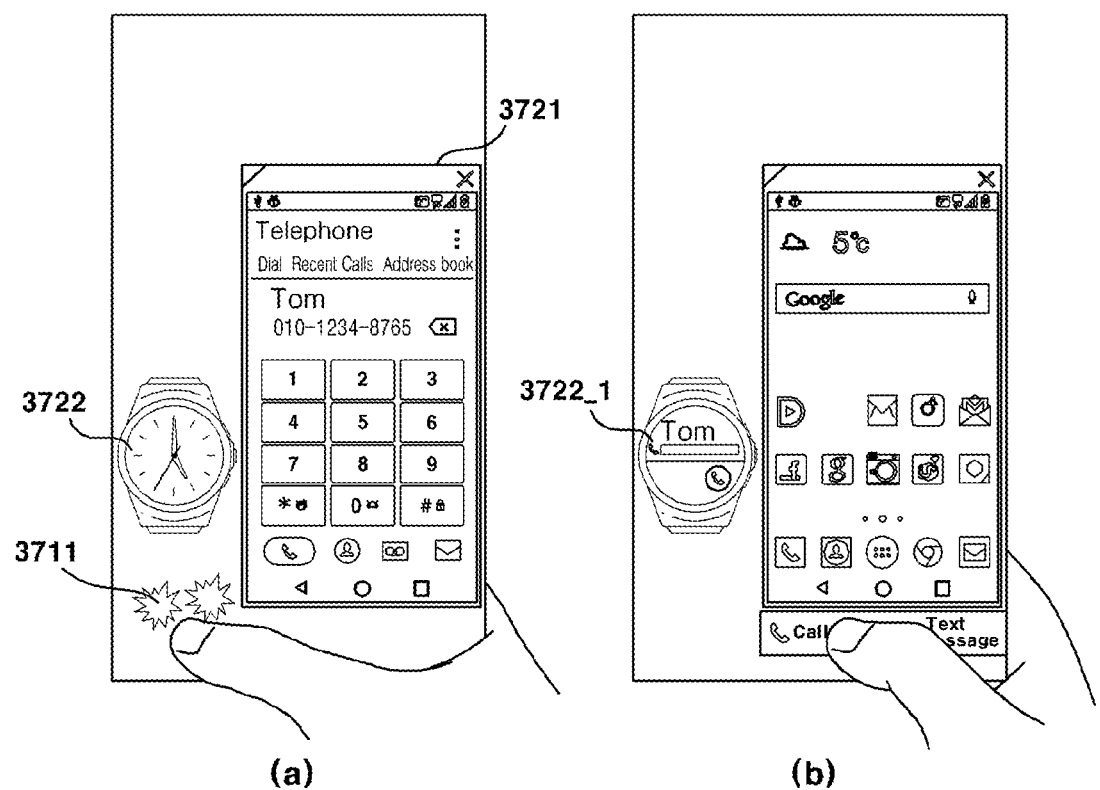
FIGS. 37a to 38b illustrate an example of selecting a device for telephone conversation, when a transmission object is searched, in one-hand operation mode of a mobile terminal for one-hand operation mode according to an exemplary embodiment of the present disclosure.
Figure 37B:
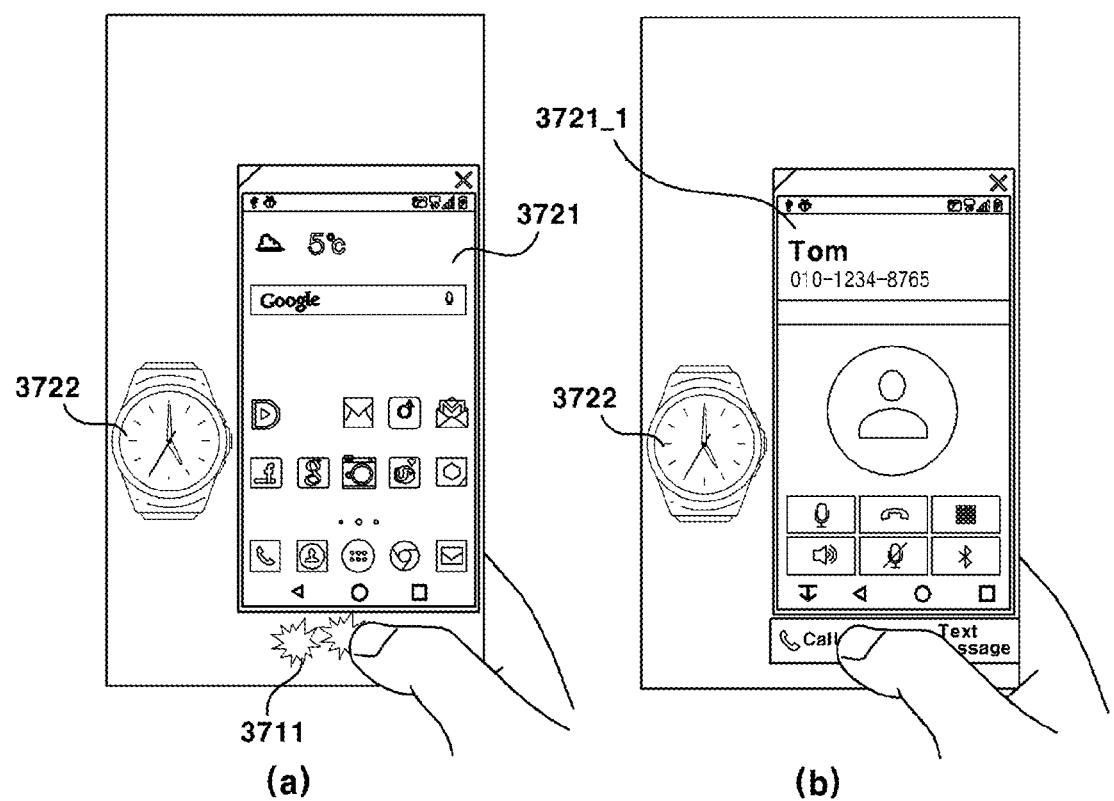

FIGS. 37a and 37b illustrate an exemplary embodiment where the user makes a phone call to a counterpart, while FIGS. 36a and 36b illustrate an exemplary embodiment of receiving a phone call.

Referring to FIGS. 37a and 37b, the user may apply a tapping action (3711) at least twice to select a desired device to perform a telephone conversation, in a state where the user has searched (or inputted) a telephone number of a counterpart in the mobile terminal. Then, the user may make a phone call to the counterpart through the selected device.

For example, the user may make a phone call through the paired device (3722_1), when the user twice taps (3711) a lower portion of the paired device (3722) as illustrated in FIG. 37a, rather than the mobile terminal (3721) displayed adjacent to the single hand of the user. In the same manner, the user may make a phone call through the mobile terminal (3721_1), when the user twice taps a lower portion of the mobile terminal (3721) displayed adjacent to the single hand of the user as illustrated in FIG. 37b.

Figure 38A:
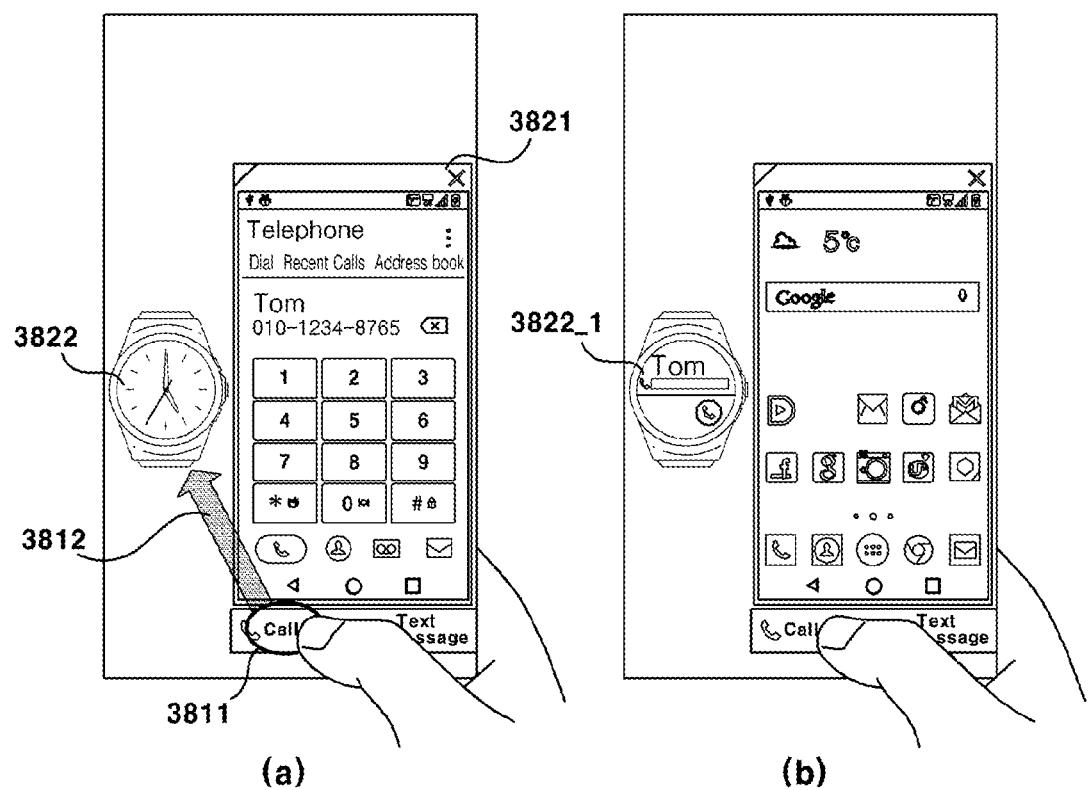
Figure 38B:
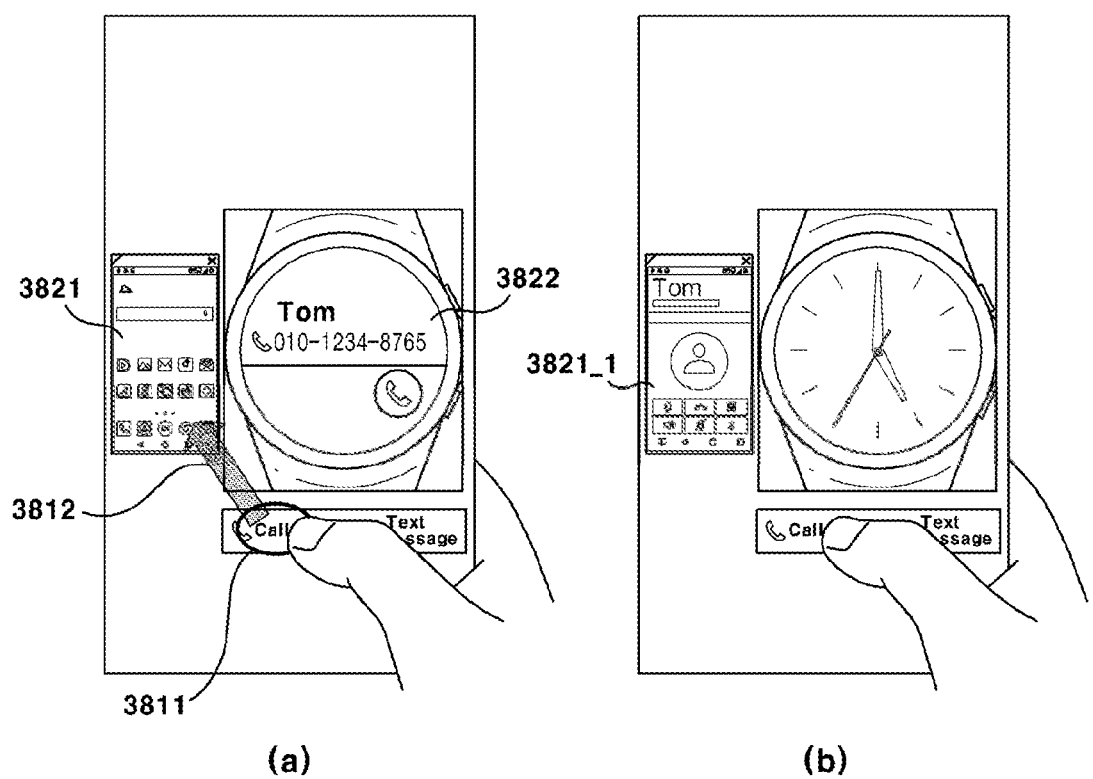

For the next, referring to FIGS. 38a and 38b, the user may apply a touch (3811) and drag (3812) on the call button to a desired device (3822 of FIG. 38a, 3821 of FIG. 38b) in a state where the user has searched (or inputted) a telephone number of a counterpart in the mobile terminal or in the paired device. Then, the user may make a phone call to the counterpart through the selected device (3822 of FIG. 38a, 3821 of FIG. 38b).

For example, the user may move the call button to the paired device (3822) through the touch (3811) and drag (3812) input on the call button to make a phone call through the paired device (3822_1), when the user desires to make a phone call through the paired device (3822) rather than the mobile terminal (3821), in a state where the telephone counterpart's phone number is searched or inputted on the mobile terminal (3821) displayed adjacent to the single hand of the user, as illustrated in FIG. 38a.

In the same manner, the user may move the call button to the mobile terminal (3821) through the touch (3811) and drag (3812) input on the call button to make a phone call through the mobile terminal (3821_1), when the user desires to make a phone call through the mobile terminal (3821) rather than the paired device (3822), in a state where the telephone counterpart's phone number is searched or inputted on the paired device (3822) displayed adjacent to the single hand of the user, as illustrated in FIG. 38b.

That is, according to an exemplary embodiment of the present disclosure, the user may make a phone call to the telephone counterpart through a simple touch and drag input of the one-hand operation mode, using another device rather than the device on which the telephone counterpart's phone number is searched or inputted.

Figure 39A:
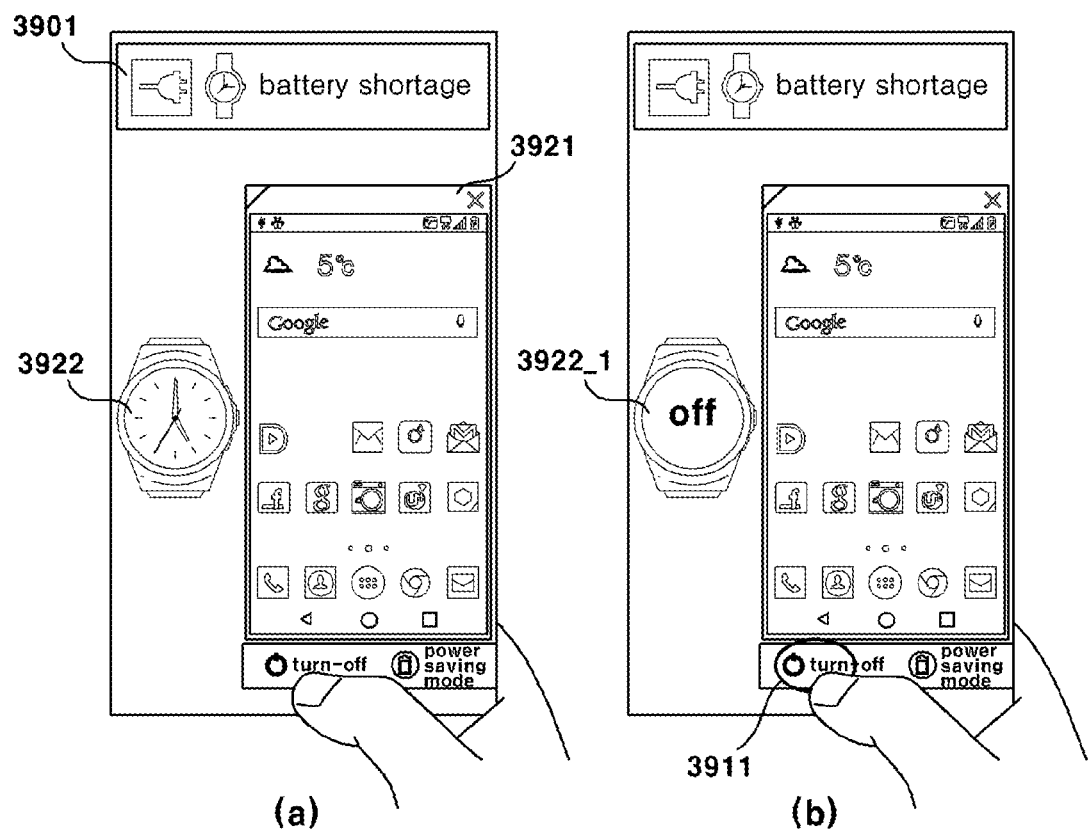
FIGS. 39a and 39b illustrate an example of, when a notification for a paired device is generated, controlling the paired device, in one-hand operation mode of a mobile terminal for one-hand operation mode according to an exemplary embodiment of the present disclosure.
Figure 39B:
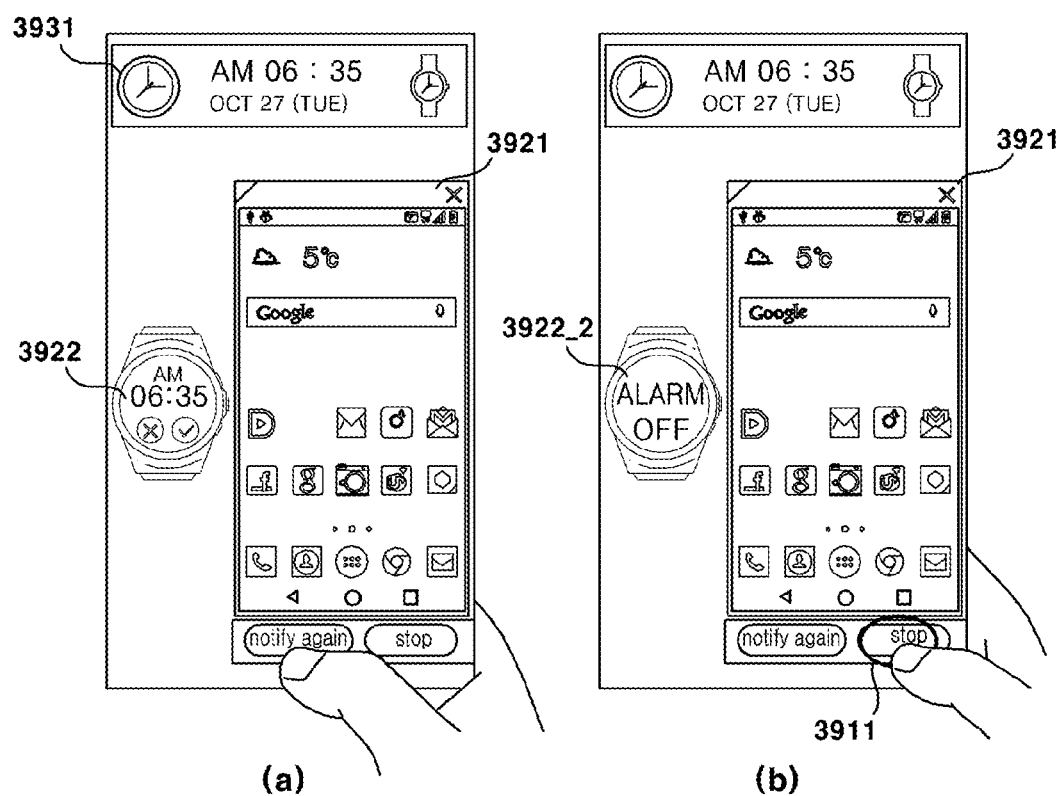

FIGS. 39a and 39b illustrate an example of, when a notification for a paired device is generated, controlling the paired device, in one-hand operation mode of a mobile terminal for one-hand operation mode according to an exemplary embodiment of the present disclosure.

At first, referring to FIG. 39a, it is illustrated an exemplary embodiment where the mobile terminal (3921) and the paired device (3922) are displayed together on the touch screen, and a notification (3901, for example, a notification of battery shortage) is generated.

Here, a screen including a menu for controlling a notification (3901) may be displayed on a lower portion of the touch screen adjacent to the single hand of the user {(a) of FIG. 39a}, when the notification (3901) of the paired device is controllable by operation of the mobile terminal.

In this state, the user may apply a touch (3911) input on a screen displayed on a lower portion of the touch screen, to control the paired device (3922) in response to the notification (3901). In particular, when the notification (3901) is a notification of battery shortage, the screen displayed on the lower portion of the touch screen may include a menu for executing a turn-off and a power saving mode. When the user applies a touch (3911) input on the turn-off menu, the power of the paired device (3922_1) may be turned off {(b) of FIG. 39a}.

Furthermore, referring to FIG. 39b, it is illustrated an exemplary embodiment where a notification (3931) of an alarm event is generated on the paired device (3922). In this case, a screen including a menu for the alarm event may be displayed on a lower portion of the touch screen adjacent to the single hand of the user {(a) of FIG. 39b}, in a similar manner as described in FIG. 39a.

In this state, the user may apply a touch (3911) input on a screen displayed on a lower portion of the touch screen, to control the paired device (3922) in response to the notification (3931). In particular, when the notification (3901) is a notification of an alarm event executed on a preset time, the screen displayed on the lower portion of the touch screen may include a menu for re-executing the alarm event and stopping the alarm event. When the user applies a touch (3911) input on the turn-off menu, the power of the paired device (3922_2) may be turned off {(b) of FIG. 39b}.

That is, when a notification is generated on the paired device, the user may control the menu displayed on the touch screen in the one-hand operation mode in response to the generated notification, even though the user does not directly control the paired device.

Figure 40A:
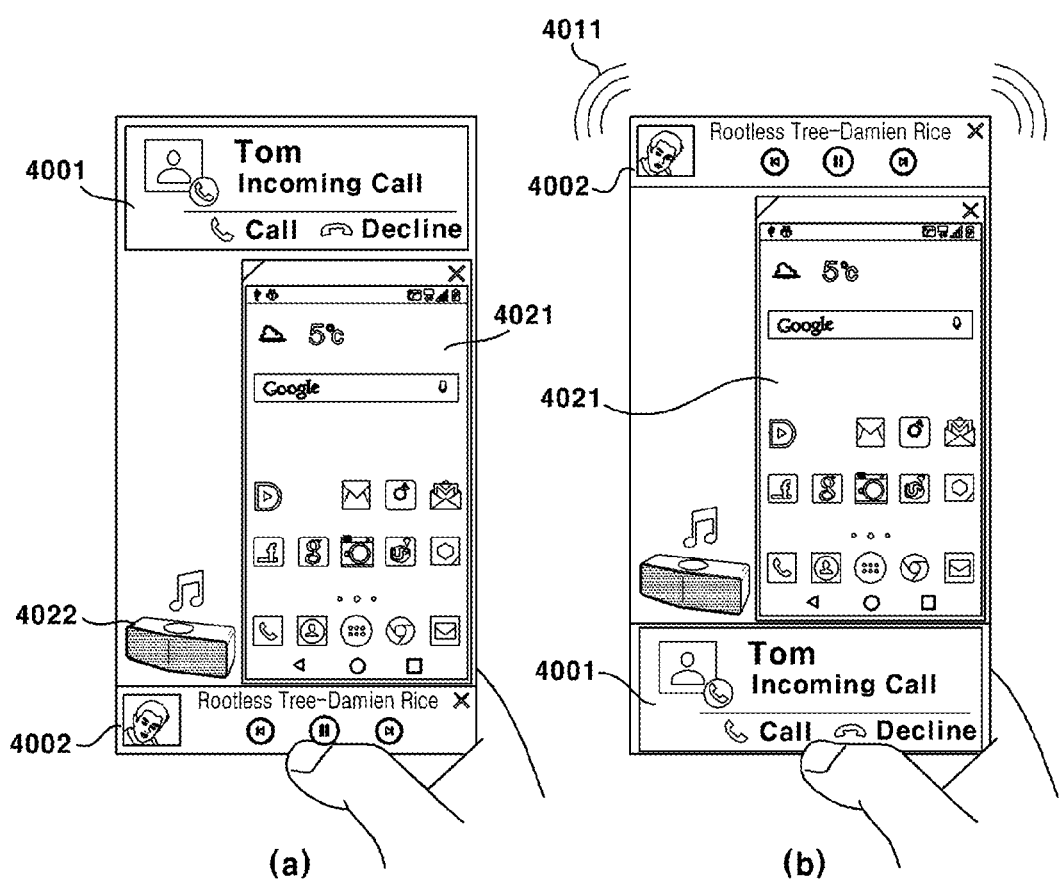
FIGS. 40a to 40c illustrate an example of selecting a device to perform a telephone conversation, when a notification for an incoming call during operation of the paired device, in one-hand operation mode of a mobile terminal for one-hand operation mode according to an exemplary embodiment of the present disclosure.
Figure 40B:
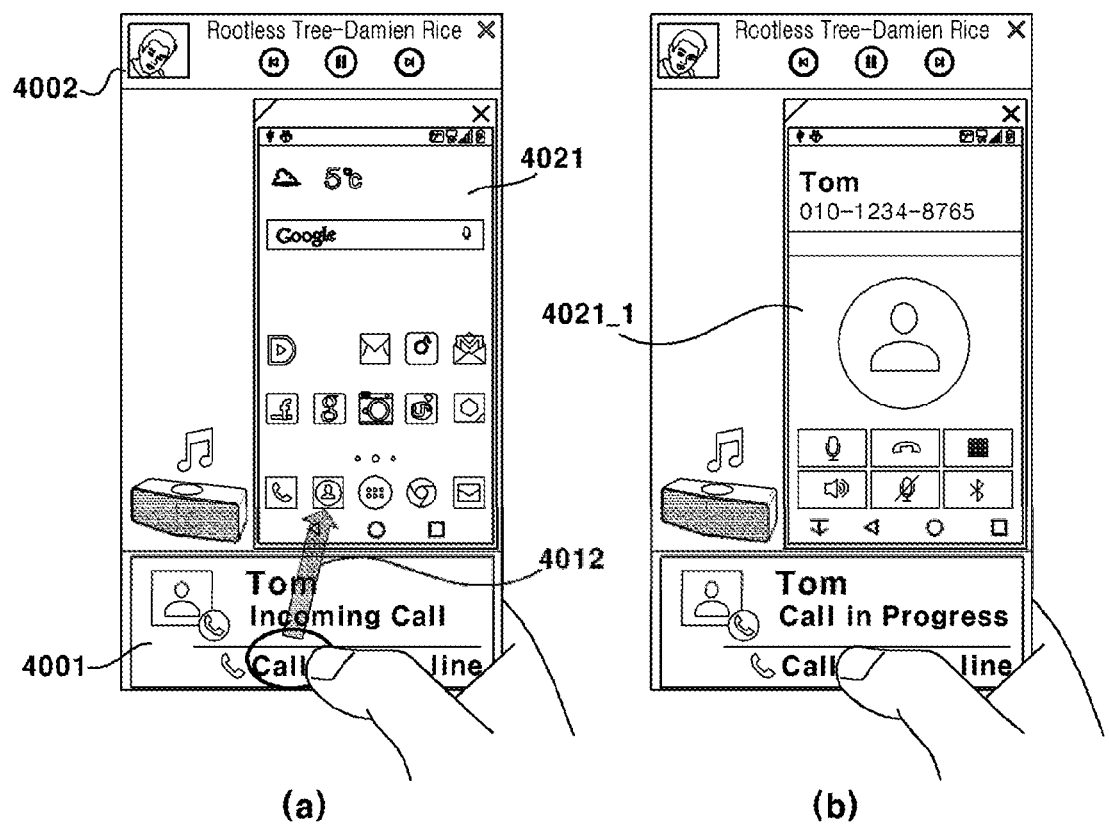
Figure 40C:
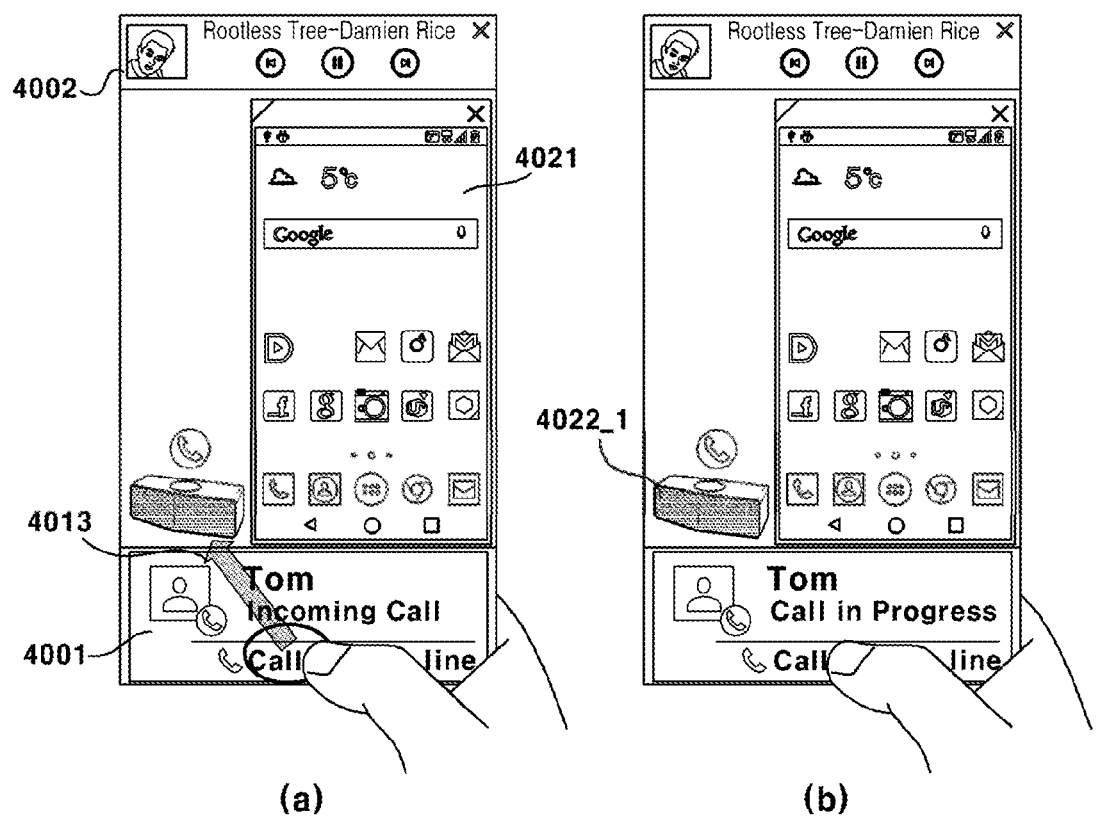

FIGS. 40a to 40c illustrate an example of selecting a device to perform a telephone conversation, when a notification for an incoming call during operation of the paired device, in one-hand operation mode of a mobile terminal for one-hand operation mode according to an exemplary embodiment of the present disclosure.

Referring to FIGS. 40a through FIG. 40b, it is illustrated an exemplary embodiment where a notification (4001) of incoming call is generated while the paired device (4022, for example, a speaker) is functioning (for example, outputting music being played) {(a) of FIG. 40a}.

In particular, a notification (4001) may be displayed on the external screen (for example, an upper portion of the touch screen) of the one-hand operation mode, when a phone call is received while the user controls a speaker (4022) paired with mobile terminal using the menu (4002) displayed on a lower portion of the touch screen adjacent to the single hand of the user, as illustrated in (a) of FIG. 40a.

In this state, the user may bounce or shake (4011) the mobile terminal once, to change (switch) positions of the notification (4001) of incoming call (displayed on the upper portion) and the menu (4002) for controlling the paired device (displayed on the lower portion). That is, the notification (4001) of incoming call may be moved to the lower portion of the touch screen adjacent to the user's single hand and the menu (4002) for controlling the paired device (4022) may be moved to the upper portion of the touch screen {(b) of FIG. 40a}.

Meanwhile, the user may control (4012, 4013) the notification (4001) of incoming call displayed on the lower portion of the touch screen to select a device outputting voice of the telephone counterpart.

As illustrated in FIG. 40b, when the user moves the notification (4001) of incoming call displayed on the lower portion of the touch screen to the mobile terminal (4021)

using a touch and drag (4012) input, the telephone counterpart's voice may be outputted through the mobile terminal (4021_1), and the paired speaker (4022) may continuously output the music being played.

Alternatively, as illustrated in FIG. 40c, when the user moves the notification (4001) of incoming call displayed on the lower portion of the touch screen to the paired speaker (4022) using a touch and drag (4013) input, the speaker (4022_1) may stop outputting the music and output the telephone counterpart's voice.

That is, according to an exemplary embodiment of the present disclosure, the user may select a device performing a phone call function by applying a touch and drag action, when a notification of incoming call is generated during operation of the paired device in the one-hand operation mode.

Figure 41B:
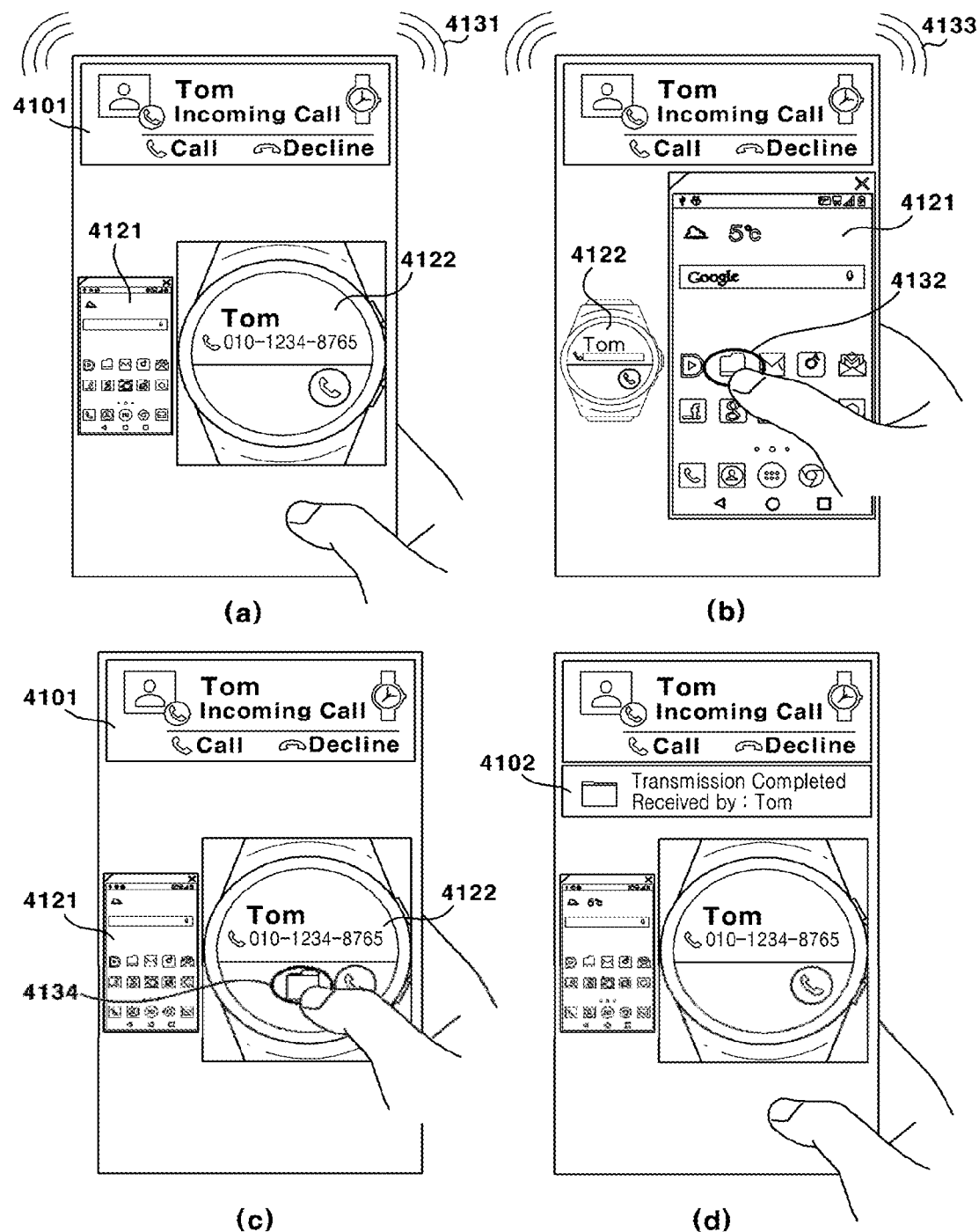

FIGS. 41a to 41b illustrate an example of transmitting a file to a telephone counterpart, in one-hand operation mode of a mobile terminal for one-hand operation mode according to an exemplary embodiment of the present disclosure.

Referring to FIGS. 41a and 41b, it is illustrated an exemplary embodiment where a file included in the mobile terminal (4221) is transmitted to the telephone counterpart through the paired device (4122).

As illustrated in (a) of FIG. 41a and (a) of FIG. 41b, the paired device (4122) may be displayed adjacent to the single hand of the user, when the user has a telephone conversation through the paired device (4122). In this state, the user may bounce or shake once (4111, 4131) the mobile terminal to change (switch) the subject to be displayed adjacent to the single hand from the paired device (4122) to the mobile terminal (4121) {(b) of FIG. 41a, (b) of FIG. 41b}.

Referring to FIGS. 41a and 41b, the user then may operate (4112, 4132) the mobile terminal (4121) to access the desired file to be transmitted to the counterpart. For example, the user may select the desired file to be transmitted, by executing a file manager application included in the mobile terminal.

Transmitting the selected file to the telephone counterpart may be performed by at least three methods. These methods will be described through FIGS. 41a and 41b.

As illustrated in (c) of FIG. 41a, when the user moves the selected file to the paired device (4122) by applying a touch and drag (4113) on the selected file, the selected file may be transmitted to the telephone counterpart. Alternatively, as illustrated in (d) of FIG. 41a, the user may control the mobile terminal (4121) to transmit the file to the telephone counterpart as occasion demands. When the file has been transmitted to the telephone counterpart, a notification (4102) of completing the file transmission may be displayed on an upper portion of the one-hand operation mode, as illustrated in (e) of FIG. 41a.

In addition, the user may bounce or shake once (4133) the mobile terminal after applying a touch (4132) input on the selected file, to change the selected file into a floating state and at the same time, to change (switch) the subject to be displayed adjacent to the single hand from the mobile terminal (4121) to the paired device (4122). Furthermore, when the user releases the touch (4132) on the selected file and drops the selected file onto the paired device (4122), the selected file may be transmitted to the telephone counterpart, as illustrated in (b) to (d) of FIG. 41b. Likewise, a notification (4102) of completing the file transmission may be displayed on an upper portion of the one-hand operation mode.

That is, according to an exemplary embodiment of the present disclosure, the user may conveniently operate a file included in the mobile terminal using a single hand to transmit the file to the telephone counterpart through the paired device.

Figure 42A:
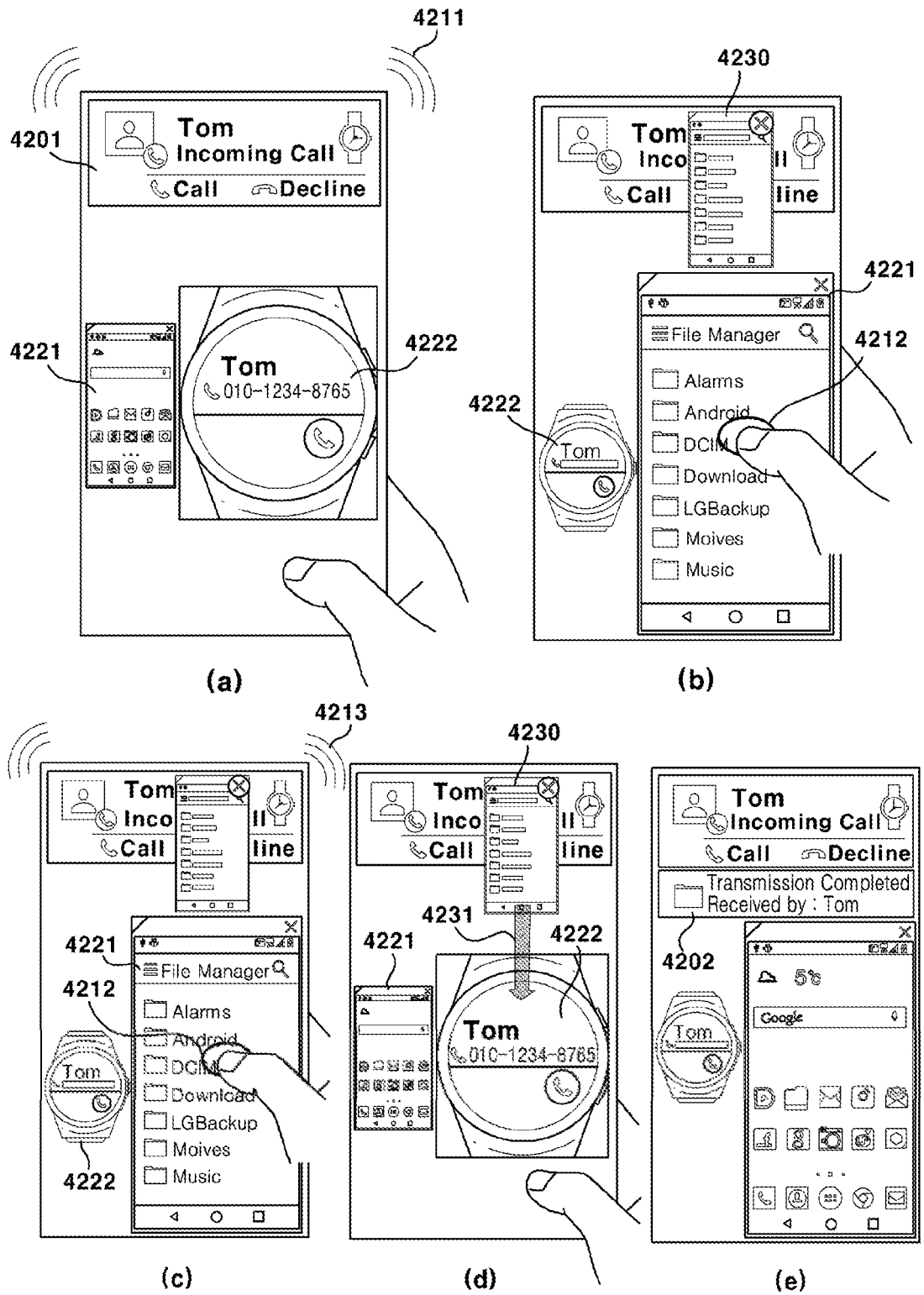

FIGS. 42a to 42b illustrate an example of transmitting a file to a telephone counterpart, in one-hand operation mode of a mobile terminal for one-hand operation mode according to an exemplary embodiment of the present disclosure.

Referring to FIGS. 42a and 42b, it is illustrated an exemplary embodiment where a capture image of a screen displayed on the mobile terminal (4221) is transmitted to a telephone counterpart through a paired device (4222).

As illustrated in (a) of FIG. 42a and (a) of FIG. 42b, the paired device (4222) may be displayed adjacent to the single hand of the user during telephone conversation through the paired device (4222). In this state, the user may bounce or shake once (4211) the mobile terminal, to change (switch) the subject to be displayed adjacent to the single hand from the paired device (4222) to the mobile terminal (4221) {(b) of FIG. 42a, (b) of FIG. 42b}.

Afterwards, the user may operate (4212) the mobile terminal (4221) displayed adjacent to the single hand, to generate a capture the user desires to transmit to the telephone counterpart. For example, the user may apply a long touch (4212) on the mobile terminal (4221) displaying the screen to be captured, to generate a capture image of the screen currently being displayed. Here, the generated capture image may be displayed on the external screen (for example, an upper portion) in a preview form (4230).

Transmitting the generated capture image to the telephone counterpart may be performed by at least two methods. These methods will be described through FIGS. 42a and 42b.

As illustrated in (c) of FIG. 42a, the user may bounce or shake once (4213) the mobile terminal (4221) while maintaining the long touch (4212) on the mobile terminal (4221), to change (switch) the subject to be displayed adjacent to the single hand from the mobile terminal (4221) to the paired device (4222). In this state, when the user releases the long touch (4212), the capture image (4230) may be transmitted to the telephone counterpart {4231, (d) of FIG. 42a}. When the capture image (4230) has been transmitted to the telephone counterpart through this process, a notification (4202) of completing the file transmission may be displayed on an upper portion of the one-hand operation mode, as illustrated in (e) of FIG. 42a.

Furthermore, as illustrated in (c) to (e) of FIG. 42b, the user may bounce or shake once (4213) the mobile terminal (4221) while releasing the long touch (4212) on the mobile terminal (4221), to change (switch) the subject to be displayed adjacent to the single hand from the mobile terminal (4221) to the paired device (4222). In this state, when the user applies a touch (4213) input (for example, a knock) on the paired device (4222) displayed adjacent to the single hand, the capture image (4230) may be transmitted to the telephone counterpart {4231, (d) of FIG. 42b}. When the capture image (4230) has been transmitted to the telephone counterpart through this process, a notification (4202) of completing the file transmission may be displayed on an upper portion of the one-hand operation mode, as illustrated in (e) of FIG. 42b.

That is, according to an exemplary embodiment of the present disclosure, the user may conveniently operate the mobile terminal using a single hand to transmit a capture image generated in the mobile terminal to the telephone counterpart through the paired device.

Figure 43:
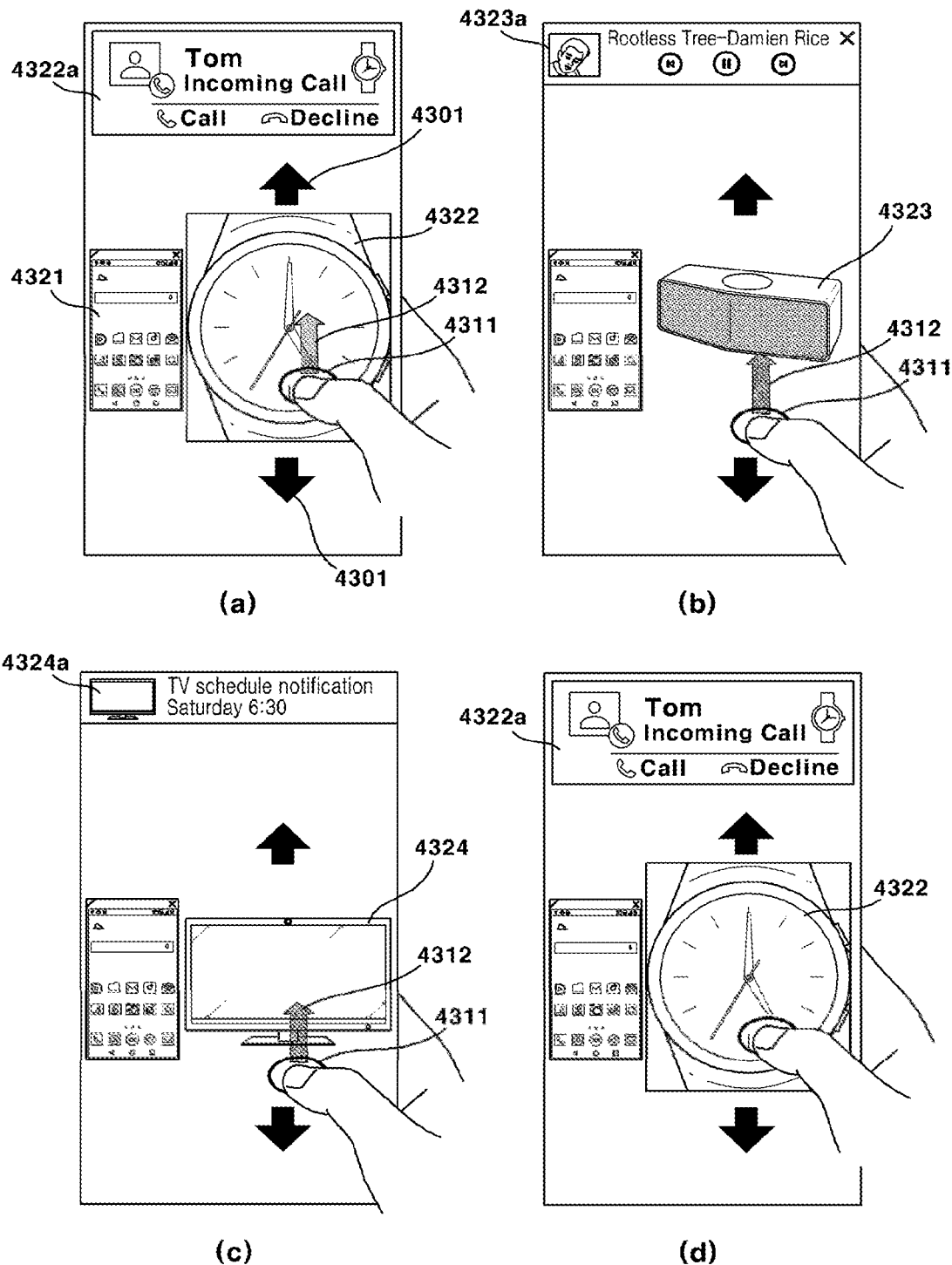
FIG. 43 illustrates an example of selecting a paired device, when pairable devices are in a plural number, in one-hand operation mode of a mobile terminal for one-hand operation mode according to an exemplary embodiment of the present disclosure.

FIG. 43 illustrates an example of selecting a paired device, when pairable devices are in a plural number, in one-hand operation mode of a mobile terminal for one-hand operation mode according to an exemplary embodiment of the present disclosure.

According to an exemplary embodiment illustrated in FIG. 43, when a plurality of devices (4322, 4323, 4324) pairable with the mobile terminal is present, the user may perform pairing with each device in sequence in the one-hand operation mode, and notifications (4322*a*, 4323*a*, 4324*a*) of the paired devices may be displayed on the mobile terminal.

At first, a device (4322) currently paired with the mobile terminal may be displayed. For example, when a smart watch (4322) is paired with the mobile terminal as illustrated in (a) of FIG. 43, the paired smart watch (4322) and its corresponding notification (4322*a*) may be displayed on the touch screen. In addition, when there is present a device pairable with the mobile terminal (or a device that was previously paired with mobile terminal), although the device is not currently paired with the mobile terminal, an arrow may be displayed above/below a screen displaying the smart watch (4322). By the arrow (4301) displayed with the smart watch, the user may recognize presence of the pairable devices (4323, 4324) other than the smart watch (4322).

In this state, when the user applies a touch (4311) on the screen displaying the smart watch (4322) and flicks up (or down) while maintaining the touch (4311), a speaker (4323), which is another device other than the smart watch (4322), may be displayed on the touch screen, and the displayed speaker (4323) may be automatically paired with the mobile terminal (4321) {(b) of FIG. 43}. Furthermore, a menu (4323*a*) for controlling music play may be displayed on the external screen (on an upper portion) of the one-hand operation mode screen in response to the newly paired speaker (4323). In the same manner, an arrow (4301) may be displayed above/below a screen displaying the speaker (4323). By the arrow (4301) displayed with the speaker (4323), the user may recognize presence of the pairable devices (4322, 4324) other than the speaker (4323).

In this state, when the user applies a touch (4311) on the screen displaying the speaker (4323) and flicks up (4312) while maintaining the touch (4311), a smart TV (4324), which is another device other than the speaker (4323), may be displayed on the touch screen, and the displayed smart TV (4324) may be automatically paired with the mobile terminal (4321) {(c) of FIG. 43}. Along with this, a schedule notification (4324*a*) may be displayed on the external screen (on an upper portion) of the one-hand operation mode screen in response to the newly paired smart TV (4324). In the same manner, an arrow (4301) may be displayed above/below a screen displaying the smart TV (4324). By the arrow (4301) displayed with the smart TV (4324), the user may recognize presence of the pairable devices (4322, 4323) other than the smart TV (4324).

In this state, when the user applies a touch (4311) on the screen displaying the smart TV (4324) and flicks up (4312) while maintaining the touch (4311), the smart watch (4322) as illustrated in (a) of FIG. 43 may displayed again on the touch screen, and the displayed smart watch (4322) may be automatically paired with the mobile terminal (4321). Along with this, an incoming call notification (4322*a*) may be displayed on the external screen (on an upper portion) of the one-hand operation mode screen in response to the newly paired smart watch (4322) {(d) of FIG. 43}.

That is, according to an exemplary embodiment of the present disclosure, when a plurality of devices pairable with the mobile terminal is present in the one-hand operation mode, the user may recognize presence of the pairable devices by an arrow displayed with the paired device and flick a screen displaying the paired device such that pairing with other devices may be automatically performed.

Therefore, the mobile terminal for one-hand operation mode according to an exemplary embodiment of the present disclosure may enable the user to conveniently and accurately control functions of the mobile terminal, such as controlling notifications, paired devices, and control of applications, using a single hand of the user.

The abovementioned exemplary embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments within an equivalent scope. Therefore, the technical scope of the rights for the present disclosure shall be decided by rational interpretation of the appended claims and equivalents thereof.

The invention claimed is:

1. A mobile terminal, comprising:
   a display unit including a touch screen;
   a sensor unit; and
   a controller configured to:
   execute an one-hand operation mode in response to at least one of a first input applied to the touch screen, a second input applied to a portion of the mobile terminal other than the touch screen, or a motion sensed by the sensor unit such that a one-hand operation mode screen is generated, the one-hand operation mode screen corresponding to a reduced size screen of a full screen displayed on an entire area of the touch screen at time when the first input, second input or motion is received;
   cause the display unit to display the one-hand operation mode screen on a first area of the touch screen adjacent to a hand of a user holding the mobile terminal;
   cause the display unit to display an event relating to the mobile terminal on a second area of the touch screen while the one-hand operation mode screen is displayed on the first area of the touch screen, wherein the first area is closer to the hand of the user than the second area;
   cause the display unit to display a notification corresponding to the event on the second area; and
   cause the display unit to display the notification or an execution of an application corresponding to the notification as a preview screen, or deletes the preview screen, in response to at least one of the motion, a touch input for the notification, the first input, or the second input that are applied when the one-hand operation mode is operated,
   when the notification notifies a received message, the controller is further configured to cause the display unit to display the preview message along with a screen for writing a reply message to the received message, in response to at least one of the motion, a touch input for the notification, the first input, or the second input that are applied when the one-hand operation mode is operated.

2. The mobile terminal of claim 1, wherein the controller controls at least one of an object displayed on the display unit, a size of the object, or a position of the object displayed on the display unit, in response to at least one of the first input, the second input, or the motion.

3. The mobile terminal of claim 1, wherein the controller changes a position on which the notification is displayed, or deletes the notification, in response to at least one of the motion, a touch input for the notification, the first input, or the second input that are applied when the one-hand operation mode is operated.

4. The mobile terminal of claim 1, wherein the controller is further configured to cause the display unit to display a screen displaying an event corresponding to the notification executed such that the screen displaying the event overlaps with a predetermined portion of the one-hand operation mode screen, in response to at least one of the motion, a touch input for the notification, the first input, or the second input that are applied when the one-hand operation mode is operated.

5. The mobile terminal of claim 1, wherein the controller is further configured to cause the display unit to display a screen displaying an event corresponding to the notification executed and a portion of the one-hand operation mode screen together, by displaying the screen displaying the event corresponding to the notification executed on an inner portion of the one-hand operation mode screen, when the notification is moved onto the one-hand operation mode screen, in response to at least one of the motion, a touch input for the notification, the first input, or the second input that are applied when the one-hand operation mode is operated.

6. The mobile terminal of claim 1, wherein the screen for writing the reply message includes a screen displaying inputted voice as a content of the reply message or a screen for selecting a method for writing the reply message.

7. The mobile terminal of claim 1, wherein when the application is a gallery application,
the preview screen includes a screen displaying an image included in the gallery application as a thumbnail format, and
the controller changes any one image displayed in an enlarged size among the image displayed as a thumbnail format, in response to a predetermined direction included in the motion, a touch input for the notification, the first input and the second input that are applied when the one-hand operation mode is operated.

8. The mobile terminal of claim 1, wherein when the application is a camera application,
the preview screen includes a screen displaying a photographing mode depending on execution of the camera application, and
the controller obtains an image of a subject through the photographing mode, and finishes displaying of the preview screen, in response to at least one of the motion, a touch input for the notification, the first input and the second input that are applied when the one-hand operation mode is operated.

9. The mobile terminal of claim 1, wherein when the application is an email application,
the preview screen includes a screen displaying an email list depending on execution of the email application, and
the controller moves the email list or refreshes the email list, in response to a predetermined direction included in the motion, a touch input for the notification, the first input and the second input that are applied when the one-hand operation mode is operated.

10. The mobile terminal of claim 1, wherein when a badge showing existence of an event unchecked by a user is displayed on an icon included in the one-hand operation mode screen,
the controller is further configured to cause the display unit to display a notification corresponding to the event unchecked by a user on the remaining area except for an area displaying the one-hand operation mode screen among areas of the touch screen, in response to the first input for the icon or a touch input dragging out of the one-hand operation mode screen.

11. The mobile terminal of claim 1, wherein when the full screen includes a screen displaying a scheduling application executed to display a schedule relating to a location,
the controller is further configured to cause the display unit to display a screen including at least one of location information for the location, path information from a current location to the location, and time required, on the remaining area except for an area displaying the one-hand operation mode screen among areas of the touch screen.

12. The mobile terminal of claim 1, wherein when the full screen includes a screen displaying a conversation application executed to display information relating to a date during conversation,
the controller is further configured to cause the display unit to display a screen showing a schedule corresponding to the date or a screen for adding a new schedule to the date, on the remaining area except for an area displaying the one-hand operation mode screen among areas of the touch screen.

13. The mobile terminal of claim 1, wherein when the full screen includes a screen displaying a navigation application executed,
the controller is further configured to cause the display unit to display a quick launch application including at least one icon corresponding to a predetermined application, on the remaining area except for an area displaying the one-hand operation mode screen among areas of the touch screen.

14. The mobile terminal of claim 1, wherein the controller is further configured to cause the display unit to display at least one notification corresponding to an event relating to an application corresponding to an icon, in response to the first input or the second input for selecting the icon displayed on the one-hand operation mode screen.

15. The mobile terminal of claim 14, wherein the controller scrolls the at least one notification, in response to a predetermined direction included in the first input or the second input.

16. The mobile terminal of claim 1, wherein the controller displays a screen showing a device paired with the mobile terminal, on the remaining area except for an area displaying the one-hand operation mode screen among areas of the touch screen.

17. The mobile terminal of claim 16, wherein the controller displays a notification corresponding to the event on a remaining area except for areas displaying the one-hand operation mode screen and a screen showing the paired device among areas of the touch screen, and changes at least one of a location on which the notification is displayed, a location on which the one-hand operation mode screen is displayed, and a location on which the screen showing the paired device, in response to at least one of the motion, a touch input for the notification, the first input and the second input that are applied when the one-hand operation mode is operated.

18. The mobile terminal of claim 16, wherein the controller selects any one of the paired device and the mobile terminal, as a subject of an event corresponding to the notification to be executed, in response to at least one of the motion, a touch input for the notification, the first input and the second input that are applied when the one-hand operation mode is operated.

19. The mobile terminal of claim 18, wherein the controller selects the subject to be executed, depending on a screen displayed on a location more adjacent to a hand of a user between the screen showing the paired device and the one-hand operation mode screen, when executing the event.

20. The mobile terminal of claim 18, wherein the controller selects the subject to be executed, depending on a location to which an input means for executing the event is moved between the screen showing the paired device and the one-hand operation mode screen.

21. The mobile terminal of claim 18, wherein the controller selects the subject to be executed, depending on an input applied adjacent to the one-hand operation mode screen or an input applied adjacent to the screen showing the paired device.

22. The mobile terminal of claim 16, wherein when a notification corresponding to an event relating to the paired device is generated, the controller displays a screen including the notification and a menu for controlling the notification, on a remaining area except for areas displaying the one-hand operation mode screen and a screen showing the paired device among areas of the touch screen.

23. The mobile terminal of claim 16, wherein when a telephone application is executed via the paired device, the controller transmits a file included in the mobile terminal or a captured image of the mobile terminal to a telephone counterpart via the paired device, in response to at least one of the motion, a touch input for the notification, the first input and the second input that are applied when the one-hand operation mode is operated.

24. The mobile terminal of claim 16, wherein when the paired device and at least one pairable device exist at a periphery of the mobile terminal, the controller displays at least one display means showing a direction on a periphery area of the screen showing the paired device, upon appliance of the first input or the second input corresponding to the direction, automatically pairing the pairable device with the mobile terminal, and displaying the pairable device on the screen showing the paired device.

* * * * *